(12) United States Patent
Hirotani et al.

(10) Patent No.: US 9,755,470 B2
(45) Date of Patent: Sep. 5, 2017

(54) ROTARY ELECTRIC MACHINE AND ELECTRIC POWER STEERING DEVICE USING ROTARY ELECTRIC MACHINE

(71) Applicant: MITSUBISHI ELECTRIC CORPORATION, Chiyoda-ku (JP)

(72) Inventors: Yu Hirotani, Chiyoda-ku (JP); Masatsugu Nakano, Chiyoda-ku (JP); Kazumasa Ito, Chiyoda-ku (JP); Hiroko Ueyama, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/311,068

(22) PCT Filed: Aug. 4, 2015

(86) PCT No.: PCT/JP2015/072075
§ 371 (c)(1),
(2) Date: Nov. 14, 2016

(87) PCT Pub. No.: WO2016/067695
PCT Pub. Date: May 6, 2016

(65) Prior Publication Data
US 2017/0093242 A1    Mar. 30, 2017

(30) Foreign Application Priority Data

Oct. 30, 2014  (JP) ................................. 2014-220954

(51) Int. Cl.
*H02K 3/28* (2006.01)
*B62D 5/04* (2006.01)

(52) U.S. Cl.
CPC ........ *H02K 3/28* (2013.01); *B62D 5/04* (2013.01)

(58) Field of Classification Search
CPC .................................... H02K 3/28; B62D 5/04
(Continued)

(56) References Cited

U.S. PATENT DOCUMENTS 6,424,073 B1 *  7/2002  Kometani ................ H02K 1/16
                                                       310/179
2011/0074239 A1   3/2011  Nishiyama et al.
(Continued)

FOREIGN PATENT DOCUMENTS

JP         2005-86879 A      3/2005
JP   WO 2009144946 A1 * 12/2009 ............... H02K 3/28
(Continued)

OTHER PUBLICATIONS

International Search Report dated Oct. 27, 2015, in PCT/JP2015/072075 filed Aug. 4, 2015.

*Primary Examiner* — Naishadh Desai
(74) *Attorney, Agent, or Firm* — Oblon, McClelland, Maier & Neustadt, L.L.P.

(57) ABSTRACT

In a rotary electric machine, when armature coil bodies of respective phases in which first and second armature windings, are both wound around 6 k×n teeth are set as Ua, Va, and Wa, armature coil bodies of respective phases in which only the first and armature winding is wound around 6 m×n teeth are set as Ub, Vb, and Wb, and armature coil bodies of respective phases in which only the second armature winding is wound around 6 m×n teeth are set as Uc, Vc, and Wc, Ua, Va, Wa, Ub, Vb, Wb, Uc, Vc, and Wc are respectively arranged so as to exhibit 2 n-fold rotational symmetry about an axial center of a rotor.

17 Claims, 33 Drawing Sheets

(58) Field of Classification Search
USPC .................................................. 310/179–210
See application file for complete search history.

(56) References Cited

U.S. PATENT DOCUMENTS

2014/0145547 A1    5/2014  Nakano et al.
2014/0346910 A1  11/2014  Nakano et al.

FOREIGN PATENT DOCUMENTS

| | | |
|---|---|---|
| JP | 2013-85381 A | 5/2013 |
| WO | WO 2009/144946 A1 | 12/2009 |
| WO | WO 2013/054439 A1 | 4/2013 |
| WO | WO 2013/080374 A1 | 6/2013 |

* cited by examiner

CURRENT VECTOR OF V PHASE

ROTARY ELECTRIC MACHINE AND ELECTRIC POWER STEERING DEVICE USING ROTARY ELECTRIC MACHINE

TECHNICAL FIELD

This invention relates to a rotary electric machine and an electric power steering device using the rotary electric machine.

BACKGROUND ART

In a conventional rotary electric machine used in an electric power steering device or the like, it is necessary to suppress torque ripple, or in other words torque pulsation. For this purpose, a conventional rotary electric machine is driven to rotate by winding two three-phase armature windings by means of concentrated winding around a plurality of teeth formed on a stator core, and supplying currents having a current phase difference from two inverters respectively to the different three-phase armature windings.

Further, this type of rotary electric machine may include a stator having 18 n (where n is an integer no smaller than 1) teeth and a rotor having (18 n±4 n) field poles (see PTL 1 and PTL 2, for example), or may be configured such that two or more armature windings are wound around at least one of each pair of adjacent teeth and the armature windings are respectively connected to different inverters (see PTL 3, for example).

CITATION LIST

Patent Literature

[PTL 1] WO 2013/054439
[PTL 2] WO 2013/080374
[PTL 3] Japanese Patent Application Publication No. 2013-85381

SUMMARY OF INVENTION

Technical Problem

In the rotary electric machines according to PTL 1 and PTL 2, torque ripple is reduced by setting the current phase difference between the two inverters at 20° to 40°.

However, when the configuration of PTL 1 and PTL 2 is applied to a rotary electric machine having a stator that includes 6 (2 m+k)×n (where k, n, and m are integers no smaller than 1) teeth, the respective phases of each armature winding are disposed periodically with (2 m+k) teeth serving as a minimum unit. Therefore, when currents having a current phase difference are supplied respectively to the different armature windings from the two inverters, an electromagnetic field formed in an air gap between the rotor and the stator by the armature windings wound around the teeth becomes spatially unbalanced. As a result, an electromagnetic field component in the air gap between the rotor and the stator deviates from a desired circumferential direction control position of the rotor of the rotary electric machine. When the electromagnetic field component deviates from the circumferential direction control position, an electromagnetic excitation force generated in the stator core of the rotary electric machine increases, leading to increases in vibration and noise.

Further, in the configuration of PTL 3, an increase in the torque ripple of the rotary electric machine is suppressed by suppressing the effect of variation in the current phase difference between the currents supplied respectively to the different armature windings from the two inverters in accordance with a turn ratio between the two armature windings.

However, when the configuration of PTL 1 and PTL 2 is applied to a rotary electric machine having a stator that includes 6 (2 m+k)×n (where k, n, and m are integers no smaller than 1) teeth, the respective phases of each armature winding are disposed periodically with (2 m+k) teeth serving as the minimum unit, and two or more armature windings are wound around at least one of each pair of adjacent teeth. Therefore, when currents having a current phase difference are supplied respectively to the different armature windings from the two inverters, the electromagnetic field formed in the air gap between the rotor and the stator by the armature windings wound around the teeth becomes spatially unbalanced. As a result, similarly to PTL 1 and PTL 2, the electromagnetic field component deviates from the circumferential direction control position, and therefore the electromagnetic excitation force of the rotary electric machine increases, leading to increases in vibration and noise.

This invention has been designed to solve the problem described above, and an object thereof is to obtain a rotary electric machine having a stator that includes 6 (2 m+k)×n teeth, in which an electromagnetic field formed in an air gap between a rotor and the stator by two armature windings provided in the rotary electric machine can be spatially balanced even when a current phase difference exists between currents supplied to the armature windings, with the result that increases in vibration and noise in the rotary electric machine can be suppressed.

Solution to Problem

A rotary electric machine according to this invention includes a stator having a stator core that includes 6 (2 m+k)×n (where k, n, and m are integers no smaller than 1) teeth and a plurality of armature coil bodies in which at least one of a first armature winding and a second armature winding is wound around each of the plurality of teeth, wherein a three-phase current is supplied to the first armature winding from a first inverter, a three-phase current is supplied to the second armature winding from a second inverter, each of the plurality of armature coil bodies is an armature coil body of one of three phases, and when 2 k×n armature coil bodies of each of the three phases, in which the first armature winding and the second armature winding are both wound around 6 k×n of the teeth, form 6 k×n armature coil bodies of the plurality of armature coil bodies and these armature coil bodies of each of the three phases are set respectively as Ua, Va, and Wa, 2 m×n armature coil bodies of each of the three phases, in which only the first armature winding is wound around 6 m×n of the teeth, form further 6 m×n armature coil bodies of the plurality of armature coil bodies and these armature coil bodies of each of the three phases are set respectively as Ub, Vb, and Wb, and 2 m×n armature coil bodies of each of the three phases, in which only the second armature winding is wound around 6 m×n of the teeth, form the remaining 6 m×n armature coil bodies of the plurality of armature coil bodies and these armature coil bodies of each of the three phases are set respectively as Uc, Vc, and Wc, Ua, Va, Wa, Ub, Vb, Wb, Uc, Vc, and Wc are respectively arranged so as to exhibit 2 n-fold rotational symmetry about an axial center of a rotor.

Advantageous Effects of Invention

In the rotary electric machine configured as described above, the electromagnetic field formed in the air gap between the rotor and the stator by the two armature windings provided in the rotary electric machine can be spatially balanced even when a current phase difference exists between the currents supplied to the armature windings, and as a result, increases in the torque ripple and the electromagnetic excitation force of the rotary electric machine can be suppressed. Accordingly, increases in vibration and noise in the rotary electric machine can be suppressed.

DESCRIPTION OF EMBODIMENTS

Rotary electric machines according to respective embodiments of this invention will be described below using a rotary electric machine employed in a vehicle as an example. The rotary electric machine according to this invention is not limited to application to a vehicle, however, and may be used in other applications.

First Embodiment

Figure 1:
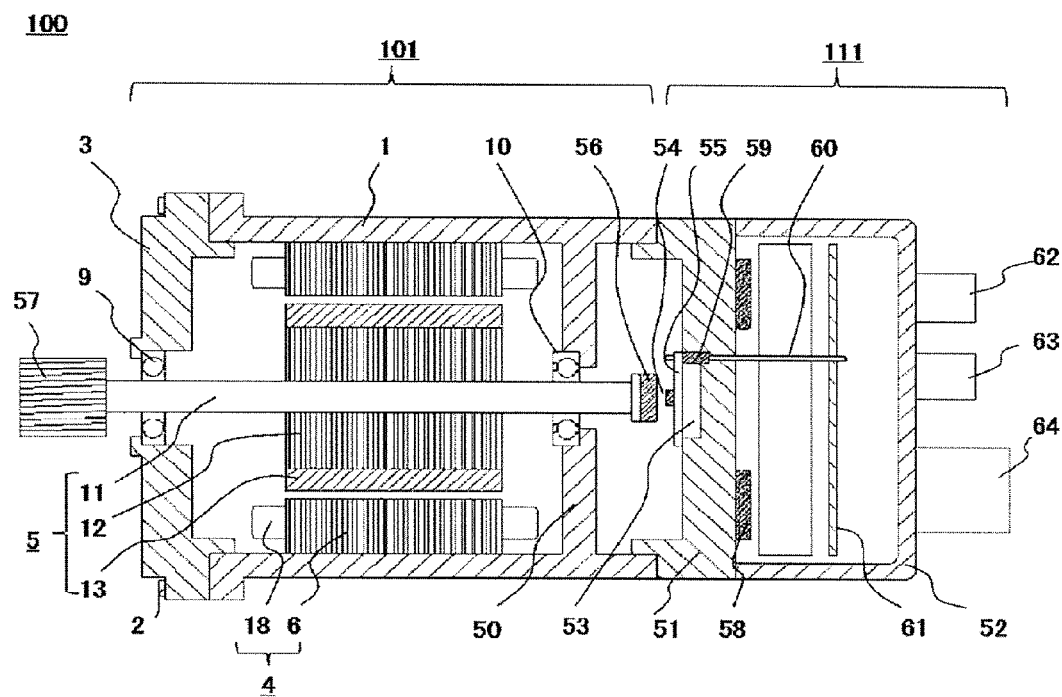
FIG. 1 is a sectional side view of an electric driving device according to a first embodiment of this invention.

FIG. 1 is a sectional side view of an electric driving device 100 obtained by integrating a rotary electric machine 101 according to a first embodiment of this invention with an ECU (Electronic Control Unit) 111. Note that a sectional side view is a sectional view taken on a plane that includes an axial center of the rotary electric machine 101.

The rotary electric machine 101 according to the first embodiment includes a cylindrical frame 1, a housing 3 fixed by bolts 2 to an end surface on one side of the frame 1, a stator 4 fixed to an inner wall surface of the frame 1, and a rotor 5 provided on an inner side of the stator 4.

The stator 4 includes a stator core 6 obtained by laminating thin plate-shaped magnetic bodies such as electromagnetic steel plates, and a plurality of armature coil bodies 18 housed in the stator core 6.

The rotor 5 includes a shaft 11 supported to be free to rotate at respective end portions thereof by a first bearing 9 fitted to the housing 3 and a second bearing 10 fitted to the frame 1, a rotor core 12 fixed to an outer peripheral surface of the shaft 11, and permanent magnets 13 disposed on an outer peripheral surface of the rotor core 12 at equal intervals in a circumferential direction.

The ECU 111 is separated from the rotary electric machine 101 by a wall portion 50 of the frame 1. An opening portion of the frame 1 on an opposite side to the housing 3 is closed by a heat sink 51. One surface of the heat sink 51 is covered by a case 52 formed in the shape of a closed-end cylinder. A recessed portion 53 is formed in a surface of the heat sink 51 on the shaft 11 side. The recessed portion 53 is covered by a substrate 55 on which a magnetic sensor 54 is mounted. The magnetic sensor 54 opposes a sensor permanent magnet 56 fixed to a second end portion of the shaft 11 on an opposite side to a pulley 57 fixed to a first end portion thereof.

A switching element 58 is mounted on a surface of the heat sink 51 on an opposite side to the shaft 11. The substrate 55 is electrically connected to a control board 61 via a support portion 59 and a connecting member 60. A first connector 62 for receiving information from a torque sensor, a second connector 63 for receiving vehicle information such as a vehicle speed, and a power supply connector 64 for supplying power are provided in the case 52.

Figure 2:
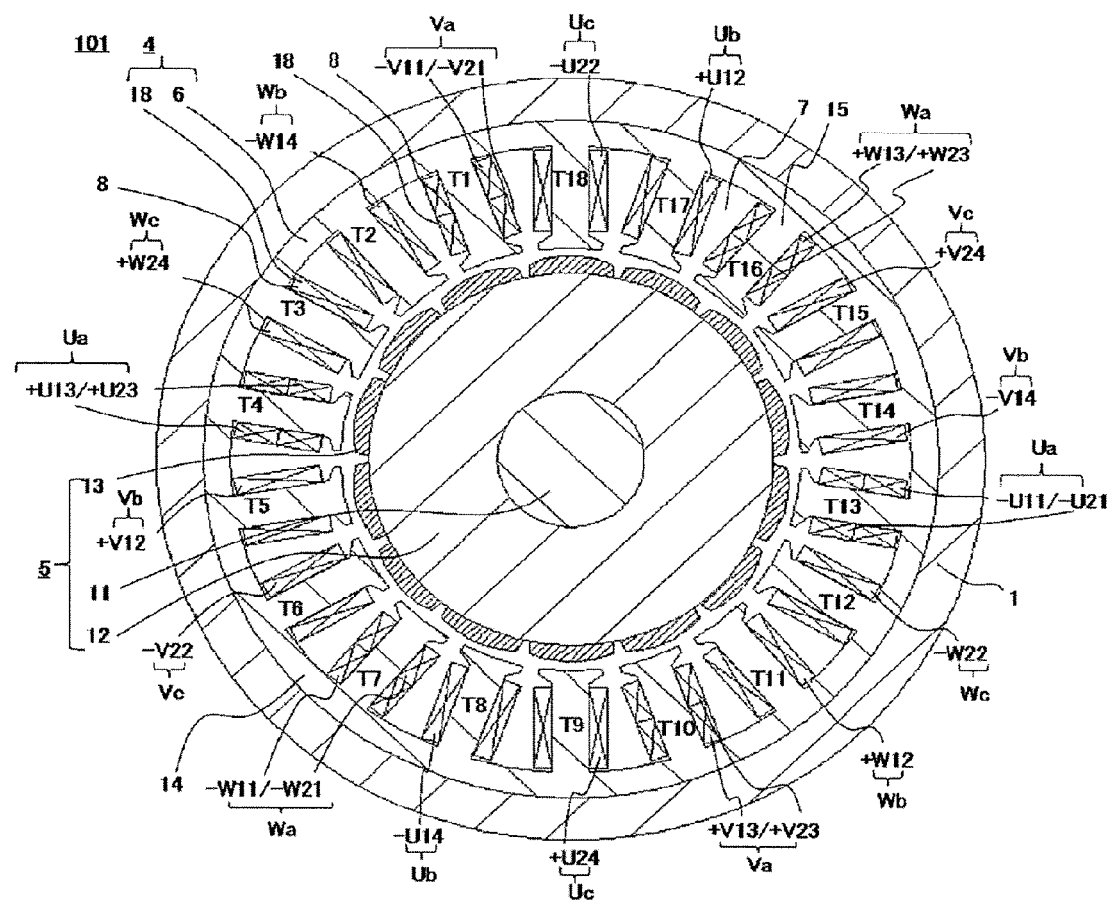
FIG. 2 is a sectional view of a rotary electric machine according to the first embodiment of this invention.

FIG. 2 is a sectional view of the rotary electric machine according to this embodiment. Note that a sectional view is a sectional view taken on an orthogonal plane to the axial center of the rotary electric machine 101.

Fourteen permanent magnets 13 are fixed by adhesion to an outer peripheral side of the rotor core 12 at equal intervals in the circumferential direction such that fourteen field poles are formed. Note that to protect the permanent magnets 13 and prevent the permanent magnets 13 from scattering, the outer sides of the permanent magnets 13 may be covered by a cylindrical cover formed from a non-magnetic material such as stainless steel or aluminum.

The rotor core 6 includes an annular core back 14, and eighteen teeth 15 formed at equal intervals in the circumferential direction so as to extend radially inward (in a lengthwise direction of a magnetic gap) from the core back 14. Eighteen slots 7 are formed between adjacent teeth 15. For convenience, the teeth 15 are allocated reference numerals T1 to T18 in counterclockwise order in the circumferential direction. At least one armature coil 8 is wound around each tooth 15.

The armature coils 8 are divided into armature coils 8 belonging to a U phase, a V phase, and a W phase, each of which represents one of three phases. The U phase is constituted by eight armature coils 8 numbered −U11, +U12, +U13, −U14, −U21, −U22, +U23, and +U24, the V phase is constituted by eight armature coils 8 numbered −V11, +V12, +V13, −V14, −V21, −V22, +V23, and +V24, and the W phase is constituted by eight armature coils 8 numbered −W11, +W12, +W13, −W14, −W21, −W22, +W23, and +W24.

Further, as shown in FIG. 2, the twenty-four armature coils 8 are arranged in order of −V11/−V21, −W14, +W24, +U13/+U23, +V12, −V22, −W11/−W21, −U14, +U24, +V13/+V23, +W12, −W22, −U11/−U21, −V14, +V24, +W13/+W23, +U12, and −U22 so as to correspond respectively to the teeth 15 numbered T1 to T18. Note that "+" and "−" represent different winding polarities of the armature coils 8, and indicate that when currents are passed through the armature coils 8 in an identical direction, electromagnetic fields are generated in the armature coil 8 in mutually opposite radial directions. Further, "/" indicates that two armature coils 8 are wound around the same tooth 15 in different radial direction positions. Two armature coils 8 are wound by an identical number of turns around the teeth 15 numbered T1, T4, T7, T10, T13, and T16, while a single armature coil 8 is wound around the other teeth 15. Note that the radial direction positions of the two armature coils 8 wound respectively around the teeth 15 numbered T1, T4, T7, T10, T13, and T16 are not limited to those shown in FIG. 2, and may be reversed.

Figure 3:
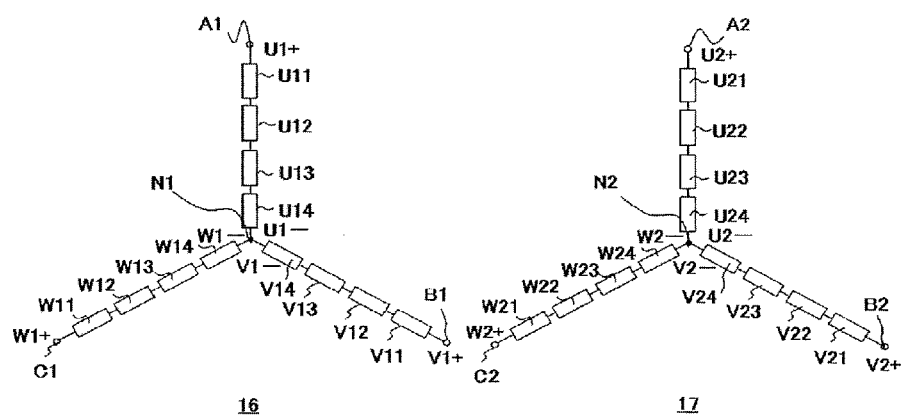
FIG. 3 is a view showing a Y connection of the rotary electric machine according to the first embodiment of this invention.
Figure 4:
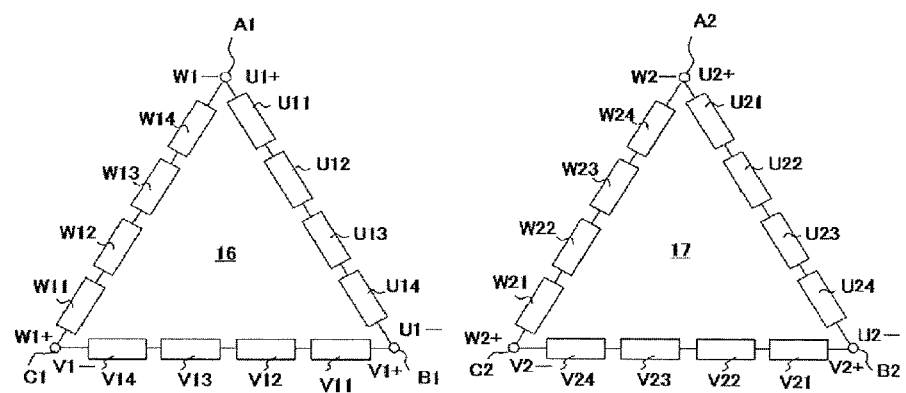
FIG. 4 is a view showing a Δ connection of the rotary electric machine according to the first embodiment of this invention.

FIG. 3 is a view showing a Y connection of the rotary electric machine according to this embodiment. FIG. 4 is a view showing a Δ connection of the rotary electric machine according to this embodiment. Note that the winding polarities of the armature coils 8 are not shown in FIGS. 3 and 4.

As shown in FIGS. 3 and 4, the twenty-four armature coils 8 are connected on the outside of the stator core 6 in each of the three phases so as to form a first armature winding 16 and a second armature winding 17.

In the first armature winding 16, as shown in FIGS. 3 and 4, the four U phase armature coils 8 numbered U11, U12, U13, and U14 are connected in that order in series, the four V phase armature coils 8 numbered V11, V12, V13, and V14 are connected in that order in series, and the four W phase armature coils 8 numbered W11, W12, W13, and W14 are connected in that order in series.

Further, in the second armature winding 17, the four U phase armature coils 8 numbered U21, U22, U23, and U24 are connected in that order in series, the four V phase armature coils 8 numbered V21, V22, V23, and V24 are connected in that order in series, and the four W phase armature coils 8 numbered W21, W22, W23, and W24 are connected in that order in series.

In the first armature winding 16 shown in FIG. 3, U1+, V1+, and W1+ at respective first ends of U11, V11, and W11 form a terminal A1, a terminal B1, and a terminal C1, respectively, while U1−, V1−, and W1− at respective second ends of U14, V14, and W14 are all connected to each other so as to form a neutral point N1. Thus, the armature coils 8 of each of the three phases are connected in a Y connection.

Further, in the second armature winding 17, U2+, V2+, and W2+ at respective first ends of U21, V21, and W21 forma terminal A2, a terminal B2, and a terminal C2, respectively, while U2−, V2−, and W2− at respective second ends of U24, V24, and W24 are all connected to each other so as to form a neutral point N2. Thus, the armature coils 8 of each of the three phases are connected in a Y connection.

In the first armature winding 16 shown in FIG. 4, U1+ at a first end of U11 is connected to W1− at a second end of W14 so as to form a terminal A1, V1+ at a first end of V11 is connected to U1− at a second end of U14 so as to form a terminal B1, and W1+ at a first end of W11 is connected to V1− at a second end of V14 so as to form a terminal C1. Thus, the armature coils 8 of each of the three phases are connected in a Δ connection.

Further, in the second armature winding 17, U2+ at a first end of U21 is connected to W2− at a second end of W24 so as to form a terminal A2, V2+ at a first end of V21 is connected to U2− at a second end of U24 so as to form a terminal B2, and W2+ at a first end of W21 is connected to V2− at a second end of V24 so as to form a terminal C2. Thus, the armature coils 8 of each of the three phases are connected in a Δ connection.

Here, as shown in FIG. 2, two armature coil bodies 18 of each of the three phases, in which one armature coil 8 belonging to the first armature winding 16 and one armature coil 8 belonging to the second armature winding 17 are wound together around each of the six teeth 15 numbered T1, T4, T7, T10, T13, and T16, i.e. the teeth 15 around which two armature coils 8 are wound, form six of the plurality of armature coil bodies 18. The U phase armature coil bodies 18, V phase armature coil bodies 18, and W phase armature coil bodies 18 will be referred to respectively as Ua, Va, and Wa.

Further, two armature coil bodies 18 of each of the three phases, in which only one armature coil 8 belonging to the first armature winding 16 is wound around each of another six of the teeth 15, namely the teeth 15 numbered T2, T5, T8, T11, T14, and T17 around which one armature coil 8 is wound, form another six of the plurality of armature coil bodies 18. The U phase armature coil bodies 18, V phase armature coil bodies 18, and W phase armature coil bodies 18 will be referred to respectively as Ub, Vb, and Wb.

Furthermore, two armature coil bodies 18 of each of the three phases, in which only one armature coil 8 belonging to the second armature winding 17 is wound around each of the remaining six teeth 15, namely the teeth 15 numbered T3, T6, T9, T12, T15, and T18 around which one armature coil 8 is wound, form the remaining six armature coil bodies 18 of the plurality of armature coil bodies 18. The U phase armature coil bodies 18, V phase armature coil bodies 18, and W phase armature coil bodies 18 will be referred to respectively as Uc, Vc, and Wc.

Ua, Va, Wa, Ub, Vb, Wb, Uc, Vc, and Wc are arranged so as to exhibit two-fold rotational symmetry about the axial center of the rotor 5. Here, "arranged so as to exhibit two-fold rotational symmetry" means that even when the armature coil bodies 18 are rotated about the axial center of the rotor 5 by a mechanical angle of 180° (=360°/2), the same armature coil bodies 18 are wound around the teeth 15 having the same reference numerals before and after the rotation.

Further, when the nine consecutive armature coil bodies 18 within a mechanical angle range of 180° (=360°/2), among the eighteen armature coil bodies 18, together constitute a minimum unit of rotational symmetry, the minimum unit of rotational symmetry is disposed in two periods.

Furthermore, the numbers of turns of the armature coil bodies 18 wound around the respective teeth 15 are all equal. Therefore, the total numbers of turns of the two armature coils 8 wound respectively around the teeth 15 numbered T1, T4, T7, T10, T13, and T16, or in other words the numbers of turns of the respective armature coil bodies 18, are all identical, and the numbers of turns of the single armature coils 8 wound respectively around the other teeth, or in other words the numbers of turns of the respective armature coil bodies 18, are all identical.

Figure 5:
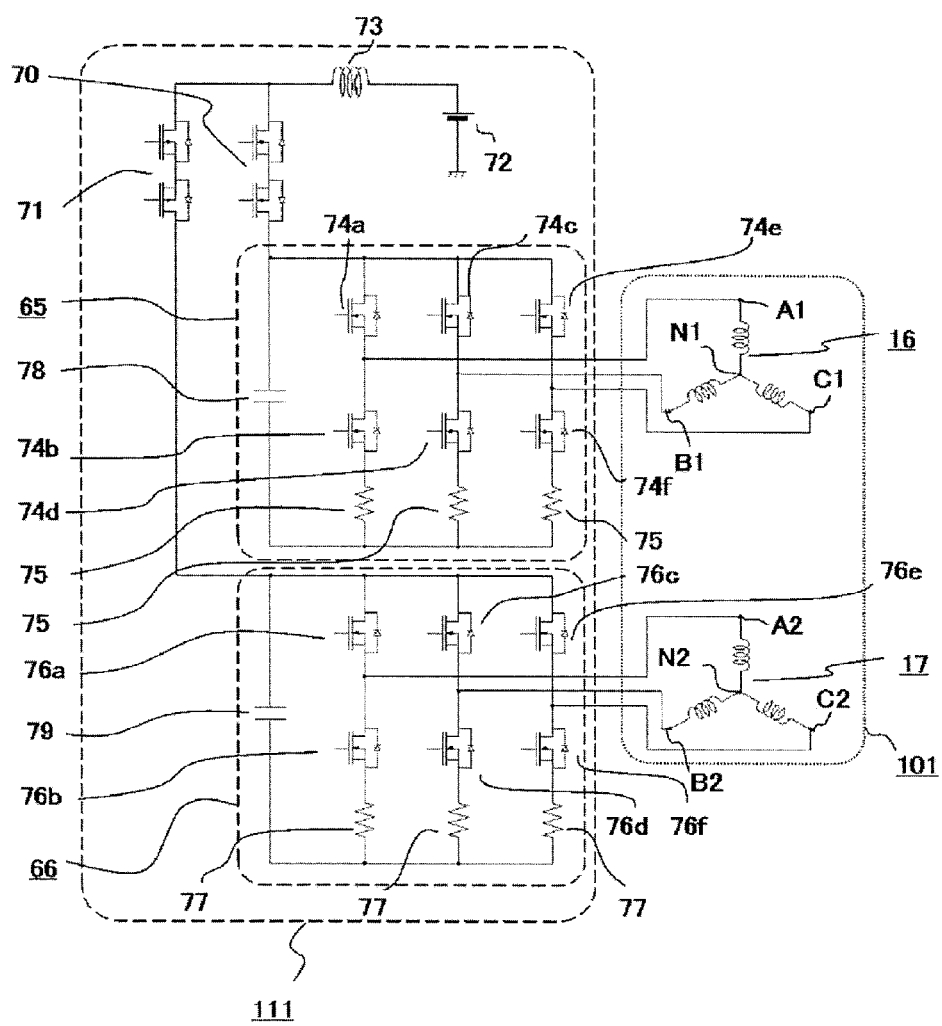
FIG. 5 is a circuit diagram showing the rotary electric machine and an ECU according to the first embodiment of this invention.

FIG. 5 is a circuit diagram showing the rotary electric machine and the ECU according to the first embodiment. FIG. 5 shows only the first armature winding 16 and the second armature winding 17 in relation to the rotary electric machine 101.

Note that in FIG. 5, the first armature winding 16 and the second armature winding 17 are respectively connected in the Y connection, but the Δ connection shown in FIG. 4 may be employed instead.

Details of the ECU 111 have likewise been omitted for the sake of simplicity, and only power circuit portions of a first inverter 65 and a second inverter 66 are shown.

The ECU 111 includes the first inverter 65 and the second inverter 66. The first inverter 65 of the ECU 111 is connected to the first armature winding 16 of the rotary electric machine 101, and the second inverter 66 of the ECU 111 is connected to the second armature winding 17. A three-phase current is supplied to the first armature winding 16 from the first inverter 65, and a three-phase current is supplied to the second armature winding 17 from the second inverter 66.

Direct current power is supplied to the ECU 111 from a power supply 72 such as a battery. A first power supply relay 70 and a second power supply relay 71 are connected to the power supply 72 via a noise removing coil 73.

Note that in FIG. 5, the power supply 72 is drawn so as to appear to be inside the ECU 111, but in actuality, power is supplied from the external power supply 72, such as a battery, via the power supply connector 64 shown in FIG. 1.

The first power supply relay 70 and the second power supply relay 71 are respectively formed from two MOS-FETs, and during a breakdown or the like, the power supply relays are opened to prevent an excessive current flow.

Note that in FIG. 5, the first power supply relay 70 and the second power supply relay 71 are connected in order of the power supply 72, the noise removing coil 73, and the power supply relays 70, 71, but the first power supply relay 70 and the second power supply relay 71 may be provided in positions closer to the power supply 72 than the noise removing coil 73.

A first capacitor 78 and a second capacitor 79 are constituted by smoothing capacitors. In FIG. 5, the respective capacitors 78, 79 are provided singly, but a plurality of capacitors may be connected in parallel.

The first inverter 65 and the second inverter 66 are respectively formed from bridges employing six MOS-FETs each. In the first inverter 65, a MOS-FET 74a and a MOS-FET 74b are connected in series, a MOS-FET 74c and a MOS-FET 74d are connected in series, and a MOS-FET 74e and a MOS-FET 74f are connected in series. Furthermore, these three groups of MOS-FETs are connected in parallel.

Moreover, one shunt resistor 75 is connected to the GND (ground) side of each of the three lower side MOS-FETs 74b, 74d, and 74f. The shunt resistors 75 are used to detect current values.

Note that in the example shown in the drawing, three shunt resistors 75 are provided, but two shunt resistors may be provided instead, and current detection is possible even with one shunt resistor. Hence, these configurations may also be employed.

Power supplied to the rotary electric machine 101 side is supplied to the terminal A1 of the rotary electric machine 101 through a bus bar or the like between the MOS-FET 74a and the MOS-FET 74b, to the terminal B1 of the rotary electric machine 101 through a bus bar or the like between the MOS-FET 74c and the MOS-FET 74d, and to the terminal C1 of the rotary electric machine 101 through a bus bar or the like between the MOS-FET 74e and the MOS-FET 74f.

The second inverter 66 is configured similarly to the first inverter 65 such that in the second inverter 66, a MOS-FET 76a and a MOS-FET 76b are connected in series, a MOS-FET 76c and a MOS-FET 76d are connected in series, a MOS-FET 76e and a MOS-FET 76f are connected in series, and the three groups of MOS-FETs are connected in parallel.

Moreover, one shunt resistor 77 is connected to the GND (ground) side of each of the three lower side MOS-FETs 76b, 76d, and 76f. The shunt resistors 77 are used to detect current values.

Note that in the example shown in the drawing, three shunt resistors 77 are provided, but two shunt resistors may be provided instead, and current detection is possible even with one shunt resistor. Hence, these configurations may also be employed.

Power supplied to the rotary electric machine 101 side is supplied to the terminal A2 of the rotary electric machine 101 through a bus bar or the like between the MOS-FET 76a and the MOS-FET 76b, to the terminal B2 of the rotary electric machine 101 through a bus bar or the like between the MOS-FET 76c and the MOS-FET 76d, and to the terminal C2 of the rotary electric machine 101 through a bus bar or the like between the MOS-FET 76e and the MOS-FET 76f.

In the two inverters 65, 66, control circuits (not shown) transmit signals to the MOS-FETs in accordance with a rotation angle detected by a rotation angle sensor (not shown) provided in the rotary electric machine 101. The MOS-FETs are switched after receiving the signals, whereby desired three-phase currents are supplied to the first armature winding 16 and the second armature winding 17 from the MOS-FETs.

Note that a resolver, a GMR sensor, an MR sensor, or the like is used as the rotation angle sensor.

When the rotary electric machine 101 is configured as described above, following effects are obtained.

First, a configuration in which the neutral points N1 and N2 of FIG. 5 are not electrically connected will be described.

When the neutral points N1 and N2 of the two armature windings 16 and 17 are not electrically connected and a short circuit occurs in the interior of the rotary electric machine 101, torque can be generated by a circuit including the normal inverters 65 and 66 and the armature windings 16 and 17 as long as the circuit is electrically independent, and as a result, the effect of the short circuit can be reduced.

Further, FIG. 5 shows an example in which motor relays are not provided between the first inverter 65 and the first armature winding 16 and between the second inverter 66 and the second armature winding 17, but motor relays constituted by MOS-FETs may be provided, and by opening the motor relays when a breakdown occurs, countermeasures such as reducing brake torque can be taken.

Figure 6A:
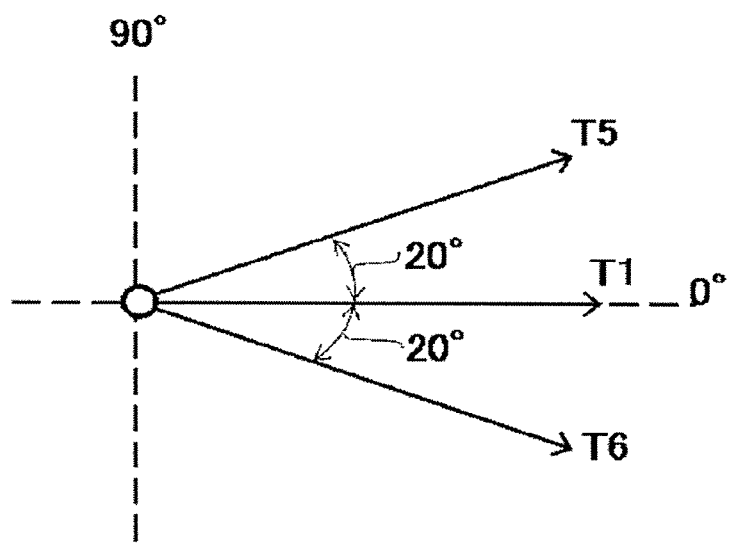
FIG. 6A is a vector diagram showing teeth numbered T1, T5, and T6, around which V phase armature coils of the rotary electric machine according to the first embodiment of this invention are wound.
Figure 6B:
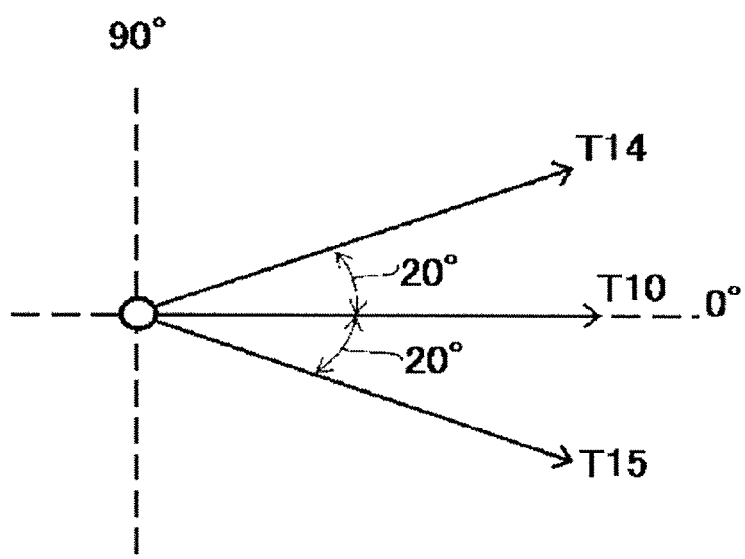
FIG. 6B is a vector diagram showing teeth numbered T10, T14, and T15, around which V phase armature coils of the rotary electric machine according to the first embodiment of this invention are wound.

FIG. 6A is a vector diagram showing the teeth numbered T1, T5, and T6 around which the V phase armature coils of the rotary electric machine according to this embodiment are wound, and FIG. 6B is a vector diagram showing the teeth numbered T10, T14, and T15 around which the V phase armature coils of the rotary electric machine according to this embodiment are wound. FIGS. 6A and 6B show two groups of teeth 15, namely the teeth 15 numbered T1, T5, and T6 and the teeth 15 numbered T10, T14, and T15, which are separated from each other by a mechanical angle of 180° in the circumferential direction. Here, respective electrical angle phases of the teeth 15 around which the V phase armature coils 8 are wound are set such that the armature coils 8 having the "+" winding polarity deviate respectively from the armature coils 8 having the "−" winding polarity by an electrical angle of 180°.

Phases of the teeth 15 numbered T1 and T10, the teeth 15 numbered T5 and T14, and the teeth 15 numbered T6 and T15 respectively differ from each other by a mechanical angle of 180°, but when the winding polarities of the armature coils 8 are taken into consideration, the phases of these teeth 15 are respectively identical in terms of the electrical angle. Further, phases of the teeth 15 numbered T1 and T5, the teeth 15 numbered T1 and T6, the teeth 15 numbered T10 and T14, and the teeth 15 numbered T10 and T15 respectively differ from each other by an electrical angle of 20°.

Furthermore, in FIGS. 6A and 6B, respective electrical angle phases of the armature coil bodies 18 numbered Va, which are wound around the teeth numbered T1 and T10, take the second smallest value of Va, Vb, and Vc, which are the three armature coil bodies 18 of the same phase within the minimum unit of rotational symmetry.

Note that although FIGS. 6A and 6B show the V phase, the W phase and the U phase respectively differ from the V phase only by an electrical angle of 120°, and relationships within the respective phases are identical.

Hence, the phases of the teeth 15 of the respective phases according to this embodiment are set at an identical mechanical angle of 180°. In other words, the armature coils 8 constituting Ua, Va, Wa, Ub, Vb, Wb, Uc, Vc, and Wc are arranged so as to exhibit two-fold (=360°/2) rotational symmetry about the axial center of the rotor 5.

Further, the respective electrical angle phases of Ua, Va, and Wa take the second smallest value among the three armature coil bodies 18 of the same phase within the minimum unit of rotational symmetry.

Figure 7:
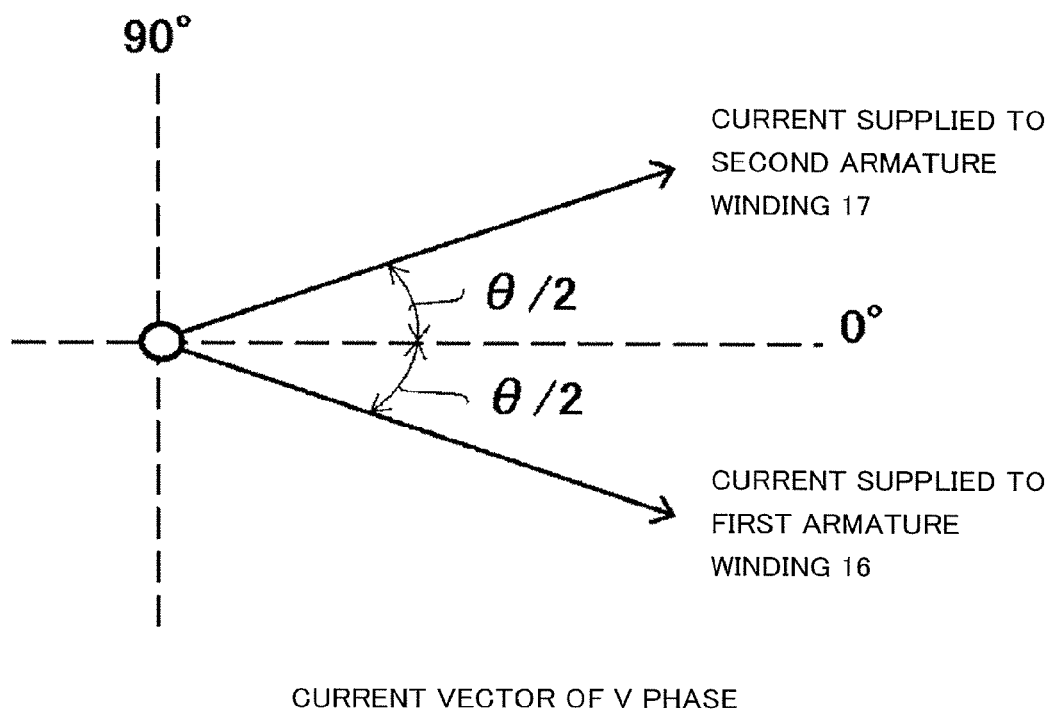
FIG. 7 is a vector diagram showing V phase currents flowing through armature windings of the rotary electric machine according to the first embodiment of this invention.

FIG. 7 is a vector diagram showing V phase currents flowing through the armature windings of the rotary electric machine according to this embodiment. Using 0° as a reference, the phase of the V phase current supplied to the first armature winding 16 is $-\theta/2°$ ($\theta>0°$), and using 0° reference, the phase of the V phase current supplied to the second armature winding 17 is $+\theta/2°$. In other words, the phase of the current supplied from the second inverter 66 to the second armature winding 17 is advanced by a current phase difference $\theta$ relative to the phase of the current supplied from the first inverter 65 to the first armature winding 16.

Further, the armature coil bodies 18 numbered Vb, which are wound around the teeth numbered T5 and T14, are the armature coil bodies 18 having the most advanced electrical angle phase among the armature coil bodies 18 of the same phase within the minimum unit of rotational symmetry, while the armature coil bodies 18 numbered Vc, which are wound around the teeth numbered T6 and T15, are the armature coil bodies 18 having the most retarded electrical angle phase among the armature coil bodies 18 of the same phase within the minimum unit of rotational symmetry.

Note that although FIG. 7 shows the V phase current, the W phase and the U phase respectively differ from the V phase only by an electrical angle of 120°, and relationships between the currents within the respective phases are identical.

Hence, Ub, Vb, and Wb are the armature coil bodies 18 having the most advanced electrical angle phase among the armature coil bodies 18 of the same phase within the minimum unit of rotational symmetry. Further, Uc, Vc, and Wc are the armature coil bodies 18 having the most retarded electrical angle phase among the armature coil bodies 18 of the same phase within the minimum unit of rotational symmetry.

Figure 8:
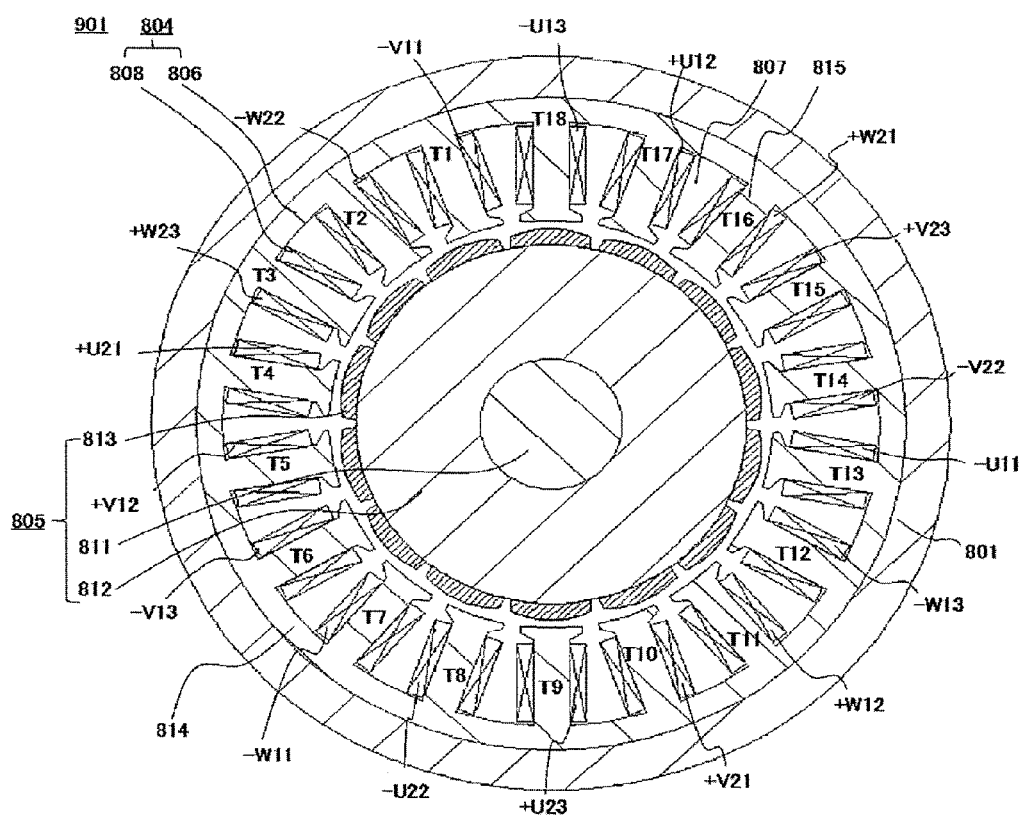
FIG. 8 is a sectional view showing a conventional rotary electric machine.

To describe the effects of this embodiment, problems will be described on the basis of example configurations of conventional rotary electric machines. FIG. 8 is a sectional view of a conventional rotary electric machine.

Armature coils 808 are divided into armature coils 808 belonging to a U phase, a V phase, and a W phase, each of which represents one of three phases. The U phase is constituted by six armature coils 808 numbered −U11, +U12, −U13, +U21, −U22, and +U23, the V phase is constituted by six armature coils 808 numbered −V11, +V12, −V13, +V21, −V22, and +V23, and the W phase is constituted by six armature coils 808 numbered −W11, +W12, −W13, +W21, −W22, and +W23.

Further, as shown in FIG. 8, the eighteen armature coils 808 are arranged in order of −V11, −W22, +W23, +U21, +V12, −V13, −W11, −U22, +U23, +V21, +W12, −W13, −U11, −V22, +V23, +W21, +U12, and −U13 so as to correspond respectively to teeth 815 numbered T1 to T18. Note that "+" and "−" represent the different winding polarities of the armature coils 808.

Figure 9:
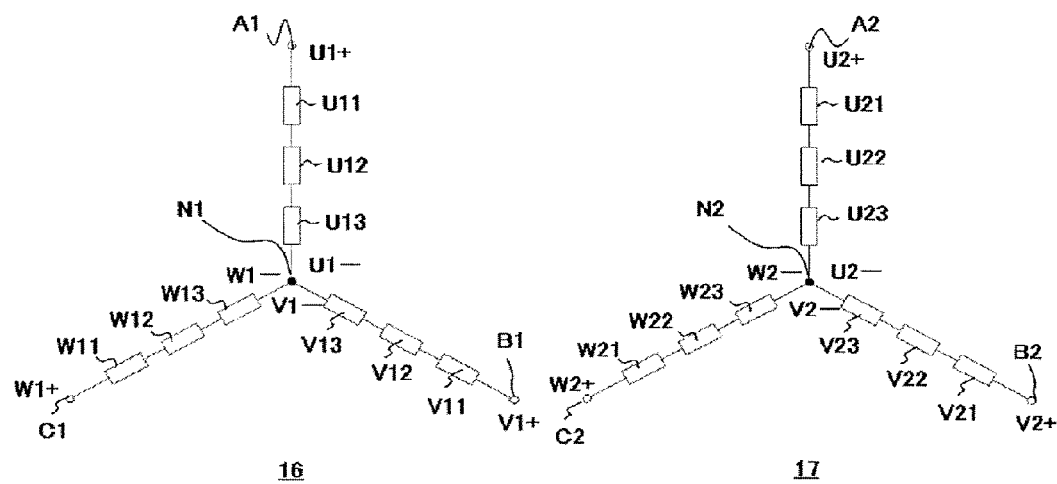
FIG. 9 is a view showing a Y connection of the conventional rotary electric machine.
Figure 10:
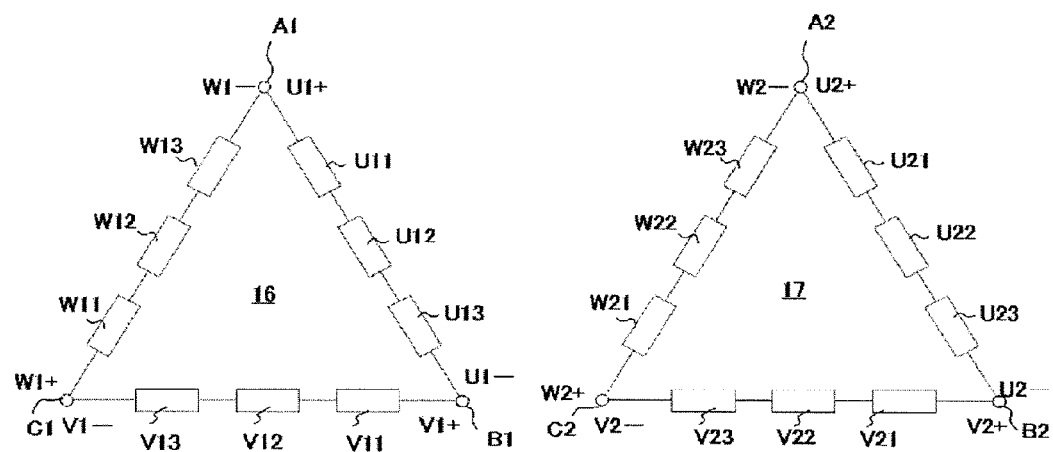
FIG. 10 is a view showing a Δ connection of the conventional rotary electric machine.

Here, as shown in FIG. 9 or FIG. 10, the eighteen armature coils 808 are connected on the outside of a stator core 806 in each of the three phases so as to form a first armature winding 816 and a second armature winding 817.

FIG. 9 is a view showing the Y connection of the conventional rotary electric machine, and FIG. 10 is a view showing the Δ connection of the conventional rotary electric machine. Note that the winding polarities of the armature coils 808 are not shown in FIGS. 9 and 10.

In the first armature winding 816, as shown in FIGS. 9 and 10, the three U phase armature coils 808 numbered U11, U12, and U13 are connected in that order in series, the three V phase armature coils 808 numbered V11, V12, and V13 are connected in that order in series, and the three W phase armature coils 808 numbered W11, W12, and W13 are connected in that order in series.

Further, in the second armature winding 817, the three U phase armature coils 808 numbered U21, U22, and U23 are connected in that order in series, the three V phase armature coils 808 numbered V21, V22, and V23 are connected in that order in series, and the three W phase armature coils 808 numbered W21, W22, and W23 are connected in that order in series.

In the first armature winding 816 shown in FIG. 9, U1+, V1+, and W1+ at respective first ends of U11, V11, and W11 form a terminal A1, a terminal B1, and a terminal C1, respectively, while U1−, V1−, and W1− at respective second ends of U13, V13, and W13 are all connected to each other so as to form a neutral point N1. Thus, the armature coils 808 of the three phases are connected in the Y connection.

Further, in the second armature winding 817, U2+, V2+, and W2 at respective first ends of U21, V21, and W21 form a terminal A2, a terminal B2, and a terminal C2, respectively, while U2−, V2−, and W2− at respective second ends of U23, V23, and W23 are all connected to each other so as to form a neutral point N2. Thus, the armature coils 808 of the three phases are connected in the Y connection.

In the first armature winding 816 shown in FIG. 10, U1+ at a first end of U11 is connected to W1− at a second end of W13 so as to form a terminal A1, V1+ at a first end of V11 is connected to U1− at a second end of U13 so as to form a terminal B1, and W1+ at a first end of W11 is connected to V1− at a second end of V13 so as to form a terminal C1. Thus, the armature coils 808 of the three phases are connected in the Δ connection.

Further, in the second armature winding 817, U2+ at a first end of U21 is connected to W2− at a second end of W23 so as to form a terminal A2, V2+ at a first end of V21 is connected to U2− at a second end of U23 so as to form a terminal B2, and W2+ at a first end of W21 is connected to V2− at a second end of V23 so as to form a terminal C2. Thus, the armature coils 808 of the three phases are connected in the Δ connection.

Further, current vectors of the conventional rotary electric machine 901 are equal to the current phase vectors shown in FIG. 7.

Figure 11A:
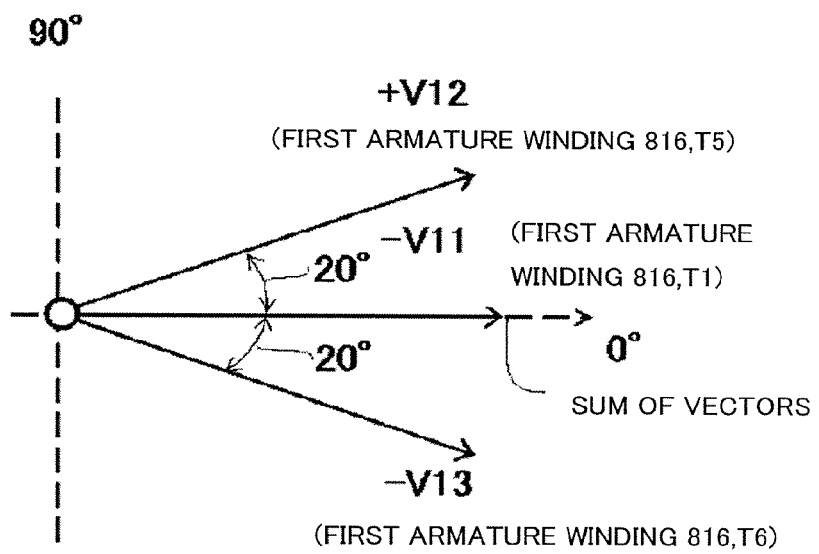
FIG. 11A is a vector diagram showing electromagnetic fields generated in the V phase armature coils wound around the teeth numbered T1, T5, and T6 in a case where a current phase difference of the conventional rotary electric machine is 0°.
Figure 11B:
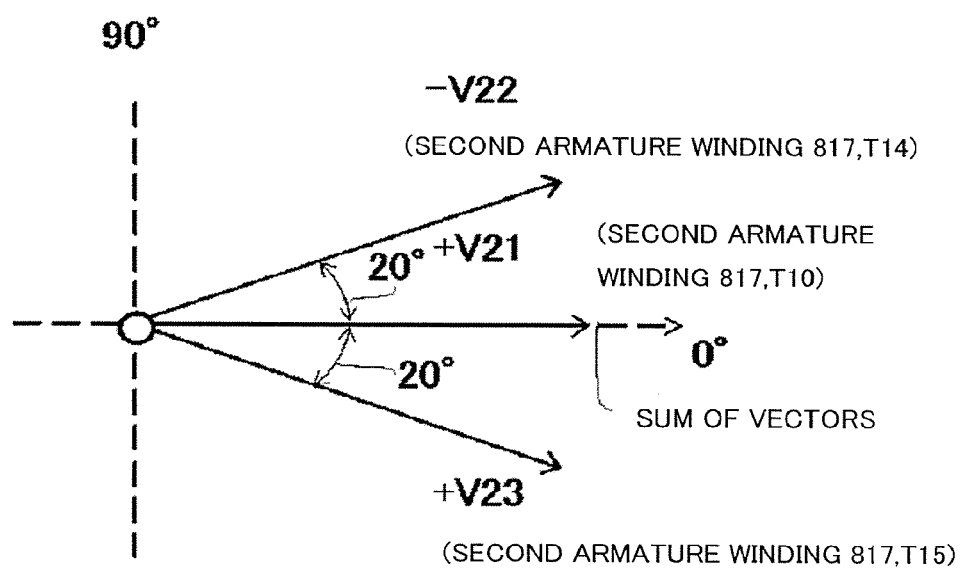
FIG. 11B is a vector diagram showing the electromagnetic fields generated in the V phase armature coils wound around the teeth numbered T10, T14, and T15.

FIG. 11A is a vector diagram showing electromagnetic fields generated in the V phase armature coils wound around the teeth numbered T1, T5, and T6 in a case where the current phase difference of the conventional rotary electric machine is 0°, and FIG. 11B is a vector diagram showing the electromagnetic fields generated in the V phase armature coils wound around the teeth numbered T10, T14, and T15 of the conventional rotary electric machine.

In FIG. 11A, +V12, −V11, and −V13, i.e. the V phase armature coils 808 wound around the teeth 815 numbered T1, T5, and T6, together constitute all of the V phase armature coils 808 of the first armature winding 816.

In FIG. 11B, −V22, +V21, and +V23, i.e. the V phase armature coils 808 wound around the teeth 815 numbered T10, T14, and T15, together constitute all of the V phase armature coils 808 of the second armature winding 817.

Furthermore, it is evident from FIGS. 11A and 11B that when the current phase difference between the currents supplied to the first armature winding 816 and the second armature winding 817 is 0°, equal electromagnetic field vectors are generated respectively in the V phase armature coils 808 of the teeth 815 numbered T1 and T10, the teeth 815 numbered T5 and T14, and the teeth 815 numbered T6 and T15. Therefore, a sum of the electromagnetic field vectors generated in the V phase armature coils 808 of the teeth 815 numbered T1, T5, and T6 is equal to a sum of the electromagnetic field vectors generated in the V phase armature coils 808 of the teeth 815 numbered T10, T14, and T15.

Figure 12A:
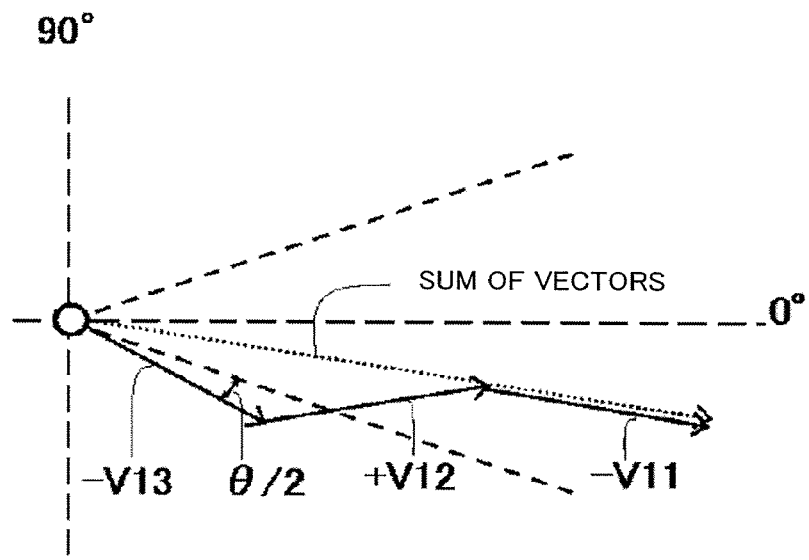
FIG. 12A is a vector diagram showing the electromagnetic fields generated in the V phase armature coils wound around the teeth numbered T1, T5, and T6 in a case where the current phase difference θ of the conventional rotary electric machine is (θ>0°)
Figure 12B:
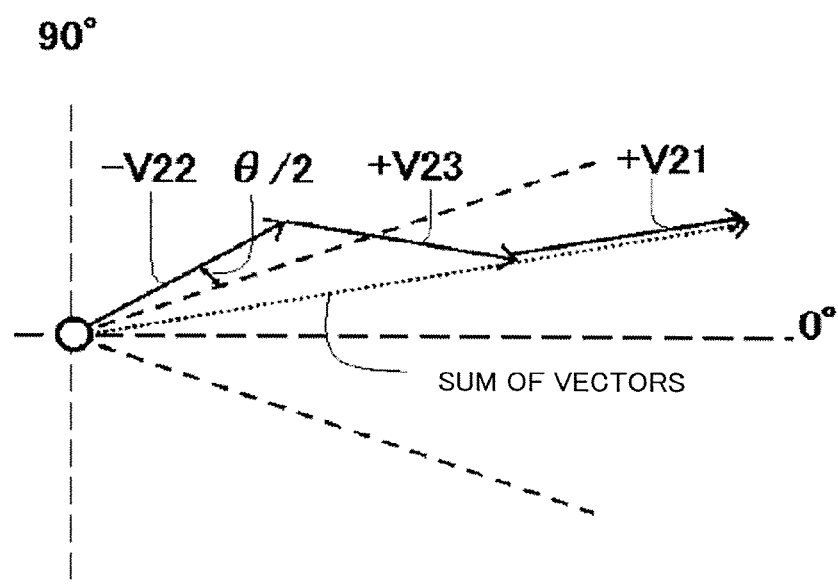
FIG. 12B is a vector diagram showing the electromagnetic fields generated in the V phase armature coils wound around the teeth numbered T10, T14, and T15.

FIG. 12A is a vector diagram showing the electromagnetic fields generated in the V phase armature coils wound around the teeth numbered T1, T5, and T6 in a case where the current phase difference θ exists in the conventional rotary electric machine, and FIG. 12B is a vector diagram showing the electromagnetic fields generated in the V phase armature coils wound around the teeth numbered T10, T14, and T15 in a case where the current phase difference θ exists in the conventional rotary electric machine.

In FIGS. 12A and 12B, when the current phase difference θ exists between the currents supplied to the first armature winding 816 and the second armature winding 817, a sum phase of the electromagnetic field vectors generated in the V phase armature coils 808 of the teeth 815 numbered T1, T5, and T6 differs from a sum phase of the electromagnetic field vectors generated in the V phase armature coils 808 of the teeth 815 numbered T10, T14, and T15. The reason for this, as shown in FIGS. 11A and 11B, is that the armature coils 808 belonging to the first armature winding 816 and the second armature winding 817 are arranged differently at a mechanical angle interval of 180°, or in other words do not exhibit two-fold rotational symmetry about the axial center of a rotor 805. Hence, the sum phases of the electromagnetic field vectors differ from each other by a mechanical angle of 180°, and as a result, the electromagnetic field of the conventional rotary electric machine 901 become unbalanced.

Note that although FIGS. 11A and 11B and FIGS. 12A and 12B show the V phase, the W phase and the U phase respectively differ from the V phase only by an electrical angle of 120°, and relationships between the electromagnetic field vectors within the respective phases are identical.

Figure 13:
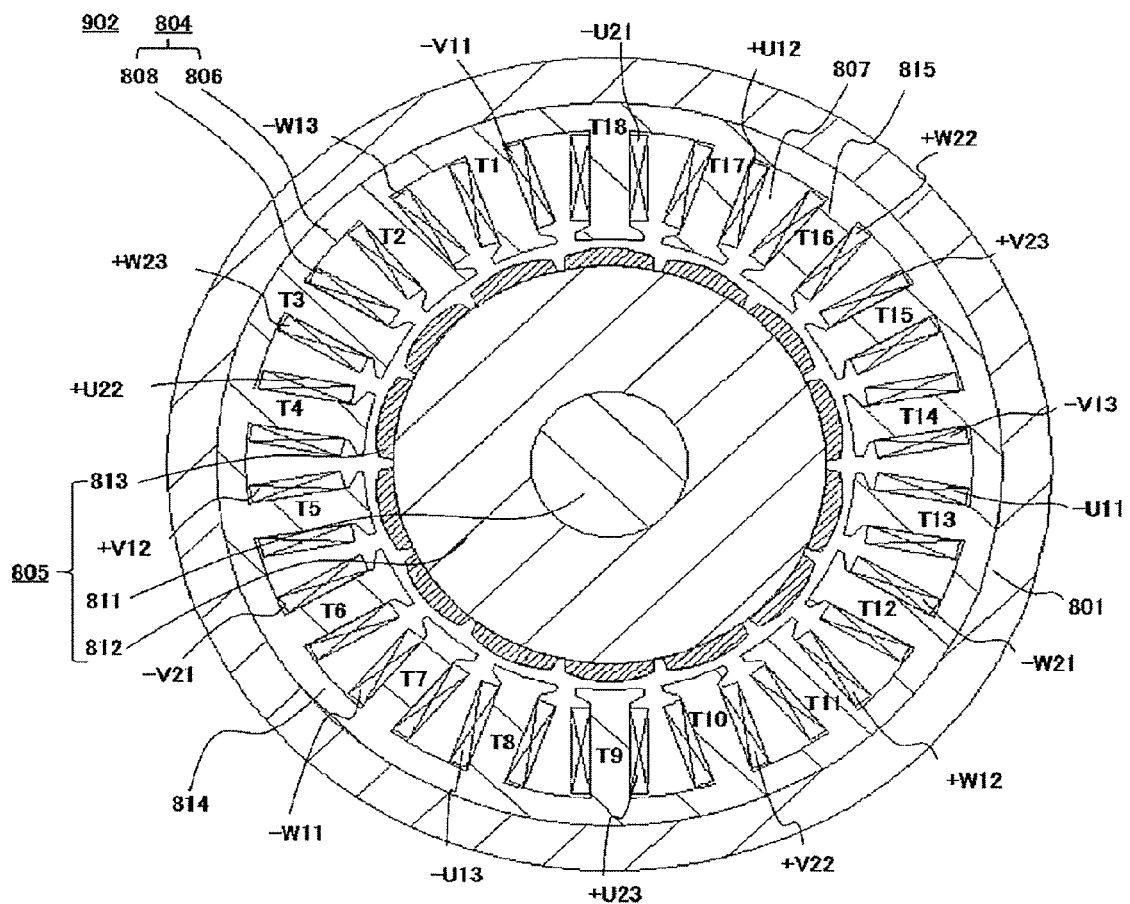
FIG. 13 is a sectional view showing a conventional rotary electric machine.

FIG. 13 is a sectional view showing a conventional rotary electric machine 902 configured differently to the conventional example shown in FIG. 8.

The armature coils 808 are divided into armature coils 808 belonging to a U phase, a V phase, and a W phase, each of which represents one of three phases. The U phase is constituted by six armature coils 808 numbered −U11, +U12, −U13, −U21, +U22, and +U23, the V phase is constituted by six armature coils 808 numbered −V11, +V12, −V13, −V21, +V22, and +V23, and the W phase is constituted by six armature coils 808 numbered −W11, +W12, −W13, −W21, +W22, and +W23.

Further, as shown in FIG. 13, the eighteen armature coils 808 are arranged in order of −V11, −W13, +W23, +U22, +V12, −V21, −W11, −U13, +U23, +V22, +W12, −W21, −U11, −V13, +V23, +W22, +U12, and −U21 so as to correspond respectively to the teeth 815 numbered T1 to T18. Note that "+" and "−" represent the different winding polarities of the armature coils 808.

Here, as shown in FIG. 9 or FIG. 10, the eighteen armature coils 808 are connected on the outside of the stator core 806 in each of the three phases so as to form the first armature winding 816 and the second armature winding 817. As shown in FIGS. 9 and 10, the first armature winding 816 and the second armature winding 817 are respectively connected by connecting the armature coils 808 of the three phases in either the Y connection or the Δ connection.

Further, the current vectors in the first and second armature windings 816, 817 of the conventional rotary electric machine 902 are equal to the current phase vectors shown in FIG. 7.

Figure 14A:
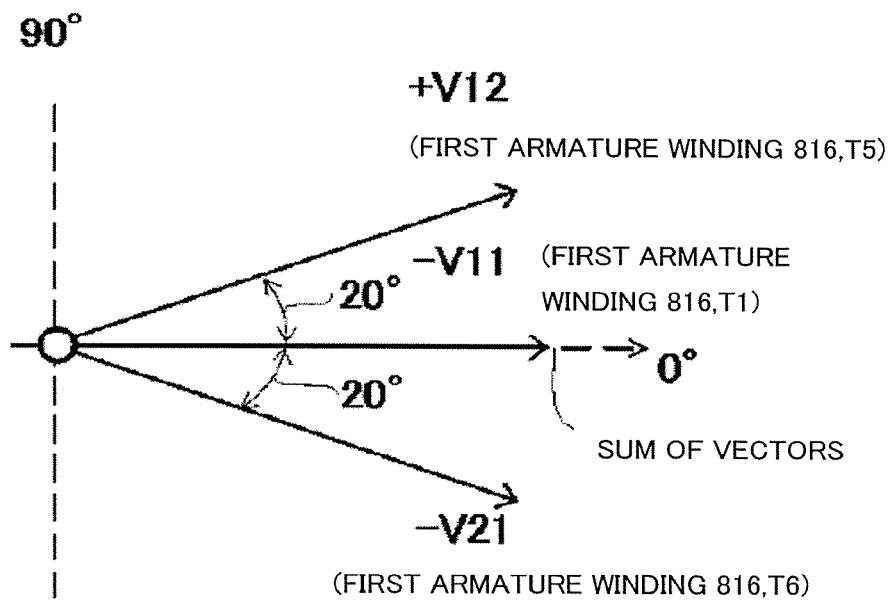
FIG. 14A is a vector diagram showing the electromagnetic fields generated in the V phase armature coils wound around the teeth numbered T1, T5, and T6 in a case where the current phase difference θ of the conventional rotary electric machine is 0°.
Figure 14B:
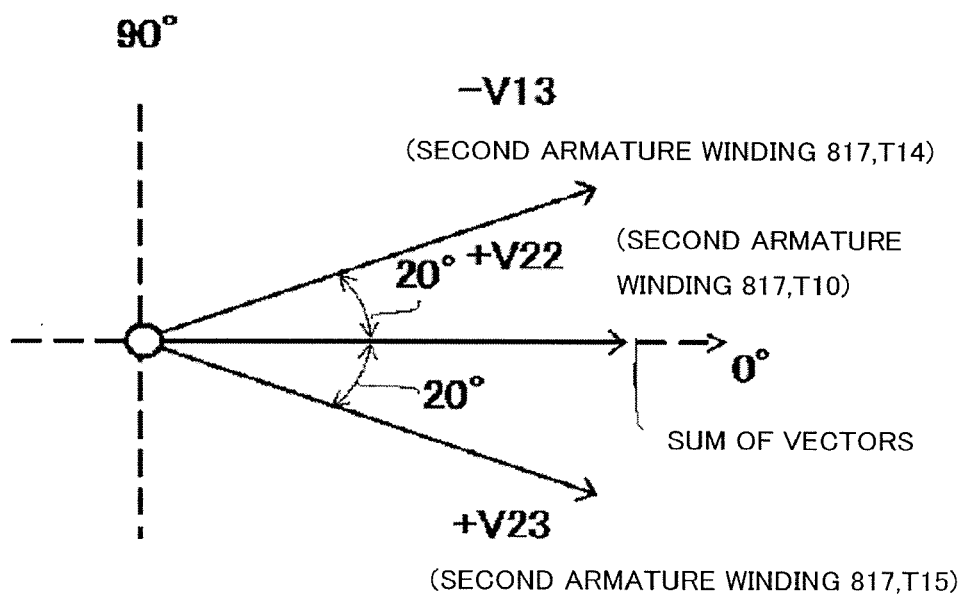
FIG. 14B is a vector diagram showing the electromagnetic fields generated in the V phase armature coils wound around the teeth numbered T10, T14, and T15.

FIG. 14A is a vector diagram showing the electromagnetic fields generated in the V phase armature coils wound around the teeth numbered T1, T5, and T6 in a case where the current phase difference θ of the conventional rotary electric machine is 0°, and FIG. 14B is a vector diagram showing the electromagnetic fields generated in the V phase armature coils wound around the teeth numbered T10, T14, and T15 in a case where the current phase difference θ of the conventional rotary electric machine is 0°.

In FIG. 14A, +V12 and −V11 among the V phase armature coils 808 wound around the teeth 815 numbered T1, T5, and T6 constitute a part of the V phase armature coils 808 of the first armature winding 816, while −V21 constitutes a part of the V phase armature coils 808 of the second armature winding 817.

In FIG. 14B, −V13 among the V phase armature coils 808 wound around the teeth 815 numbered T10, T14, and T15 constitutes a part of the V phase armature coils 808 of the first armature winding 816, while +V22 and +V23 constitute a part of the V phase armature coils 808 of the second armature winding 817.

Furthermore, it is evident from FIGS. 14A and 14B that when the current phase difference between the currents supplied to the first armature winding 816 and the second armature winding 817 is 0°, equal electromagnetic field vectors are generated respectively in the V phase armature coils 808 of the teeth 815 numbered T1 and T10, the teeth 815 numbered T5 and T14, and the teeth 815 numbered T6 and T15. Therefore, the sum of the electromagnetic field vectors generated in the V phase armature coils 808 of the teeth 815 numbered T1, T5, and T6 is equal to the sum of the electromagnetic field vectors generated in the V phase armature coils 808 of the teeth 815 numbered T10, T14, and T15.

Figure 15A:
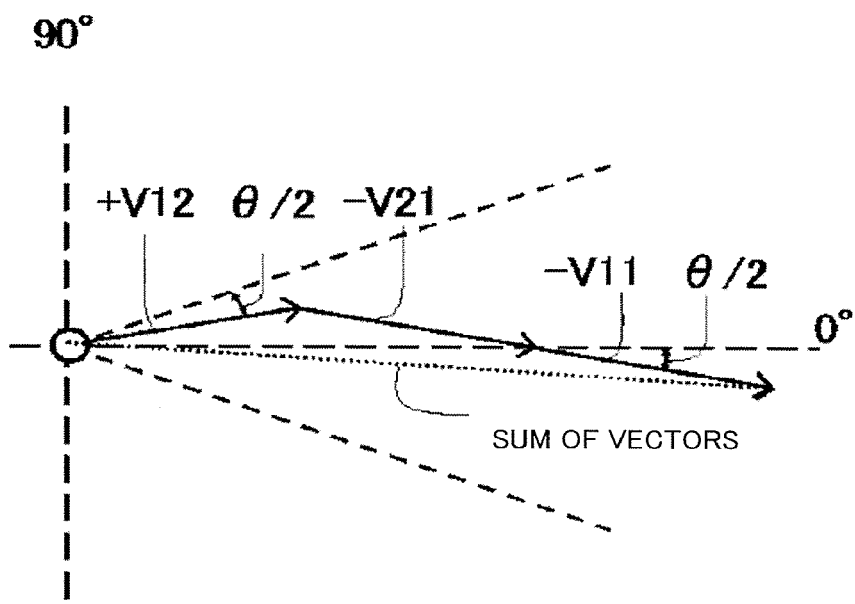
FIG. 15A is a vector diagram showing the electromagnetic fields generated in the V phase armature coils wound around the teeth numbered T1, T5, and T6 in a case where the current phase difference θ exists in the conventional rotary electric machine.
Figure 15B:
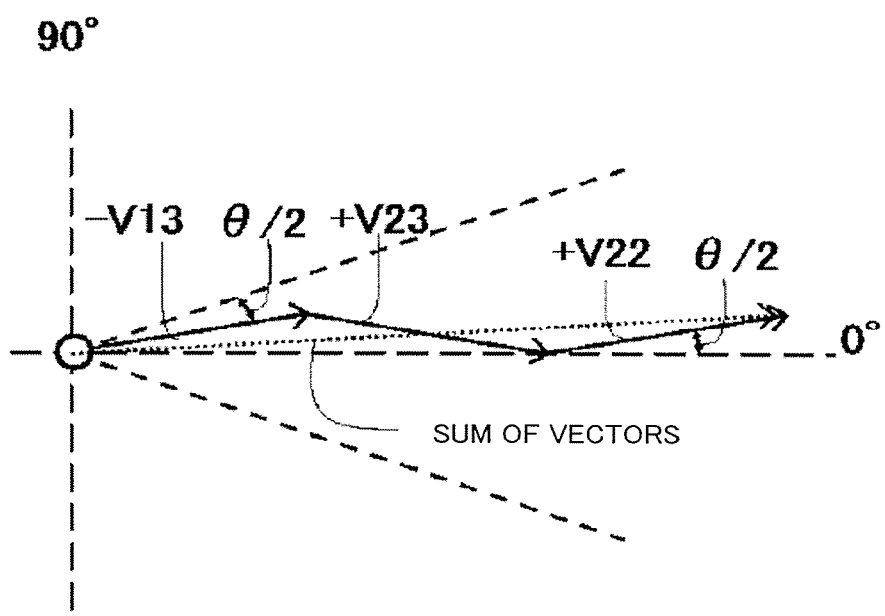
FIG. 15B is a vector diagram showing the electromagnetic fields generated in the V phase armature coils wound around the teeth numbered T10, T14, and T15.

FIG. 15A is a vector diagram showing the electromagnetic fields generated in the V phase armature coils wound around the teeth numbered T1, T5, and T6 in a case where the current phase difference θ exists in the conventional rotary electric machine, and FIG. 15B is a vector diagram showing the electromagnetic fields generated in the V phase armature coils wound around the teeth numbered T10, T14, and T15 in a case where the current phase difference θ exists in the conventional rotary electric machine.

In FIGS. 15A and 15B, when the current phase difference θ exists between the currents supplied to the first armature winding 816 and the second armature winding 817, the sum phase of the electromagnetic field vectors generated in the V phase armature coils 808 of the teeth 815 numbered T1, T5, and T6 differs from the sum phase of the electromagnetic field vectors generated in the V phase armature coils 808 of the teeth 815 numbered T10, T14, and T15. The reason for this, as shown in FIGS. 14A and 14B, is that the armature coils 808 belonging to the first armature winding 816 and the second armature winding 817 are arranged differently at a mechanical angle interval of 180°, or in other words do not exhibit two-fold rotational symmetry about the axial center of the rotor 805. Hence, the sum phases of the electromagnetic field vectors differ from each other by a mechanical angle of 180°, and as a result, the electromagnetic field of the conventional rotary electric machine 902 becomes unbalanced.

Note that although FIGS. 14A and 14B and FIGS. 15A and 15B show the V phase, the W phase and the U phase respectively differ from the V phase only by an electrical angle of 120°, and relationships between the electromagnetic field vectors within the respective phases are identical.

Hence, it can be seen that in the example configurations of the two conventional rotary electric machines 901 and 902, the electromagnetic field is unbalanced.

Further, even when the armature coils 808 are arranged in a different arrangement to the example configurations of the two conventional rotary electric machines 901 and 902 shown in FIGS. 8 and 13, the conventional rotary electric machines 901 and 902 respectively include the eighteen teeth 815 and the eighteen armature coils 808 wound by concentrated winding around the respective teeth 815 and arranged at mechanical angle periods of 180°, and therefore the electromagnetic fields thereof are unbalanced. The reason for this is that when the armature coils 808 of the respective phases belonging to the first armature winding 816 and the second armature winding 817 are differentiated, the armature coils 808 are arranged at mechanical angle periods of 180°, or in other words do not exhibit two-fold rotational symmetry about the axial center of the rotor 805.

The reasons noted above will now be described further. In the conventional rotary electric machines 901 and 902, when the armature coils 808 of the respective phases belonging to the first armature winding 816 and the second armature winding 817 are configured identically, the armature coils 808 are arranged so as to exhibit two-fold rotational symmetry about the axial center of the rotor 805.

Further, when the current phase difference between the currents supplied to the first armature winding 816 and the second armature winding 817 is 0°, currents of the same phase have identical phases, and therefore the armature coils 808 of each phase belonging to the first armature winding 816 and the second armature winding 817 may be considered identical. Accordingly, the armature coils 808 are arranged in two-fold rotational symmetry, and as a result, the electromagnetic fields generated in the six armature coils 808 of each phase do not become unbalanced.

When the current phase difference θ exists between the currents supplied to the first armature winding 816 and the second armature winding 817, on the other hand, the armature coils 808 of each phase belonging to the first armature winding 816 and the second armature winding 817 cannot be considered identical. Therefore, currents having six different phases (the three phases×the two current phases) are supplied to the armature coils 808 wound respectively around the three teeth 815. When the current phase difference θ exists, the number of armature coils 808 through which the currents of the six phases pass, i.e. three, cannot be divided by two, and therefore the armature coils 808 are not arranged in two-fold rotational symmetry. As a result, the electromagnetic fields generated in the six armature coils 808 of each of the three phases are unbalanced.

Note that in a spatial distribution of the air gap between the rotor 805 and a stator 804 over a single mechanical angle revolution, the spatial order of the unbalanced electromagnetic field is the first order, which is lower than the second order, i.e. the spatial order of the electromagnetic field generated in two-fold rotational symmetry. Therefore, vibration caused by the electromagnetic field increases.

Further, a case in which eighteen teeth 815 are provided was described above, but needless to mention, a similar problem arises when 18 n (where n is an integer no smaller than 1) teeth 815 are provided.

As described above, when the current phase difference θ exists between the currents supplied to the first armature winding 816 and the second armature winding 817, the electromagnetic fields generated in the armature coils 808 become unbalanced, with the result that an electromagnetic field component generated in the air gap between the rotor 805 and the stator 804 deviates from a desired circumferential direction control position of the rotor 805 in the conventional rotary electric machines 901 and 902. When the electromagnetic field component deviates from the circumferential direction control position, increases occur in the torque ripple of the conventional rotary electric machines 901 and 902 and the electromagnetic excitation force generated in the stator core 806, leading to increases in vibration and noise.

Furthermore, when the electromagnetic field component deviates from the circumferential direction control position, a reduction in torque occurs.

Moreover, when the current phase difference θ occurs between the currents supplied to the first armature winding 816 and the second armature winding 817 due to effects from a manufacturing error, noise input into the ECU, and so on, the electromagnetic field likewise becomes unbalanced, as described above, leading to increases in vibration and noise and a reduction in torque in the conventional rotary electric machines 901 and 902.

Effects obtained with the rotary electric machine 101 according to this embodiment will now be described.

Figure 16A:
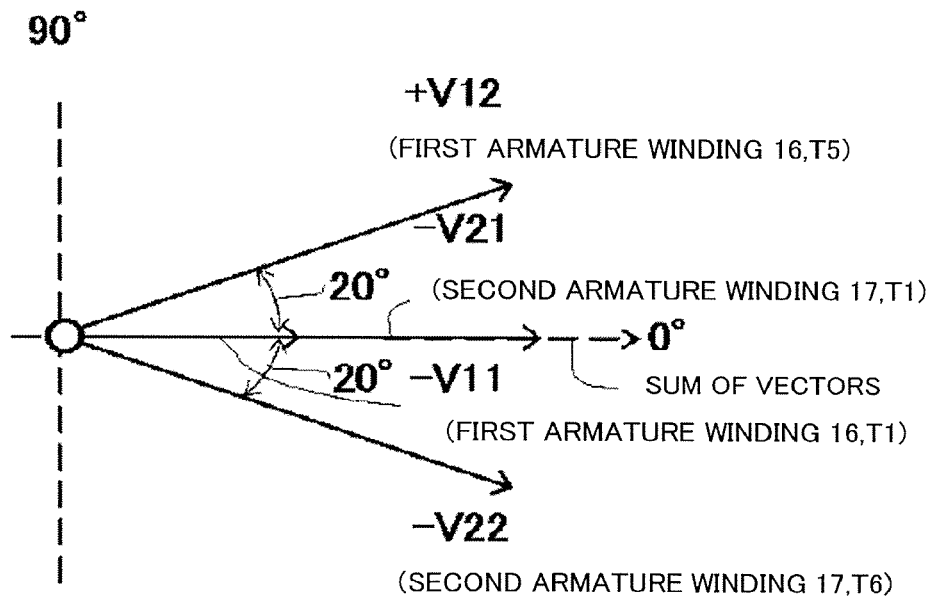
FIG. 16A is a vector diagram showing the electromagnetic fields generated in the V phase armature coils wound around the teeth numbered T1, T5, and T6 in a case where the current phase difference θ of the rotary electric machine according to the first embodiment of this invention is 0°.
Figure 16B:
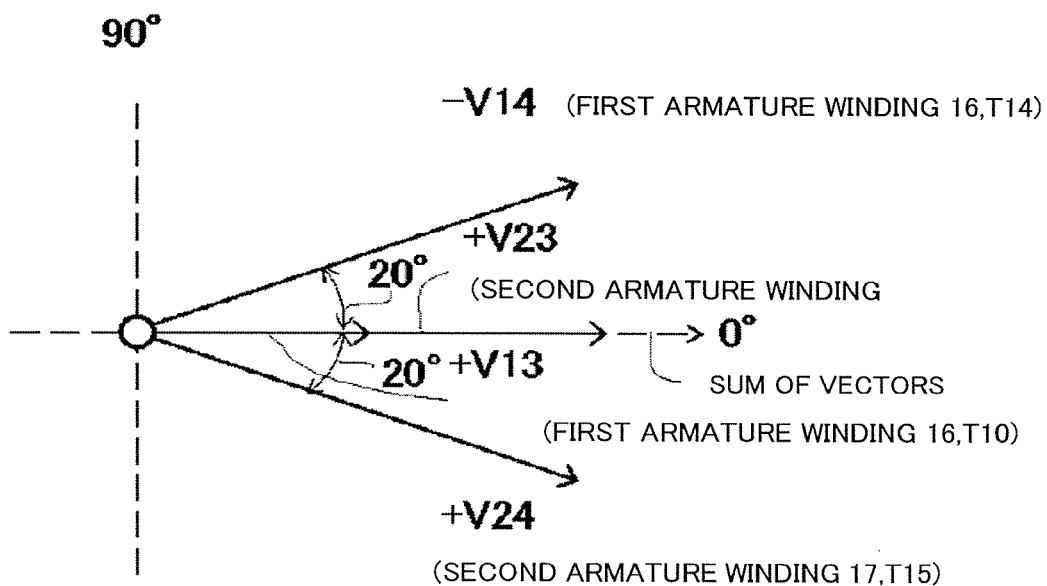
FIG. 16B is a vector diagram showing the electromagnetic fields generated in the V phase armature coils wound around the teeth numbered T10, T14, and T15.

FIG. 16A is a vector diagram showing the electromagnetic fields generated in the V phase armature coils wound around the teeth numbered T1, T5, and T6 in a case where the current phase difference θ of the rotary electric machine according to this embodiment is 0°, and FIG. 16B is a vector diagram showing the electromagnetic fields generated in the V phase armature coils wound around the teeth numbered T10, T14, and T15 in a case where the current phase difference θ of the rotary electric machine according to this embodiment is 0°.

In FIG. 16A, +V12 and −V11 among the V phase armature coils 8 wound around the teeth 15 numbered T1, T5, and T6 constitute a part of the V phase armature coils 8 of the first armature winding 16, while −V21 and −V22 constitute a part of the V phase armature coils 8 of the second armature winding 17.

In FIG. 16B, +V13 and −V14 among the V phase armature coils 8 wound around the teeth 15 numbered T10, T14, and T15 constitute a part of the V phase armature coils 8 of the first armature winding 16, while +V23 and +V24 constitute a part of the V phase armature coils 8 of the second armature winding 17.

Further, it is evident from FIGS. 16A and 16B that when the current phase difference between the currents supplied to the first armature winding 16 and the second armature winding 17 is 0°, equal electromagnetic field vectors are generated respectively in the V phase armature coils 8 of the teeth 15 numbered T1 and T10, the teeth 15 numbered T5 and T14, and the teeth 15 numbered T6 and T15. Therefore, when the current phase difference between the currents supplied to the first armature winding 16 and the second armature winding 17 is 0°, the sum of the electromagnetic field vectors generated in the V phase armature coils 8 of the teeth 15 numbered T1, T5, and T6 is equal to the sum of the electromagnetic field vectors generated in the V phase armature coils 8 of the teeth 15 numbered T10, T14, and T15.

Figure 17A:
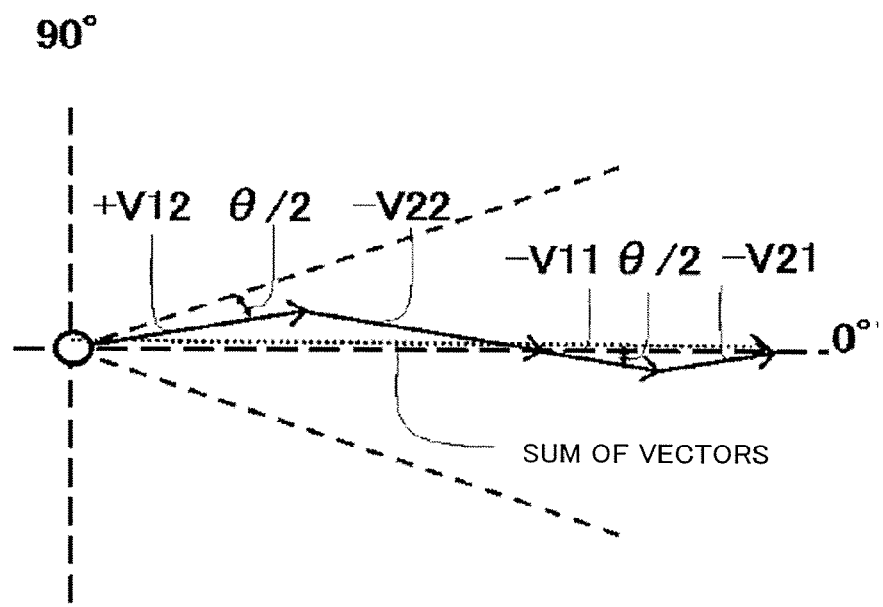
FIG. 17A is a vector diagram showing the electromagnetic fields generated in the V phase armature coils wound around the teeth numbered T1, T5, and T6 in a case where the current phase difference θ exists in the rotary electric machine according to the first embodiment of this invention.
Figure 17B:
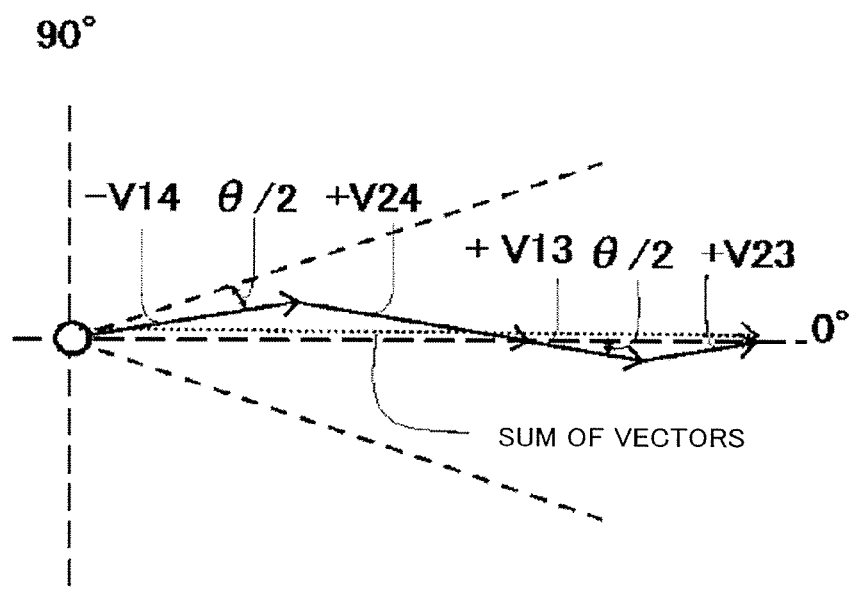
FIG. 17B is a vector diagram showing the electromagnetic fields generated in the V phase armature coils wound around the teeth numbered T10, T14, and T15.

FIG. 17A is a vector diagram showing the electromagnetic fields generated in the V phase armature coils wound around the teeth numbered T1, T5, and T6 in a case where the current phase difference θ exists in the rotary electric machine according to this embodiment, and FIG. 17B is a vector diagram showing the electromagnetic fields generated in the V phase armature coils wound around the teeth numbered T10, T14, and T15 in a case where the current phase difference θ exists in the rotary electric machine according to this embodiment.

It is evident from FIGS. 17A and 17B that when the current phase difference θ exists between the currents supplied to the first armature winding 16 and the second armature winding 17, the sum of the electromagnetic field vectors generated in the V phase armature coils 8 of the teeth 15 numbered T1, T5, and T6 is equal to the sum of the electromagnetic field vectors generated in the V phase armature coils 8 of the teeth 15 numbered T10, T14, and T15. The reason for this, as shown in FIGS. 16A and 16B, is that the armature coil bodies 18 belonging to the first armature winding 16 and the second armature winding 17 are arranged identically at a mechanical angle interval of 180°, or in other words exhibit two-fold rotational symmetry about the axial center of the rotor 5. Hence, the electromagnetic field of the rotary electric machine 101 does not become unbalanced.

Note that although FIGS. 16A and 16B and FIGS. 17A and 17B show the V phase, the W phase and the U phase respectively differ from the V phase only by an electrical angle of 120°, and relationships between the electromagnetic field vectors within the respective phases are identical.

Here, the electromagnetic field vector diagrams of the conventional rotary electric machines and the rotary electric machine according to this embodiment will be compared. In the conventional rotary electric machines 901 and 902, as shown in FIGS. 11A and 11B and FIGS. 14A and 14B, the armature coils 808 belonging to the first armature winding 816 and the second armature winding 817 are not arranged so as to exhibit two-fold rotational symmetry about the axial center of the rotor 805. In the rotary electric machine 101 according to this embodiment, on the other hand, as shown in FIGS. 16A and 16B, the armature coil bodies 18 belonging to the first armature winding 16 and the second armature winding 17 are arranged so as to exhibit two-fold rotational symmetry about the axial center of the rotor 5.

Hence, when the current phase difference θ exists between the currents supplied to the first armature winding 816 and the second armature winding 817 in the conventional rotary electric machines 901 and 902, as shown in FIGS. 12A and 12B and FIGS. 15A and 15B, the sum phase of the electromagnetic field vectors generated in the V phase armature coils 808 of the teeth 815 numbered T1, T5, and T6 differs from the sum phase of the electromagnetic field vectors generated in the V phase armature coils 808 of the teeth 815 numbered T10, T14, and T15. When the current phase difference θ exists between the currents supplied to the first armature winding 16 and the second armature winding 17 in the rotary electric machine 101 according to this embodiment, on the other hand, as shown in FIGS. 17A and 17B, the sum of the electromagnetic field vectors generated in the V phase armature coils 8 of the teeth 15 numbered T1, T5, and T6 is equal to the sum of the electromagnetic field vectors generated in the V phase armature coils 8 of the teeth 15 numbered T10, T14, and T15.

Hence, the rotary electric machine 101 according to this embodiment includes the stator 4 having the stator core 6 that includes the 18 n (where n is an integer no smaller than 1) teeth 15 and the plurality of armature coil bodies 18 in which at least one of the first armature winding 16 and the second armature winding 17 is wound around each of the plurality of teeth 15, and the respective armature coil bodies 18 numbered Ua, Va, Wa, Ub, Vb, Wb, Uc, Vc, and Wc are arranged so as to exhibit 2 n-fold rotational symmetry about the axial center of the rotor. Therefore, even when the current phase difference θ exists between the currents supplied to the first armature winding 16 and the second armature winding 17, the electromagnetic fields generated in the armature coils 8 do not become unbalanced. Accordingly, the electromagnetic field component in the air gap between the rotor 5 and the stator 4 does not deviate from the desired circumferential direction control position of the rotor 5 of the rotary electric machine 101, and therefore increases in the torque ripple of the rotary electric machine 101 and the electromagnetic excitation force generated in the stator core 6 can be suppressed. As a result, increases in vibration and noise can be suppressed.

Moreover, since the electromagnetic field component does not deviate from the circumferential direction control position, a torque reduction can also be suppressed.

The electromagnetic field does not become unbalanced, as described above, even when the current phase difference θ occurs between the currents supplied to the first armature winding 16 and the second armature winding 17 due to effects from a manufacturing error, noise input into the ECU 111, and so on, and therefore increases in vibration and noise and a reduction in torque in the rotary electric machine 101 can be suppressed.

Further, as shown in FIGS. 17A and 17B, as long as the respective armature coil bodies 18 numbered Ua, Va, Wa, Ub, Vb, Wb, Uc, Vc, and Wc are arranged in 2 n-fold rotational symmetry about the axial center of the rotor, the electromagnetic fields generated in the armature coils 8 do not become unbalanced even when the respective electrical angle phases of Ua, Va, and Wa do not take the second smallest value.

Meanwhile, a phase difference of θ occurs in a similar manner to FIGS. 17A and 17B between the electrical angle phases of the 2 n armature coils 8 constituting each of Ua, Va, and Wa due to the current phase difference θ. Balance is achieved only by the electromagnetic field vectors generated in the two armature coils 8 constituting each of Ua, Va, and Wa, and therefore, by setting the respective electrical angle phases of Ua, Va, and Wa to take the second smallest value among the three armature coil bodies 18 of the same phase within the minimum unit of rotational symmetry, a deviation corresponding to the phase difference θ in the electromagnetic field component generated in the air gap between the rotor 5 and the stator 4 within the minimum unit of rotational symmetry can be reduced. As a result, the torque reduction and torque ripple increase caused by the current phase difference θ can be suppressed further than when the respective electrical angle phases of Ua, Va, and Wa do not take the second smallest value.

Next, a manner in which a similar effect to FIG. 17 is obtained in a case where the stator core 6 includes 6 (2 m+k)×n (where k, n, and m are integers no smaller than 1) teeth 15 will be described.

The armature coil bodies 18 numbered Ua, Va, Wa, which are formed by winding two armature coils 8 belonging respectively to the first armature winding 16 and the second armature winding 17, are constituted by 6 k×n armature coil bodies 18, i.e. 2 k×n armature coil bodies 18 each.

The armature coil bodies 18 numbered Ub, Vb, Wb, which are formed by winding one armature coil 8 belonging to the first armature winding 16, are constituted by 6 m×n armature coil bodies 18, i.e. 2 m×n armature coil bodies 18 each.

Further, the armature coil bodies 18 numbered Uc, Vc, Wc, which are formed by winding one armature coil 8 belonging to the second armature winding 17, are constituted by 6 m×n armature coil bodies 18, i.e. 2 m×n armature coil bodies 18 each.

Likewise with this configuration, when the current phase difference θ exists between the currents supplied to the first armature winding 16 and the second armature winding 17, currents having six different phases (the three phases×the two current phases) are supplied to the armature coil bodies 18 wound respectively around the (2 m+k)×n teeth 15. By dividing the k×n armature coil bodies 18 of each of the six phases constituting the armature coil bodies Ua, Va, and Wa equally between the 2 k×n armature coils 8, the number of armature coils 8 of each of the six phases is (2 m+2 k)×n, and therefore the armature coil bodies 18 can be divided by two. Hence, the armature coil bodies 18 numbered Ua, Va, Wa, Ub, Vb, Wb, Uc, Vc, and Wc can be arranged in 2 n-fold rotational symmetry about the axial center of the rotor, and therefore the electromagnetic fields generated in the armature coils 8 do not become unbalanced. Accordingly, the electromagnetic field component in the air gap between the rotor 5 and the stator 4 does not deviate from the desired circumferential direction control position of the rotor 5 of the rotary electric machine 101, and therefore increases in the torque ripple of the rotary electric machine 101 and the electromagnetic excitation force generated in the stator core 6 can be suppressed. As a result, increases in vibration and noise can be suppressed.

Moreover, since the electromagnetic field component does not deviate from the circumferential direction control position, a torque reduction can also be suppressed.

The electromagnetic field does not become unbalanced, as described above, even when the current phase difference θ occurs between the currents supplied to the first armature winding 16 and the second armature winding 17 due to effects from a manufacturing error, noise input into the ECU 111, and so on, and therefore increases in vibration and noise and a reduction in torque in the rotary electric machine 101 can be suppressed.

Further, as shown in FIGS. 17A and 17B, as long as the respective armature coil bodies 18 numbered Ua, Va, Wa, Ub, Vb, Wb, Uc, Vc, and Wc are arranged in 2 n-fold rotational symmetry about the axial center of the rotor, the electromagnetic fields generated in the armature coils 8 do not become unbalanced even when the respective electrical angle phases of Ua, Va, and Wa do not take a value no smaller than an $(m+1)^{th}$ smallest value and no larger than an $(m+k)^{th}$ smallest value.

Meanwhile, a phase difference of θ occurs in a similar manner to FIGS. 17A and 17B between the electrical angle phases of the 2 n armature coils 8 constituting each of Ua, Va, and Wa due to the current phase difference θ. Balance is achieved only by the electromagnetic field vectors generated in the two armature coils 8 constituting each of Ua, Va, and Wa, and therefore, by setting the respective electrical angle phases of Ua, Va, and Wa to take a value no smaller than the $(m+1)^{th}$ smallest value and no larger than the $(m+k)^{th}$ smallest value among the (2 m+k) armature coil bodies 18 of the same phase within the minimum unit of rotational symmetry, a deviation corresponding to the phase difference θ in the electromagnetic field component generated in the air gap between the rotor 5 and the stator 4 within the minimum unit of rotational symmetry can be reduced. As a result, the torque reduction and torque ripple increase caused by the current phase difference θ can be suppressed further than when the respective electrical angle phases of Ua, Va, and Wa do not take a value no smaller than the $(m+1)^{th}$ smallest value and no larger than the $(m+k)^{th}$ smallest value.

Figure 18:
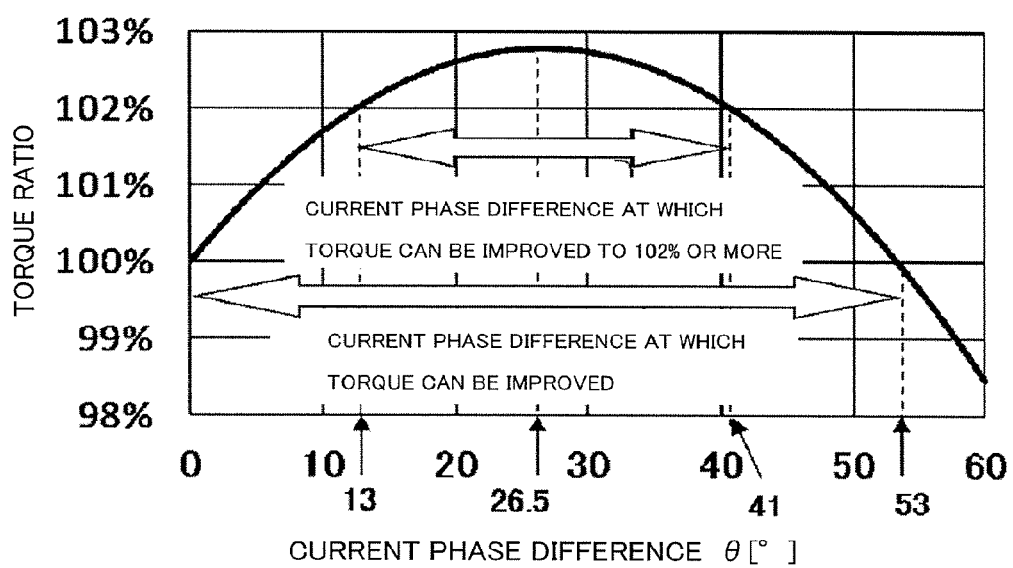
FIG. 18 is a view showing a relationship between the current phase difference θ and a torque ratio of the rotary electric machine according to the first embodiment of this invention.

FIG. 18 is a view showing a relationship between the current phase difference θ and a torque ratio of the rotary electric machine according to this embodiment. The abscissa of FIG. 18 shows the current phase difference θ between the currents supplied to the first armature winding 16 and the second armature winding 17, while the ordinate of FIG. 18 shows the torque ratio in a case where the torque at a current phase difference of 0° is set as 100%. In FIG. 18, by setting the current phase difference θ at 0°<θ≤53°, the torque of the rotary electric machine 101 can be improved in comparison with a case where the current phase difference is 0°. More preferably, by setting the current phase difference θ in the vicinity of 26.5°, or in other words at 13°≤θ≤41°, the torque can be improved to 102% or more.

The reason for this is that the phase of the current supplied from the second inverter 66 to the second armature winding 17 is advanced by the current phase difference θ relative to the phase of the current supplied from the first inverter 65 to the first armature winding 16, while Ub, Vb, and Wb are the armature coil bodies 18 having the most advanced electrical angle phase among the armature coil bodies 18 of the same phase within the minimum unit of rotational symmetry, and Uc, Vc, and Wc are the armature coil bodies 18 having the most retarded electrical angle phase among the armature coil bodies 18 of the same phase within the minimum unit of rotational symmetry. According to this configuration, as shown in FIGS. 17A and 17B, the sum of the electromagnetic field vectors is larger when the current phase difference θ is within the range of 0°<θ≤53° than when the current phase difference is 0°. As a result, the torque improvement effect shown in FIG. 18 is obtained.

Figure 19:
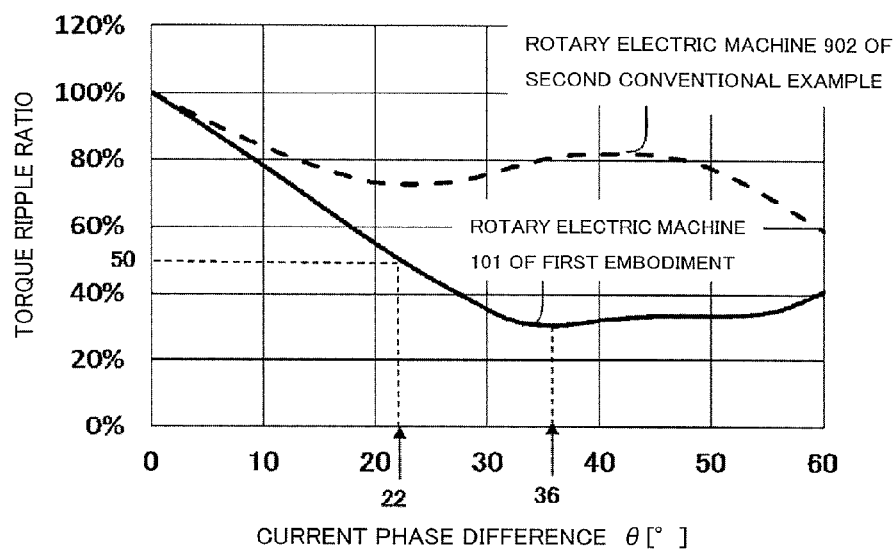
FIG. 19 is a view showing a relationship between the current phase difference θ and a torque ripple ratio of the rotary electric machine according to the first embodiment of this invention.

FIG. 19 is a view showing a relationship between the current phase difference θ and a torque ripple ratio of the rotary electric machine according to this embodiment. The abscissa of FIG. 19 shows the current phase difference θ between the currents supplied to the first armature winding 16 and the second armature winding 17, while the ordinate in FIG. 19 shows the torque ripple ratio in a case where the torque ripple at a current phase difference of 0° is set as 100%. In FIG. 19, by setting the current phase difference θ at 0°<θ≤60°, the torque ripple can be reduced in comparison with a case where the current phase difference is 0°. More preferably, by setting the current phase difference θ in the vicinity of 36°, or in other words at 22°≤θ≤60°, the torque ripple can be reduced to 50% or lower.

FIG. 19 also shows the torque ripple of the conventional rotary electric machine 902 shown in FIG. 11. It can be seen that in this embodiment, the torque ripple is smaller than that of the conventional rotary electric machine 902 at the same current phase difference θ. Further, comparing FIG. 12 with FIG. 15, the phase deviation in the sum of the electromagnetic field vectors of the conventional rotary electric machine 901 is larger than that of the conventional rotary electric machine 902 at the same current phase difference θ, and therefore the torque ripple of the conventional rotary electric machine 901 is larger than that of the conventional rotary electric machine 902. Hence, in this embodiment, the torque ripple can be reduced in comparison with both of the conventional rotary electric machines 901 and 902.

Figure 20:
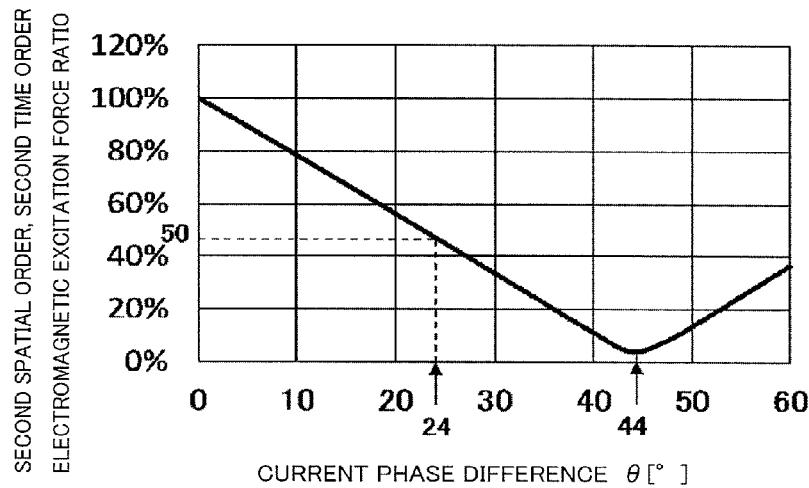
FIG. 20 is a view showing a relationship between the current phase difference θ and an electromagnetic excitation force ratio of the rotary electric machine according to the first embodiment of this invention.

FIG. 20 is a view showing a relationship between the current phase difference θ and an electromagnetic excitation force ratio of the rotary electric machine according to this embodiment. The abscissa of FIG. 20 shows the current phase difference θ between the currents supplied to the first armature winding 16 and the second armature winding 17, while the ordinate in FIG. 20 shows a second spatial order, second time order electromagnetic excitation force ratio in a case where a second spatial order, second time order electromagnetic excitation force at a current phase difference of 0° is set as 100%. It can be seen from FIG. 20 that by setting the current phase difference θ at 0°<θ≤60°, the electromagnetic excitation force generated in the stator core 6 can be reduced in comparison with a case where the current phase difference is 0°. Further, by setting the current phase difference θ in the vicinity of 44.0°, or in other words at 24°≤θ≤60°, the second spatial order, second time order electromagnetic excitation force generated in the stator core 6 can be reduced to 50% or lower, and by setting the current phase difference θ at 44.0°, the second spatial order, second time order electromagnetic excitation force can be reduced substantially to zero.

By setting the current phase difference θ at 0°<θ≤53° in accordance with the results shown in FIGS. 18 to 20, the torque ripple and the electromagnetic excitation force generated in the stator core 6 can be reduced while improving the torque, and as a result, vibration and noise in the rotary electric machine 101 can be reduced. To reduce the torque ripple and the electromagnetic excitation force generated in the stator core 6 while improving the torque even further, the current phase difference θ is preferably set at 26.5°<θ≤44.0°.

Further, the permanent magnets 13 are provided as the field poles, but a reluctance type rotary electric machine not employing the permanent magnets 13 may be used instead, in which case field poles are formed by winding windings around the rotor core 12 and passing a current therethrough.

Furthermore, the respective numbers of turns in the armature coil bodies 18 numbered Ua, Va, Wa, Ub, Vb, Wb, Uc, Vc, and Wc are set to be identical, but the armature coil bodies 18 numbered Ua, Va, Wa, Ub, Vb, Wb, Uc, Vc, and Wc can be arranged in 2 n-fold rotational symmetry about the axial center of the rotor so that the electromagnetic fields generated in the armature coils 8 do not become unbalanced even when the respective numbers of turns thereof are different. Hence, similarly to this embodiment, increases in the torque ripple of the rotary electric machine 101 and the electromagnetic excitation force generated in the stator core 6 can be suppressed, with the result that increases in vibration and noise can be suppressed. Moreover, the electromagnetic field component does not deviate from the circumferential direction control position, and therefore a torque reduction can also be suppressed.

The respective numbers of turns of the two armature coils 8 constituting each of the armature coil bodies 18 numbered Ua, Va, and Wa are also set to be identical, but similar effects to those described above can be obtained likewise when the respective numbers of turns are different.

Furthermore, the rotary electric machine 101 according to this embodiment employs so-called concentrated winding, in which the armature coils are wound around the teeth in a concentrated fashion. Accordingly, coil ends are small, and therefore reductions in size and copper loss, low heat generation, and high efficiency can be achieved.

Note that the rotary electric machine 101 according to this embodiment is not limited to the rotor 5 including the fourteen permanent magnets 13 and the stator 4 including the eighteen teeth 15, and needless to mention, similar effects can be achieved when the rotor 5 includes (18−4)×n (where n is an integer no smaller than 1) field poles and the stator 4 includes 18 n teeth 15.

Further, in this embodiment, the number of field poles is set at (18−4)×n (where n is an integer no smaller than 1) and the number of teeth 15 is set at 18 n, and therefore the torque can be improved in comparison with a case where the number of field poles is set at (3±1)×n and the number of teeth is set at 3 n. Moreover, the second spatial order electromagnetic excitation force generated in the stator core 6 can be reduced in comparison with a case where the number of field poles is set at (12±2)×n and the number of teeth is set at 12 n, enabling reductions in vibration and noise.

Furthermore, in the rotary electric machine 101 according to this embodiment, the winding factors of the harmonics, in particular the 6f and 12f components constituting the main components of the torque ripple, are small, and therefore the torque ripple can be reduced.

Second Embodiment

Figure 21:
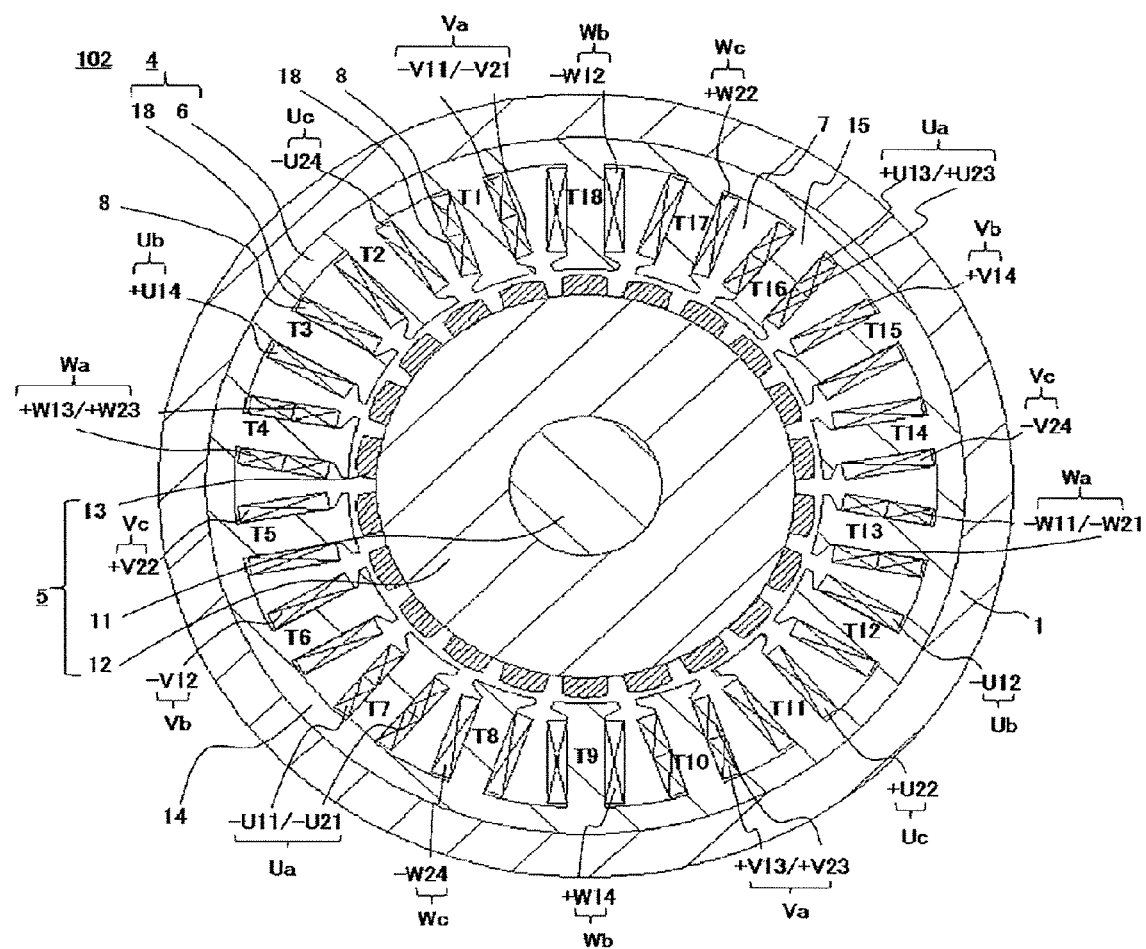
FIG. 21 is a sectional view of a rotary electric machine according to a second embodiment of this invention.

FIG. 21 is a sectional view of a rotary electric machine according to a second embodiment of this invention. A configuration of a rotary electric machine 102 according to this embodiment differs from the first embodiment as follows. In the rotary electric machine 102 according to this embodiment, the fourteen permanent magnets 13 of the first embodiment are replaced by twenty-two permanent magnets 13, or in other words twenty-two field poles. Further, the number of teeth 15 is set at eighteen, as in the first embodiment, shown in FIG. 2.

Furthermore, in FIG. 21, the U phase is constituted by eight armature coils 8 numbered −U11, −U12, +U13, +U14, −U21, +U22, +U23, and −U24, the V phase is constituted by eight armature coils 8 numbered −V11, −V12, +V13, +V14, −V21, +V22, +V23, and −V24, and the W phase is constituted by eight armature coils 8 numbered −W11, −W12, +W13, +W14, −W21, +W22, +W23, and −W24.

Further, as shown in FIG. 21, the twenty-four armature coils 8 are arranged in order of −V11/−V21, −U24, +U14, +W13/+W23, +V22, −V12, −U11/−U21, −W24, +W14, +V13/+V23, +U12, −U12, −W11/−W21, −V24, +V14, +U13/+U23, +W22, and −W12 so as to correspond respectively to the teeth 15 numbered T1 to T18.

Here, as shown in FIG. 3 or FIG. 4 of the first embodiment, the twenty-four armature coils 8 are connected on the outside of the stator core 6 in each of the three phases so as to form the first armature winding 16 and the second armature winding 17. As shown in FIGS. 3 and 4, the first armature winding 16 and the second armature winding 17 are connected by connecting the armature coils 8 of the three phases in the Y connection or the Δ connection.

Here, as shown in FIG. 21, two armature coil bodies 18 of each of the three phases, in which one armature coil 8 belonging to the first armature winding 16 and one armature coil 8 belonging to the second armature winding 17 are wound together around each of the six teeth 15 numbered T1, T4, T7, T10, T13, and T16, i.e. the teeth 15 around which two armature coils 8 are wound, form six of the plurality of armature coil bodies 18. The U phase armature coil bodies 18, V phase armature coil bodies 18, and W phase armature coil bodies 18 will be referred to respectively as Ua, Va, and Wa.

Further, two armature coil bodies 18 of each of the three phases, in which only one armature coil 8 belonging to the first armature winding 16 is wound around each of another six of the teeth 15, namely the teeth 15 numbered T3, T6, T9, T12, T15, and T18 around which one armature coil 8 is wound, form another six of the plurality of armature coil bodies 18. The U phase armature coil bodies 18, V phase armature coil bodies 18, and W phase armature coil bodies 18 will be referred to respectively as Ub, Vb, and Wb.

Furthermore, two armature coil bodies 18 of each of the three phases, in which only one armature coil 8 belonging to the second armature winding 17 is wound around each of the remaining six teeth 15, namely the teeth 15 numbered T2, T5, T8, T11, T14, and T17 around which one armature coil 8 is wound, form the remaining six armature coil bodies 18 of the plurality of armature coil bodies 18. The U phase armature coil bodies 18, V phase armature coil bodies 18, and W phase armature coil bodies 18 will be referred to respectively as Uc, Vc, and Wc.

Ua, Va, Wa, Ub, Vb, Wb, Uc, Vc, and Wc are respectively arranged so as to exhibit two-fold rotational symmetry about the axial center of the rotor 5.

Hence, the circumferential direction order in which the armature coil bodies 18 according to this embodiment are arranged is opposite to the arrangement order of the first embodiment, shown in FIG. 2. Therefore, when the clockwise direction, i.e. the opposite direction to the first embodiment, is set as a normal direction of the electrical angle phase, the winding polarities of the electromagnetic field vectors shown in FIGS. 16A and 16B and FIGS. 17A and 17B are reversed. Otherwise, this embodiment is identical to the first embodiment.

In this embodiment, therefore, similarly to the first embodiment shown in FIGS. 17A and 17B, when the current phase difference θ exists between the currents supplied to the first armature winding 16 and the second armature winding 17, the electromagnetic field of the rotary electric machine 102 does not become unbalanced. Hence, with the rotary electric machine 102 according to this embodiment, similar effects to those of the rotary electric machine 101 according to the first embodiment are obtained.

Figure 22:
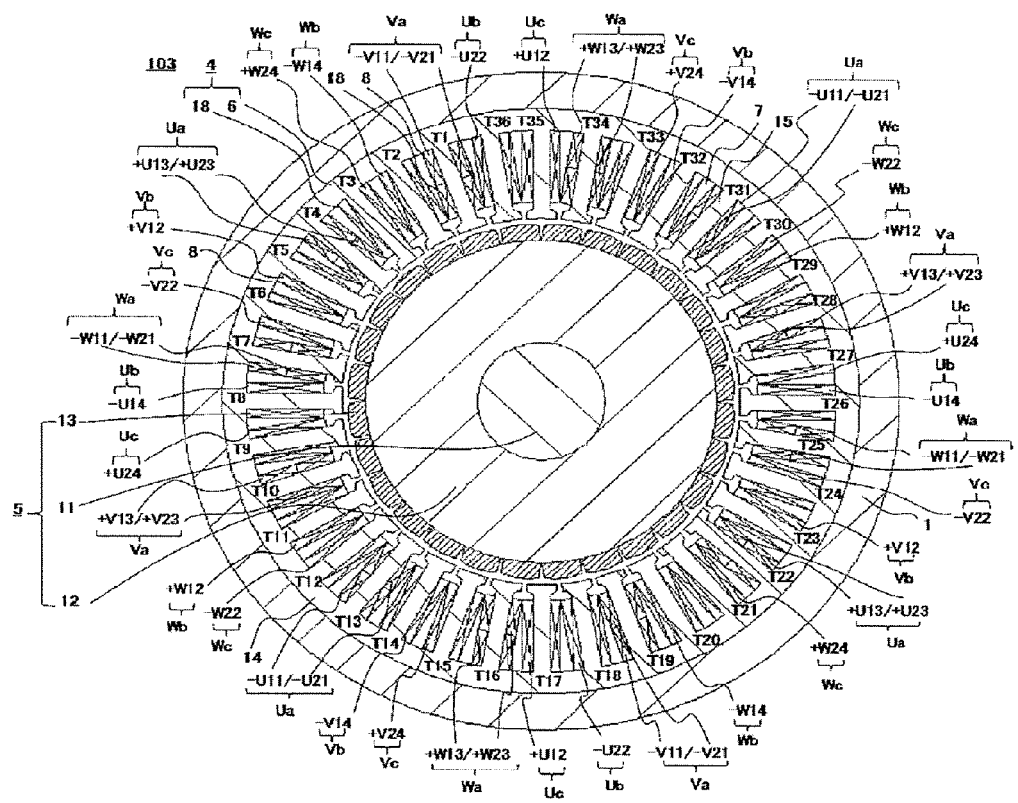
FIG. 22 is a sectional view showing a different configuration of the rotary electric machine according to the second embodiment of this invention.

FIG. 22 is a sectional view showing a different configuration of this embodiment. A configuration of a rotary electric machine 103 according to this embodiment differs from the first embodiment as follows. In the rotary electric machine 103 according to this embodiment, the fourteen permanent magnets 13 of the first embodiment are replaced by twenty-eight permanent magnets 13, or in other words twenty-eight field poles. Further, the eighteen teeth 15 of the first embodiment are replaced by thirty-six teeth 15.

Further, in FIG. 22, the forty-eight armature coil bodies 18 are arranged around the teeth 15 numbered T1 to T18 in an identical manner to the first embodiment, shown in FIG. 2, and arranged around teeth 15 numbered T19 to T36 so as to be rotated by a mechanical angle of 180° relative to the armature coil bodies 18 of the teeth 15 numbered T1 to T18. In other words, the forty-eight armature coil bodies 18 are arranged in two-fold rotational symmetry about the axial center of the rotor 5, and therefore, in the rotary electric machine 103 according to this embodiment, Ua, Va, Wa, Ub, Vb, Wb, Uc, Vc, and Wc are respectively disposed in two-fold rotational symmetry about the axial center of the rotor 5. As a result, similar effects to those of the rotary electric machine 101 according to the first embodiment can be obtained with the rotary electric machine 103 according to this embodiment.

Furthermore, the rotary electric machines 102 and 103 according to this embodiment employ so-called concentrated winding, in which the armature coils are wound around the teeth in a concentrated fashion. Accordingly, the coil ends are small, and therefore reductions in size and copper loss, low heat generation, and high efficiency can be achieved.

Note that the rotary electric machine 102 according to this embodiment is not limited to the rotor 5 including the twenty-two permanent magnets 13 and the stator 4 including the eighteen teeth 15, and needless to mention, similar effects can be achieved when the rotor 5 includes (18+4)×n (where n is an integer no smaller than 1) field poles and the stator 4 includes 18 n teeth 15.

Further, in this embodiment, the number of field poles is set at (18+4)×n (where n is an integer no smaller than 1) and the number of teeth 15 is set at 18 n, and therefore the torque can be improved in comparison with a case where the number of field poles is set at (3±1)×n and the number of teeth is set at 3 n. Moreover, the second spatial order electromagnetic excitation force generated in the stator core 6 can be reduced in comparison with a case where the number of field poles is set at (12±2)×n and the number of teeth is set at 12 n, enabling reductions in vibration and noise.

Furthermore, in the rotary electric machines 102 and 103 according to this embodiment, the winding factors of the harmonics, in particular the 6f and 12f components constituting the main components of the torque ripple, are small, and therefore the torque ripple can be reduced.

Third Embodiment

Figure 23:
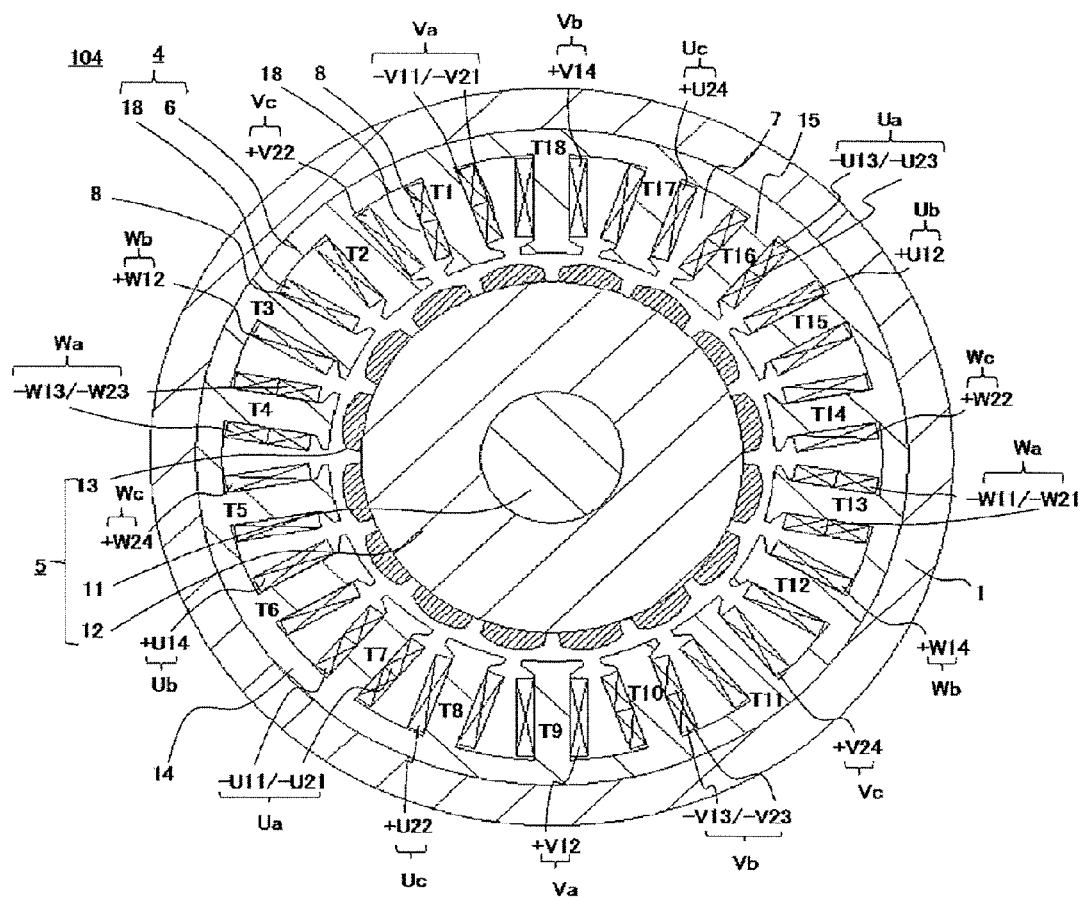
FIG. 23 is a sectional view of a rotary electric machine according to a third embodiment of this invention.

FIG. 23 is a sectional view of a rotary electric machine according to a third embodiment of this invention. A configuration of a rotary electric machine 104 according to this embodiment differs from the first embodiment as follows. In the rotary electric machine 104 according to this embodiment, the fourteen permanent magnets 13 of the first embodiment are replaced by sixteen permanent magnets 13, or in other words sixteen field poles. Further, the number of teeth 15 is set at eighteen, as in the first embodiment, shown in FIG. 2.

Moreover, in FIG. 23, the U phase is constituted by eight armature coils 8 numbered −U11, +U12, −U13, +U14, −U21, +U22, −U23, and +U24, the V phase is constituted by eight armature coils 8 numbered −V11, +V12, −V13, +V14, −V21, +V22, −V23, and +V24, and the W phase is constituted by eight armature coils 8 numbered −W11, +W12, −W13, +W14, −W21, +W22, −W23, and +W24.

Further, as shown in FIG. 23, the twenty-four armature coils 8 are arranged in order of −V11/−V21, +V22, +W12, −W13/−W23, +W24, +U14, −U11/−U21, +U22, +V12, −V13/−V23, +V24, +W14, −W11/−W21, +W22, +U12, −U13/−U23, +U24, and +V14 so as to correspond respectively to the teeth 15 numbered T1 to T18.

Here, as shown in FIG. 3 or FIG. 4 of the first embodiment, the twenty-four armature coils 8 are connected on the outside of the stator core 6 in each of the three phases so as to form the first armature winding 16 and the second armature winding 17. As shown in FIGS. 3 and 4, the first armature winding 16 and the second armature winding 17 are connected by connecting the armature coils 8 of the three phases in the Y connection or the Δ connection.

Here, as shown in FIG. 23, two armature coil bodies 18 of each of the three phases, in which one armature coil 8 belonging to the first armature winding 16 and one armature coil 8 belonging to the second armature winding 17 are wound together around each of the six teeth 15 numbered T1, T4, T7, T10, T13, and T16, i.e. the teeth 15 around which two armature coils 8 are wound, form six of the plurality of armature coil bodies 18. The U phase armature coil bodies 18, V phase armature coil bodies 18, and W phase armature coil bodies 18 will be referred to respectively as Ua, Va, and Wa.

Further, two armature coil bodies 18 of each of the three phases, in which only one armature coil 8 belonging to the first armature winding 16 is wound around each of another six of the teeth 15, namely the teeth 15 numbered T3, T6, T9, T12, T15, and T18 around which one armature coil 8 is wound, form another six of the plurality of armature coil bodies 18. The U phase armature coil bodies 18, V phase armature coil bodies 18, and W phase armature coil bodies 18 will be referred to respectively as Ub, Vb, and Wb.

Furthermore, two armature coil bodies 18 of each of the three phases, in which only one armature coil 8 belonging to the second armature winding 17 is wound around each of the remaining six teeth 15, namely the teeth 15 numbered T2, T5, T8, T11, T14, and T17 around which one armature coil 8 is wound, form the remaining six armature coil bodies 18 among the plurality of armature coil bodies 18. The U phase armature coil bodies 18, V phase armature coil bodies 18, and W phase armature coil bodies 18 will be referred to respectively as Uc, Vc, and Wc.

Ua, Va, Wa, Ub, Vb, Wb, Uc, Vc, and Wc are respectively arranged in two-fold rotational symmetry about the axial center of the rotor 5.

Figure 24A:
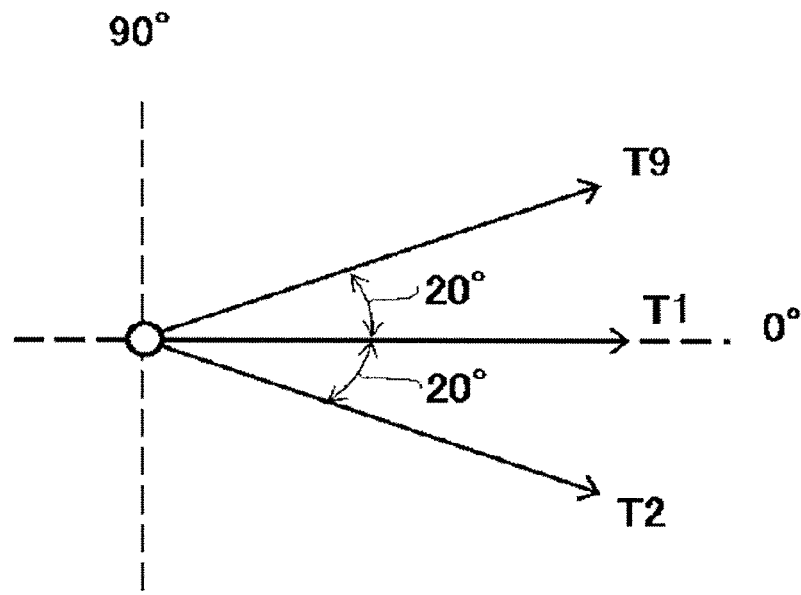
FIG. 24A is a vector diagram showing teeth numbered T1, T2, and T9, around which V phase armature coils of the rotary electric machine according to the third embodiment of this invention are wound.
Figure 24B:
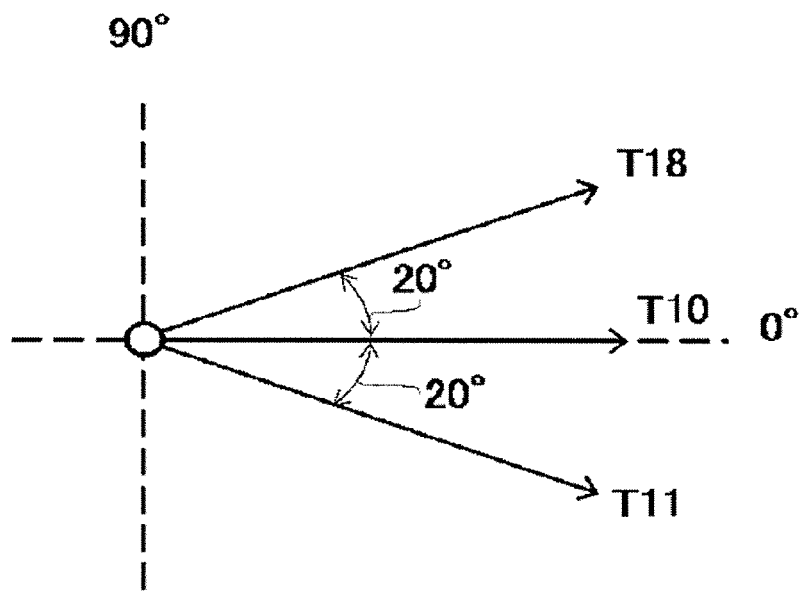
FIG. 24B is a vector diagram showing teeth numbered T10, T11, and T18, around which V phase armature coils of the rotary electric machine according to the third embodiment of this invention are wound.

FIG. 24A is a vector diagram showing the teeth numbered T1, T2, and T9, around which V phase armature coils of the rotary electric machine according to this embodiment are wound, and FIG. 24B is a vector diagram showing the teeth numbered T10, T11, and T18, around which V phase armature coils of the rotary electric machine according to this embodiment of the invention are wound. FIGS. 24A and 24B show two groups of teeth 15, namely the teeth 15 numbered T1, T2, and T9 and the teeth 15 numbered T10, T11, and T18, which are separated from each other by a mechanical angle of 180° in the circumferential direction.

Here, the respective electrical angle phases of the teeth 15 around which the V phase armature coils 8 are wound are set such that the armature coils 8 having the "+" winding polarity deviate respectively from the armature coils 8 having the "−" winding polarity by an electrical angle of 180°.

The phases of the teeth 15 numbered T1 and T10, the teeth 15 numbered T2 and T11, and the teeth 15 numbered T9 and T18 respectively differ from each other by a mechanical angle of 180°, but when the winding polarities of the armature coils 8 are taken into consideration, the phases of these teeth 15 are respectively identical in terms of the electrical angle. Further, the phases of the teeth 15 numbered T1 and T2, the teeth 15 numbered T1 and T9, the teeth 15 numbered T10 and T11, and the teeth 15 numbered T10 and T18 respectively differ from each other by an electrical angle of 20°.

Furthermore, in FIGS. 24A and 24B, the respective electrical angle phases of the armature coil bodies 18 numbered Va, which are wound around the teeth numbered T1 and T10, take the second smallest value of Va, Vb, and Vc, which are the three armature coil bodies 18 of the same phase within the minimum unit of rotational symmetry.

Note that although FIGS. 24A and 24B show the V phase, the W phase and the U phase respectively differ from the V phase only by an electrical angle of 120°, and relationships within the respective phases are identical.

Hence, the phases of the teeth 15 of the respective phases according to this embodiment are set at an identical mechanical angle of 180°. In other words, the armature coils 8 numbered Ua, Va, Wa, Ub, Vb, Wb, Uc, Vc, and Wc are respectively arranged so as to exhibit two-fold (=360°/2) rotational symmetry about the axial center of the rotor 5.

Further, the respective electrical angle phases of Ua, Va, and Wa take the second smallest value among the three armature coil bodies 18 of the same phase within the minimum unit of rotational symmetry.

Furthermore, the current vectors according to this embodiment are equal to the current phase vectors shown in FIG. 7.

Figure 25:
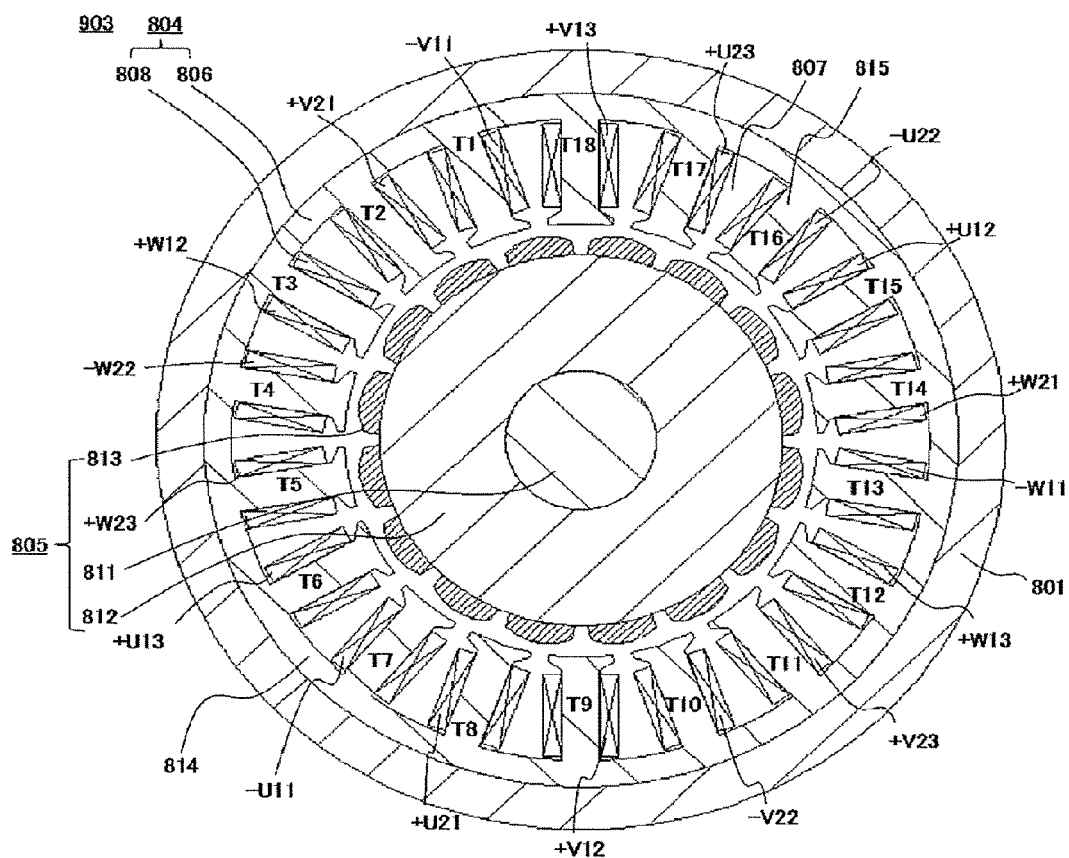
FIG. 25 is a sectional view showing a conventional rotary electric machine.

To describe the effects of this embodiment, problems will be described on the basis of an example configuration of a conventional rotary electric machine 903. FIG. 25 is a sectional view of a conventional rotary electric machine.

The U phase armature coils 808 are constituted by six armature coils 808 numbered −U11, +U12, +U13, +U21, −U22, and +U23, the V phase is constituted by six armature coils 808 numbered −V11, +V12, +V13, +V21, −V22, and +V23, and the W phase is constituted by six armature coils 808 numbered −W11, +W12, +W13, +W21, −W22, and +W23.

Further, as shown in FIG. 25, the eighteen armature coils 808 are arranged in order of −V11, +V21, +W12, −W22, +W23, +U13, −U11, +U21, +V12, −V22, +V23, +W13, −W11, +W21, +U12, −U22, +U23, and +V13 so as to correspond respectively to the teeth 815 numbered T1 to T18. Note that "+" and "−" represent the different winding polarities of the armature coils 808.

Here, as shown in FIG. 9 or FIG. 10, the eighteen armature coils 808 are connected on the outside of the stator core 806 in each of the three phases so as to form the first armature winding 816 and the second armature winding 817. As shown in FIGS. 9 and 10, the first armature winding 816 and the second armature winding 817 are respectively connected by connecting the armature coils 808 of the three phases in either the Y connection or the Δ connection.

Further, the current vectors of the conventional rotary electric machine 903 are equal to the current phase vectors shown in FIG. 7.

Figure 26A:
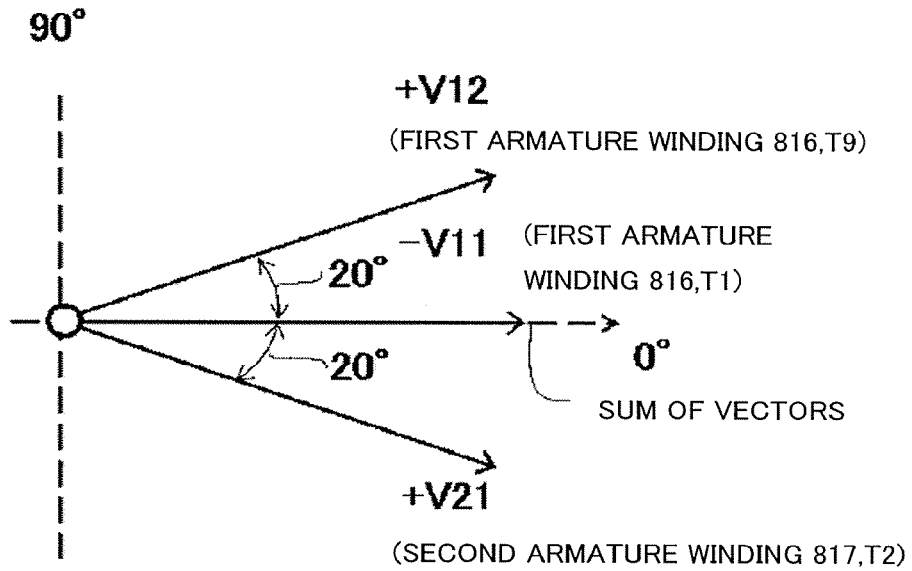
FIG. 26A is a vector diagram showing the electromagnetic fields generated in the V phase armature coils wound around the teeth numbered T1, T2, and T9 in a case where the current phase difference of the conventional rotary electric machine is 0°.
Figure 26B:
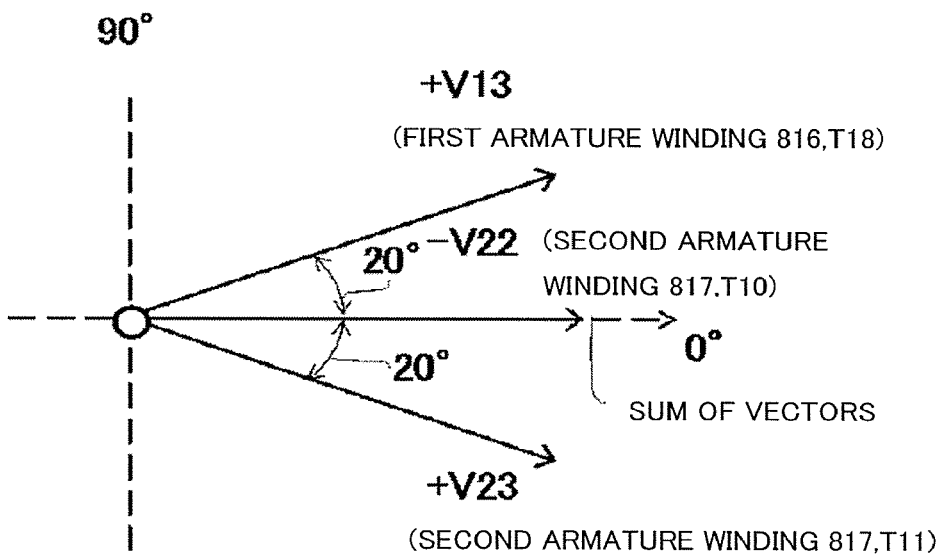
FIG. 26B is a vector diagram showing the electromagnetic fields generated in the V phase armature coils wound around the teeth numbered T10, T11, and T18.

FIG. 26A is a vector diagram showing the electromagnetic fields generated in the V phase armature coils wound around the teeth numbered T1, T2, and T9 in a case where the current phase difference θ of the conventional rotary electric machine is 0°, and FIG. 26B is a vector diagram showing the electromagnetic fields generated in the V phase armature coils wound around the teeth numbered T10, T11, and T18 in a case where the current phase difference θ of the conventional rotary electric machine is 0°.

In FIG. 26A, +V12 and −V11 among the V phase armature coils 808 wound around the teeth 815 numbered T1, T2, and T9 constitute a part of the V phase armature coils 808 of the first armature winding 816, while +V21 constitutes a part of the V phase armature coils 808 of the second armature winding 817.

In FIG. 26B, +V13 among the V phase armature coils 808 wound around the teeth 815 numbered T10, T11, and T18 constitutes a part of the V phase armature coils 808 of the first armature winding 816, while −V22 and +V23 constitute a part of the V phase armature coils 808 of the second armature winding 817.

Furthermore, it is evident from FIGS. 26A and 26B that when the current phase difference between the currents supplied to the first armature winding 816 and the second armature winding 817 is 0°, equal electromagnetic field vectors are generated respectively in the V phase armature coils 808 of the teeth 815 numbered T1 and T10, the teeth 815 numbered T2 and T11, and the teeth 815 numbered T9 and T18. Therefore, the sum of the electromagnetic field vectors generated in the V phase armature coils 808 of the teeth 815 numbered T1, T2, and T9 is equal to the sum of the electromagnetic field vectors generated in the V phase armature coils 808 of the teeth 815 numbered T10, T11, and T18.

Figure 27A:
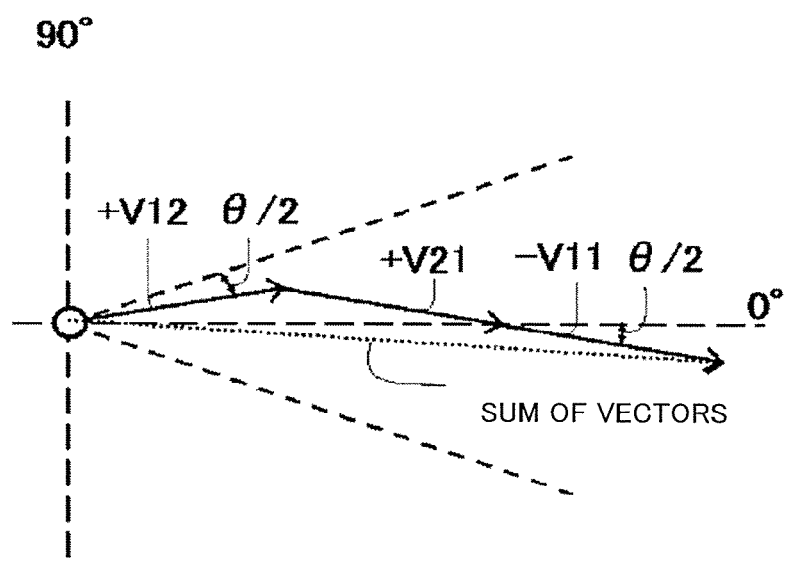
FIG. 27A is a vector diagram showing the electromagnetic fields generated in the V phase armature coils wound around the teeth numbered T1, T2, and T9 in a case where the current phase difference θ exists in the conventional rotary electric machine.
Figure 27B:
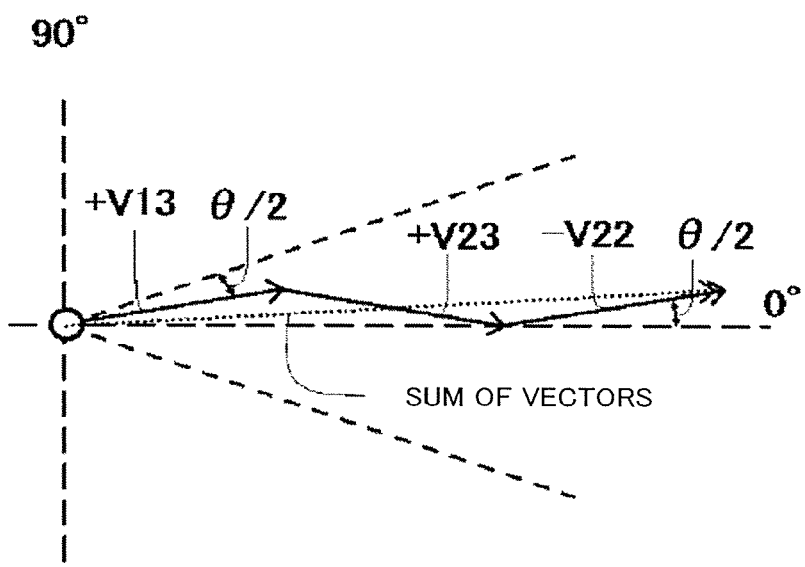
FIG. 27B is a vector diagram showing the electromagnetic fields generated in the V phase armature coils wound around the teeth numbered T10, T11, and T18.

FIG. 27A is a vector diagram showing the electromagnetic fields generated in the V phase armature coils wound around the teeth numbered T1, T2, and T9 in a case where the current phase difference θ of the conventional rotary electric machine is (θ>0°), and FIG. 27B is a vector diagram showing the electromagnetic fields generated in the V phase armature coils wound around the teeth numbered T10, T11, and T18 in a case where the current phase difference θ of the conventional rotary electric machine is (θ>0°).

In FIGS. 27A and 27B, when the current phase difference θ exists between the currents supplied to the first armature winding 816 and the second armature winding 817, the sum phase of the electromagnetic field vectors generated in the V phase armature coils 808 of the teeth 815 numbered T1, T2, and T9 differs from the sum phase of the electromagnetic field vectors generated in the V phase armature coils 808 of the teeth 815 numbered T10, T11, and T18. The reason for this, as shown in FIGS. 26A and 26B, is that the armature coils 808 belonging to the first armature winding 816 and the second armature winding 817 are arranged differently at a mechanical angle interval of 180°, or in other words do not exhibit two-fold rotational symmetry about the axial center of the rotor 805. Hence, the sum phases of the electromagnetic field vectors differ from each other by a mechanical angle of 180°, and as a result, the electromagnetic field of the conventional rotary electric machine 903 becomes unbalanced.

Note that although FIGS. 26A and 26B and FIGS. 27A and 27B show the V phase, the W phase and the U phase respectively differ from the V phase only by an electrical angle of 120°, and relationships between the electromagnetic field vectors within the respective phases are identical.

Hence, it can be seen that in the example configuration of the conventional rotary electric machine 903, the electromagnetic field is unbalanced. Furthermore, a case in which the eighteen teeth 815 are provided was described above, but needless to mention, a similar problem arises when 18 n (where n is an integer no smaller than 1) teeth 815 are provided.

As described above, when the current phase difference θ exists between the currents supplied to the first armature winding 816 and the second armature winding 817, the electromagnetic fields generated in the armature coils 808 become unbalanced, with the result that the electromagnetic field component generated in the air gap between the rotor 805 and the stator 804 deviates from the desired circumferential direction control position of the rotor 805 in the conventional rotary electric machine 903. When the electromagnetic field component deviates from the circumferential direction control position, increases occur in the torque ripple of the conventional rotary electric machine 903 and the electromagnetic excitation force generated in the stator core 806, leading to increases in vibration and noise.

Furthermore, when the electromagnetic field component deviates from the circumferential direction control position, a reduction in torque occurs.

Moreover, when the current phase difference θ occurs between the currents supplied to the first armature winding 816 and the second armature winding 817 due to effects from a manufacturing error, noise input into the ECU, and so on, the electromagnetic field likewise becomes unbalanced, as described above, leading to increases in vibration and noise and a reduction in torque in the conventional rotary electric machine 903.

Effects obtained with the rotary electric machine 104 according to this embodiment will now be described.

Figure 28A:
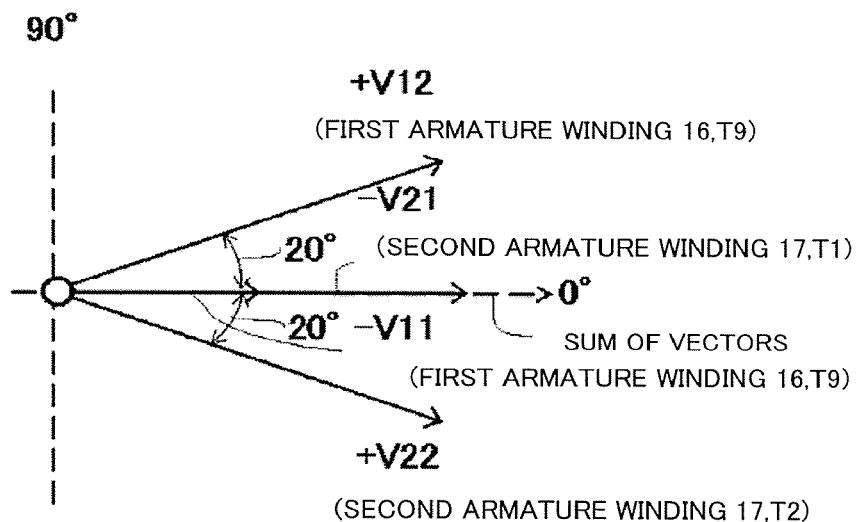
FIG. 28A is a vector diagram showing the electromagnetic fields generated in the V phase armature coils wound around the teeth numbered T1, T2, and T9 in a case where the current phase difference θ of the rotary electric machine according to the third embodiment of this invention is 0°.
Figure 28B:
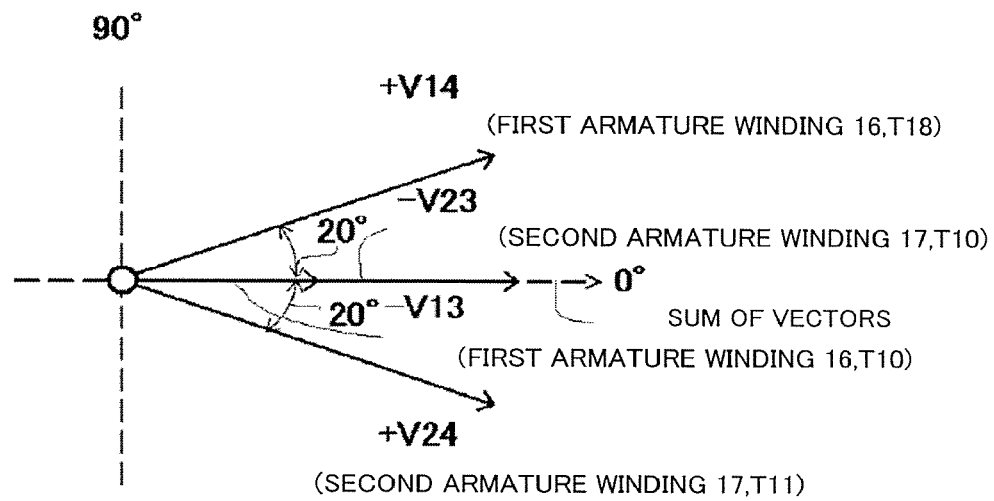
FIG. 28B is a vector diagram showing the electromagnetic fields generated in the V phase armature coils wound around the teeth numbered T10, T11, and T18.

FIG. 28A is a vector diagram showing the electromagnetic fields generated in the V phase armature coils wound around the teeth numbered T1, T2, and T9 in a case where the current phase difference θ of the rotary electric machine according to this embodiment is 0°, and FIG. 28B is a vector diagram showing the electromagnetic fields generated in the V phase armature coils wound around the teeth numbered T10, T11, and T18.

In FIG. 28A, +V12 and −V11 among the V phase armature coils 8 wound around the teeth 15 numbered T1, T2, and T9 constitute a part of the V phase armature coils 8 of the first armature winding 16, while −V21 and +V22 constitute a part of the V phase armature coils 8 of the second armature winding 17.

In FIG. 28B, −V13 and +V14 among the V phase armature coils 8 wound around the teeth 15 numbered T10, T11, and T18 constitute a part of the V phase armature coils 8 of the first armature winding 16, while −V23 and +V24 constitute a part of the V phase armature coils 8 of the second armature winding 17.

Further, it is evident from FIGS. 28A and 28B that when the current phase difference between the currents supplied to the first armature winding 16 and the second armature winding 17 is 0°, equal electromagnetic field vectors are generated respectively in the V phase armature coils 8 of the teeth 15 numbered T1 and T10, the teeth 15 numbered T2 and T11, and the teeth 15 numbered T9 and T18. Therefore, when the current phase difference between the currents supplied to the first armature winding 16 and the second armature winding 17 is 0°, the sum of the electromagnetic field vectors generated in the V phase armature coils 8 of the teeth 15 numbered T1, T2, and T9 is equal to the sum of the electromagnetic field vectors generated in the V phase armature coils 8 of the teeth 15 numbered T10, T11, and T18.

Figure 29A:
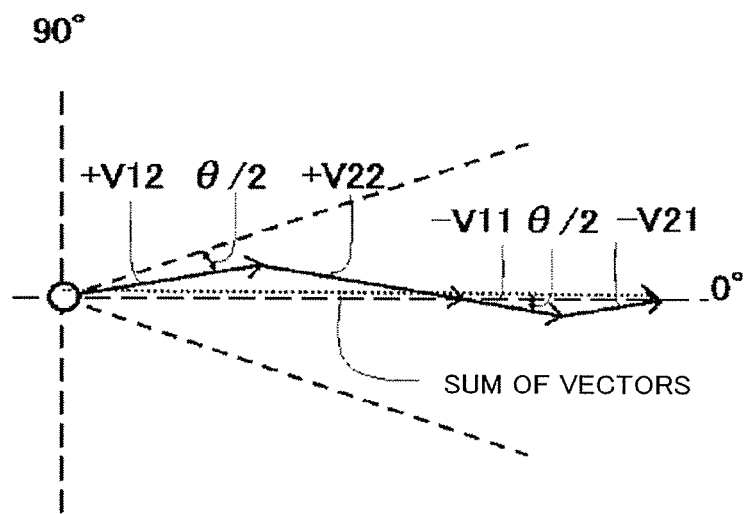
FIG. 29A is a vector diagram showing the electromagnetic fields generated in the V phase armature coils wound around the teeth numbered T1, T2, and T9 in a case where the current phase difference θ exists in the rotary electric machine according to the third embodiment of this invention.
Figure 29B:
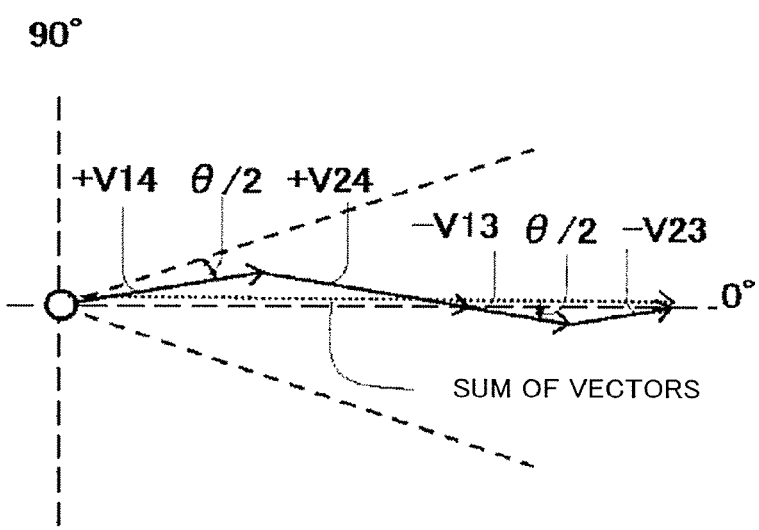
FIG. 29B is a vector diagram showing the electromagnetic fields generated in the V phase armature coils wound around the teeth numbered T10, T11, and T18.

FIG. 29A is a vector diagram showing the electromagnetic fields generated in the V phase armature coils wound around the teeth numbered T1, T2, and T9 in a case where the current phase difference θ of the rotary electric machine according to this embodiment is (θ>0°), and FIG. 29B is a vector diagram showing the electromagnetic fields generated in the V phase armature coils wound around the teeth numbered T10, T11, and T18 in a case where the current phase difference θ of the rotary electric machine according to this embodiment is (θ>0°).

It is evident from FIGS. 29A and 29B that when the current phase difference θ exists between the currents supplied to the first armature winding 16 and the second armature winding 17, the sum of the electromagnetic field vectors generated in the V phase armature coils 8 of the teeth 15 numbered T1, T2, and T9 is equal to the sum of the electromagnetic field vectors generated in the V phase armature coils 8 of the teeth 15 numbered T10, T11, and T18. The reason for this, as shown in FIGS. 28A and 28B, is that the armature coil bodies 18 belonging to the first armature winding 16 and the second armature winding 17 are arranged identically at a mechanical angle interval of 180°, or in other words exhibit two-fold rotational symmetry about the axial center of the rotor 5. Hence, the electromagnetic field of the rotary electric machine 104 does not become unbalanced.

Note that although FIGS. 28A and 28B and FIGS. 29A and 29B show the V phase, the W phase and the U phase respectively differ from the V phase only by an electrical angle of 120°, and relationships between the electromagnetic field vectors within the respective phases are identical.

Here, the electromagnetic field vector diagrams of the conventional rotary electric machine and the rotary electric machine according to this embodiment will be compared. In the conventional rotary electric machine 903, as shown in FIGS. 26A and 26B, the armature coils 808 belonging to the first armature winding 816 and the second armature winding 817 are not arranged in two-fold rotational symmetry about the axial center of the rotor 805. In the rotary electric machine 104 according to this embodiment, on the other hand, as shown in FIGS. 28A and 28B, the armature coil bodies 18 belonging to the first armature winding 16 and the second armature winding 17 are arranged in two-fold rotational symmetry about the axial center of the rotor 5.

Hence, when the current phase difference θ exists between the currents supplied to the first armature winding 816 and the second armature winding 817 in the conventional rotary electric machine 903, as shown in FIGS. 27A and 27B, the sum phase of the electromagnetic field vectors generated in the V phase armature coils 808 of the teeth 815 numbered T1, T2, and T9 differs from the sum phase of the electromagnetic field vectors generated in the V phase armature coils 808 of the teeth 815 numbered T10, T11, and T18. When the current phase difference θ exists between the currents supplied to the first armature winding 16 and the second armature winding 17 in the rotary electric machine 104 according to this embodiment, on the other hand, as shown in FIGS. 29A and 29B, the sum of the electromagnetic field vectors generated in the V phase armature coils 8 of the teeth 15 numbered T1, T2, and T9 is equal to the sum of the electromagnetic field vectors generated in the V phase armature coils 8 of the teeth 15 numbered T10, T11, and T18.

Thus, the rotary electric machine 104 according to this embodiment, similarly to the first embodiment, includes the stator 4 having the stator core 6 that includes the 18 n (where n is an integer no smaller than 1) teeth 15 and the plurality of armature coil bodies 18 in which at least one of the first armature winding 16 and the second armature winding 17 is wound around each of the plurality of teeth 15, and the respective armature coil bodies 18 numbered Ua, Va, Wa, Ub, Vb, Wb, Uc, Vc, and Wc are arranged so as to exhibit 2 n-fold rotational symmetry about the axial center of the rotor. Therefore, even when the current phase difference θ exists between the currents supplied to the first armature winding 16 and the second armature winding 17, the electromagnetic fields generated in the armature coils 8 do not become unbalanced. Accordingly, the electromagnetic field component in the air gap between the rotor 5 and the stator 4 does not deviate from the desired circumferential direction control position of the rotor 5 of the rotary electric machine 104, and therefore increases in the torque ripple of the rotary electric machine 104 and the electromagnetic excitation force generated in the stator core 6 can be suppressed. As a result, increases in vibration and noise can be suppressed.

Moreover, since the electromagnetic field component does not deviate from the circumferential direction control position, a torque reduction can also be suppressed.

Furthermore, the electromagnetic field does not become unbalanced even when the current phase difference θ occurs between the currents supplied to the first armature winding 16 and the second armature winding 17 due to effects from a manufacturing error, noise input into the ECU 111, and so on, and therefore increases in vibration and noise and a reduction in torque in the rotary electric machine 104 can be suppressed.

Further, as shown in FIGS. 29A and 29B, a phase difference of θ occurs between the electrical angle phases of the 2 n armature coils 8 constituting each of Ua, Va, and Wa due to the current phase difference θ. Balance is achieved only by the electromagnetic field vectors generated in the two armature coils 8 constituting each of Ua, Va, and Wa, and therefore, by setting the respective electrical angle phases of Ua, Va, and Wa to take the second smallest value among the three armature coil bodies 18 of the same phase within the minimum unit of rotational symmetry, a deviation corresponding to the phase difference θ in the electromagnetic field component generated in the air gap between the rotor 5 and the stator 4 within the minimum unit of rotational symmetry can be reduced. As a result, the torque reduction and torque ripple increase caused by the current phase difference θ can be suppressed further than when the respective electrical angle phases of Ua, Va, and Wa do not take the second smallest value.

Needless to mention, similar effects to the first embodiment are obtained likewise in a case where the stator core 6 includes 6 (2 m+k)×n (where k, n, and m are integers no smaller than 1) teeth 15.

Further, the electromagnetic field vectors generated in the V phase armature coils of the rotary electric machine 104 according to this embodiment, as shown in FIGS. 28A and 28B and FIGS. 29A and 29B, differ from the electromagnetic field vectors generated in the V phase armature coils of the rotary electric machine 101 according to the first embodiment, as shown in FIGS. 16A and 16B and FIGS. 17A and 17B, only in terms of the winding polarities of V13, V14, V22, and V23. Hence, the rotary electric machine 104 according to this embodiment obtains an identical result to the first embodiment in terms of the torque, as shown in FIG. 18. Similarly to the first embodiment, therefore, as shown in FIG. 18, the torque can be improved by setting the current phase difference θ at 0°<θ≤53°. More preferably, by setting the current phase difference θ in the vicinity of 26.5°, or in other words at 13°≤θ≤41°, the torque can be improved to 102% or more.

Furthermore, the rotary electric machine 104 according to this embodiment employs so-called concentrated winding, in which the armature coils are wound around the teeth in a concentrated fashion. Accordingly, the coil ends are small, and therefore reductions in size and copper loss, low heat generation, and high efficiency can be achieved.

Note that the rotary electric machine 104 according to this embodiment is not limited to the rotor 5 including the sixteen or twenty permanent magnets 13 and the stator 4 including the eighteen teeth 15 of the rotary electric machine 101 according to the first embodiment, and needless to mention, similar effects can be achieved when the rotor 5 includes (18−2)×n (where n is an integer no smaller than 1) field poles and the stator 4 includes 18 n teeth 15.

Further, in this embodiment, the number of field poles is set at (18−2)×n (where n is an integer no smaller than 1) and the number of teeth 15 is set at 18 n, and therefore a basic wave component of the winding factor can be increased, enabling an improvement in the torque, in comparison with a case where the number of field poles is set at (3±1)×n and the number of teeth is set at 3 n, a case where the number of field poles is set at (12±2)×n and the number of teeth is set at 12 n, and a case where the number of field poles is set at (18±4)×n (where n is a natural number) and the number of teeth or slots is set at 18 n.

Furthermore, in the rotary electric machine 104 according to this embodiment, the winding factors of the harmonics, in particular the 6f and 12f components constituting the main components of the torque ripple, are small, and therefore the torque ripple can be reduced.

Moreover, the permanent magnets 13 are provided as the field poles, but a reluctance type rotary electric machine not employing the permanent magnets 13 may be used instead, in which case field poles are formed by winding windings around the rotor core 12 and passing a current therethrough.

Fourth Embodiment

Figure 30:
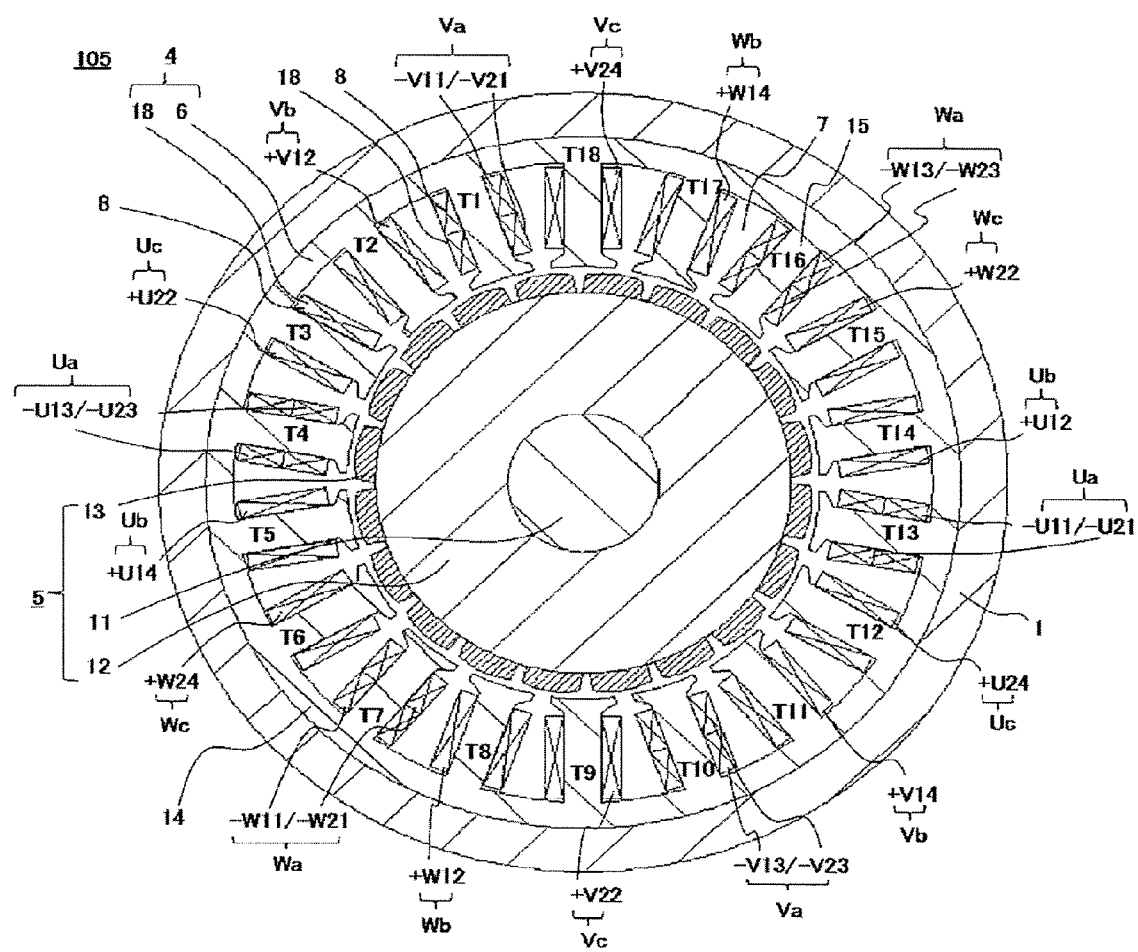
FIG. 30 is a sectional view of a rotary electric machine according to a fourth embodiment of this invention.

FIG. 30 is a sectional view of a rotary electric machine according to a fourth embodiment of this invention. A configuration of a rotary electric machine 105 according to this embodiment differs from the third embodiment as follows. In the rotary electric machine 105 according to this embodiment, the sixteen permanent magnets 13 of the third embodiment are replaced by twenty permanent magnets 13, or in other words twenty field poles. Further, the number of teeth 15 is set at eighteen, as in the third embodiment, shown in FIG. 23.

Furthermore, in FIG. 30, the U phase is constituted by eight armature coils 8 numbered −U11, +U12, −U13, +U14, −U21, +U22, −U23, and +U24, the V phase is constituted by eight armature coils 8 numbered −V11, +V12, −V13, +V14, −V21, +V22, −V23, and +V24, and the W phase is constituted by eight armature coils 8 numbered −W11, +W12, −W13, +W14, −W21, +W22, −W23, and +W24.

Further, as shown in FIG. 30, the twenty-four armature coils 8 are arranged in order of −V11/−V21, +V12, +U22, −U13/−U23, +U14, +W24, −W11/−W21, +W12, +V22, −V13/−V23, +V14, +U24, −U11/−U21, +U12, +W22, −W13/−W23, +W14, and +V24 so as to correspond respectively to the teeth 15 numbered T1 to T18.

Here, as shown in FIG. 3 or FIG. 4 of the first embodiment, the twenty-four armature coils 8 are connected on the outside of the stator core 6 in each of the three phases so as to form the first armature winding 16 and the second armature winding 17. As shown in FIGS. 3 and 4, the first armature winding 16 and the second armature winding 17 are connected by connecting the armature coils 8 of the three phases in the Y connection or the Δ connection.

Here, as shown in FIG. 30, two armature coil bodies 18 of each of the three phases, in which one armature coil 8 belonging to the first armature winding 16 and one armature coil 8 belonging to the second armature winding 17 are wound together around each of the six teeth 15 numbered T1, T4, T7, T10, T13, and T16, i.e. the teeth 15 around which two armature coils 8 are wound, form six of the plurality of armature coil bodies 18. The U phase armature coil bodies 18, V phase armature coil bodies 18, and W phase armature coil bodies 18 will be referred to respectively as Ua, Va, and Wa.

Further, two armature coil bodies 18 of each of the three phases, in which only one armature coil 8 belonging to the first armature winding 16 is wound around each of another six of the teeth 15, namely the teeth 15 numbered T2, T5, T8, T11, T14, and T17 around which one armature coil 8 is wound, form another six of the plurality of armature coil bodies 18. The U phase armature coil bodies 18, V phase armature coil bodies 18, and W phase armature coil bodies 18 will be referred to respectively as Ub, Vb, and Wb.

Furthermore, two armature coil bodies 18 of each of the three phases, in which only one armature coil 8 belonging to the second armature winding 17 is wound around each of the remaining six teeth 15, namely the teeth 15 numbered T3, T6, T9, T12, T15, and T18 around which one armature coil 8 is wound, form the remaining six armature coil bodies 18 among the plurality of armature coil bodies 18. The U phase armature coil bodies 18, V phase armature coil bodies 18, and W phase armature coil bodies 18 will be referred to respectively as Uc, Vc, and Wc.

Ua, Va, Wa, Ub, Vb, Wb, Uc, Vc, and Wc are respectively arranged so as to exhibit two-fold rotational symmetry about the axial center of the rotor 5.

Hence, the armature coil bodies 18 according to this embodiment are arranged in an opposite circumferential direction order to the arrangement order of the third embodiment, shown in FIG. 23. Therefore, when the clockwise direction, i.e. the opposite direction to the third embodiment, is set as the normal direction of the electrical angle phase, the winding polarities of the electromagnetic field vectors shown in FIGS. 28A and 28B and FIGS. 29A and 29B are reversed. Otherwise, this embodiment is identical to the third embodiment.

In this embodiment, therefore, similarly to the third embodiment shown in FIGS. 29A and 29B, when the current phase difference θ exists between the currents supplied to the first armature winding 16 and the second armature winding 17, the electromagnetic field of the rotary electric machine 105 does not become unbalanced. Hence, with the rotary electric machine 105 according to this embodiment, similar effects to those of the rotary electric machine 104 according to the third embodiment are obtained.

Note that the rotary electric machine 105 according to this embodiment is not limited to the rotor 5 including the sixteen permanent magnets 13 and the stator 4 including the eighteen teeth 15, and needless to mention, similar effects can be achieved when the rotor 5 includes (18+2)×n (where n is an integer no smaller than 1) field poles and the stator 4 includes 18 n teeth 15.

Further, in this embodiment, the number of field poles is set at (18+2)×n (where n is an integer no smaller than 1) and the number of teeth 15 is set at 18 n, and therefore the basic wave component of the winding factor can be increased, enabling an improvement in the torque, in comparison with a case where the number of field poles is set at (3±1)×n and the number of teeth is set at 3 n, a case where the number of field poles is set at (12±2)×n and the number of teeth is set at 12 n, and a case where the number of field poles is set at (18±4)×n (where n is a natural number) and the number of teeth or slots is set at 18 n.

Furthermore, in the rotary electric machine 105 according to this embodiment, the winding factors of the harmonics, in particular the 6f and 12f components constituting the main components of the torque ripple, are small, and therefore the torque ripple can be reduced.

Moreover, the permanent magnets 13 are provided as the field poles, but a reluctance type rotary electric machine not employing the permanent magnets 13 may be used instead, in which case field poles are formed by winding windings around the rotor core 12 and passing a current therethrough.

Fifth Embodiment

Figure 31:
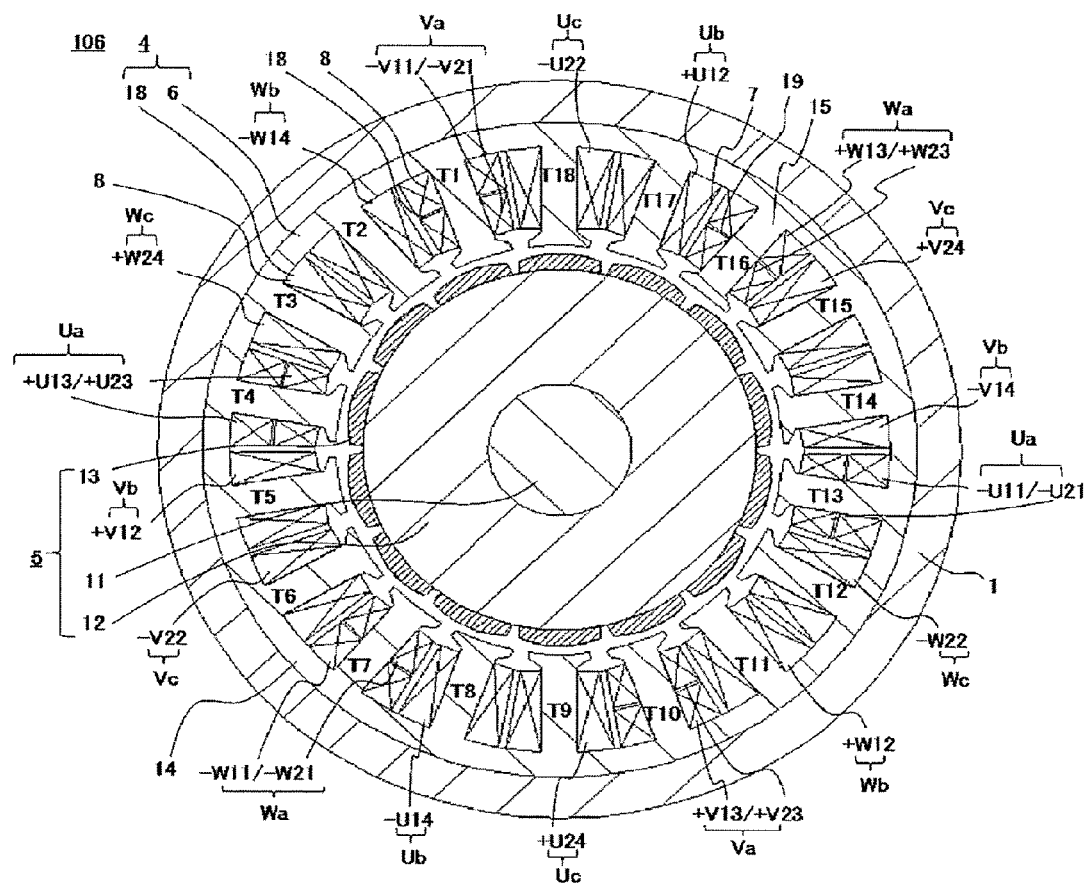
FIG. 31 is a sectional view of a rotary electric machine according to a fifth embodiment of this invention.

FIG. 31 is a sectional view of a rotary electric machine according to a fifth embodiment of this invention. A rotary electric machine 106 according to this embodiment resembles the first embodiment in that the rotor 5 includes fourteen permanent magnets 13, or in other words fourteen field poles, and the stator 4 includes eighteen teeth 15. Further, a configuration of the rotary electric machine 106 according to this embodiment differs from the first embodiment as follows.

An insulating member 19 having a predetermined volume is inserted between the two armature coils 8 wound respectively around the teeth 15 numbered T1, T4, T7, T10, T13, and T16. A radial direction thickness of the insulating member 19 is set to equal or exceed a distance required for insulation, and a circumferential direction width of the insulating member 19 is set to extend from a circumferential direction side face of the tooth 15 around which the armature coil 8 is wound to a circumferential direction side face of the armature coil 8. As a result, the two armature coils 8 are partitioned in the radial direction by the insulating member 19. The insulating member 19 is not, however, inserted in relation to the armature coils 8 wound around the remaining teeth 15, i.e. the teeth 15 numbered T2, T3, T5, T6, T8, T9, T11, T12, T14, T15, T17, and T18.

Note that the insulating member 19 is not limited to the shape described above, and may take any shape as long as the two armature coils 8 are partitioned in the radial direction thereby.

Further, a total number of turns of the two armature coils 8 wound respectively around the teeth 15 numbered T1, T4, T7, T10, T13, and T16, or in other words the respective numbers of turns of the single armature coil bodies 18 numbered Ua, Va, and Wa, are all identical, and this number of turns is set as Nt1. The respective numbers of turns of the single armature coils 8 wound around the remaining teeth 15, i.e. the teeth 15 numbered T2, T3, T5, T6, T8, T9, T11, T12, T14, T15, T17, and T18, or in other words the respective numbers of turns of the single armature coil bodies 18 numbered Ub, Vb, Wb, Uc, Vc, and Wc, are all identical, and this number of turns is set as Nt2. The number of turns Nt2 is larger than Nt1, and when a turn ratio between Nt2 and Nt1 is set as t, $$t = Nt1/Nt2 < 1$$

is established.

By making the number of turns Nt2 larger than Nt1, the torque of the rotary electric machine 106 can be improved in comparison with a case where the number of turns Nt2=Nt1.

Figure 32:
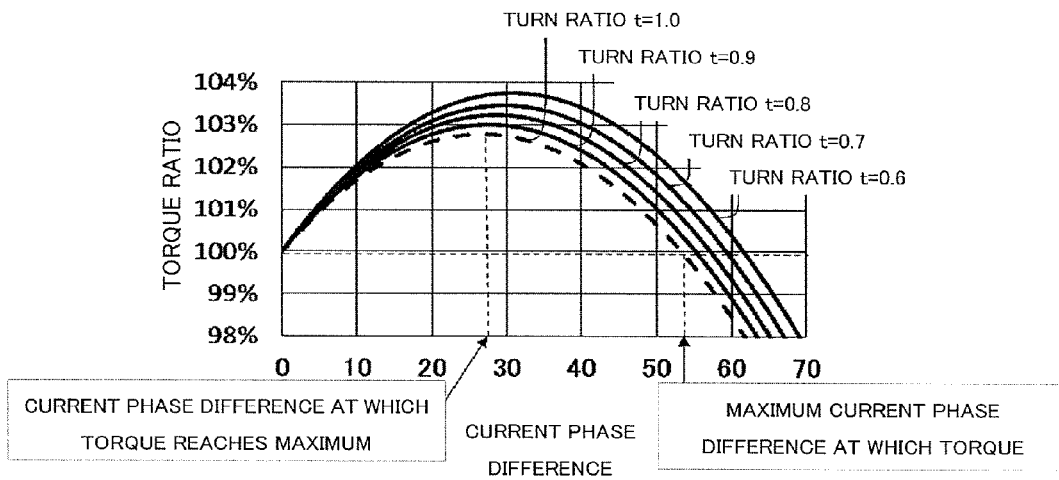
FIG. 32 is a view showing a relationship between the current phase difference θ and the torque ratio of the rotary electric machine according to the fifth embodiment of this invention.

FIG. 32 is a view showing a relationship between the current phase difference θ and the torque ratio of the rotary electric machine according to this embodiment. The abscissa of FIG. 32 shows the current phase difference θ between the currents supplied to the first armature winding 16 and the second armature winding 17, while the ordinate of FIG. 32 shows the torque ratio in a case where the torque at a current phase difference of 0° is set as 100%. It is evident from FIG. 32 that when the turn ratio t varies, variation occurs in a maximum current phase difference θa at which the torque improves from a current phase difference of 0°, and as a result, a current phase difference θb at which the torque reaches a maximum also varies.

It is also evident from FIG. 32 that when the turn ratio t<1, or in other words when the number of turns Nt2 is larger than Nt1, as described above, the torque of the rotary electric machine 106 can be improved to a greater extent than when the turn ratio t=1.

Figure 33:
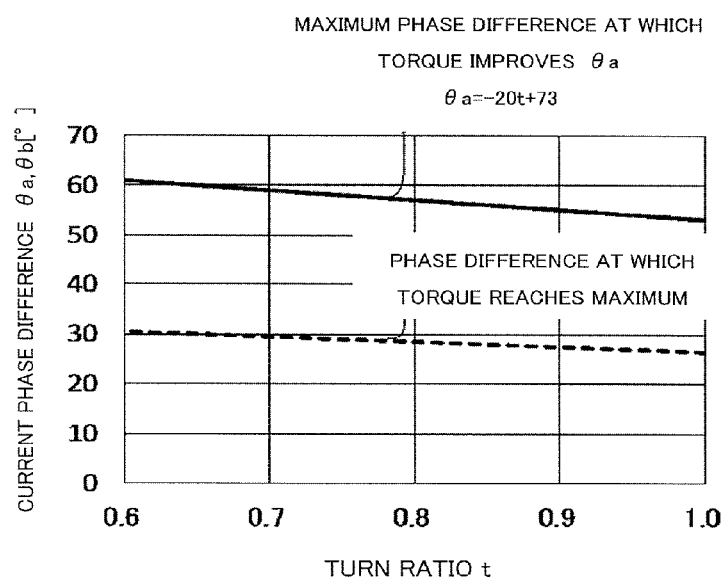
FIG. 33 is a view showing a relationship of a turn ratio of the rotary electric machine according to the fifth embodiment of this invention to a current phase difference θa at which the torque improves from a current phase difference of 0° and a current phase difference θb at which the torque reaches a maximum.

FIG. 33 is a view showing a relationship of the turn ratio of the rotary electric machine according to this embodiment to the current phase difference θa at which the torque improves from a current phase difference of 0° and the current phase difference θb at which the torque reaches a maximum. The abscissa of FIG. 33 shows the turn ratio t, and the ordinate of FIG. 33 shows the current phase difference θa at which the torque improves from a current phase difference of 0° and the current phase difference θb at which the torque reaches a maximum. In FIG. 33, the current phase differences θa and θb have a linear function relationship with the turn ratio t such that $$\theta a = -20t + 73 [°]$$

$$\theta b = -10t + 36.5 [°]$$

are established. Hence, by setting the current phase difference θ at 0°<θ≤θa°, the torque can be improved even when the turn ratio t varies. More preferably, by setting the current phase difference θ in the vicinity of θb, an even greater torque improvement effect can be obtained.

Note that the rotary electric machine 106 according to this embodiment is not limited to the rotor 5 including the fourteen permanent magnets 13 and the stator 4 including the eighteen teeth 15 of the rotary electric machine 101 according to the first embodiment, and the effects shown in FIGS. 32 and 33 can be achieved likewise with the rotor 5 including (18±4)×n (where n is an integer no smaller than 1) field poles and the stator 4 including 18 n teeth 15 of the rotary electric machines 102 and 103 according to the second embodiment.

Further, the electromagnetic field vectors generated in the V phase armature coils in FIGS. 28A and 28B and FIGS. 29A and 29B differ from the electromagnetic field vectors generated in the V phase armature coils in FIGS. 16A and 16B and FIGS. 17A and 17B only in terms of the winding polarities of V13, V14, V22, and V23. Hence, the effects shown in FIGS. 32 and 33 can be achieved likewise with the rotor 5 including (18±2)×n (where n is an integer no smaller than 1) field poles and the stator 4 including 18 n teeth 15 of the rotary electric machines 104 and 105 according to the third and fourth embodiments.

Sixth Embodiment

Figure 34:
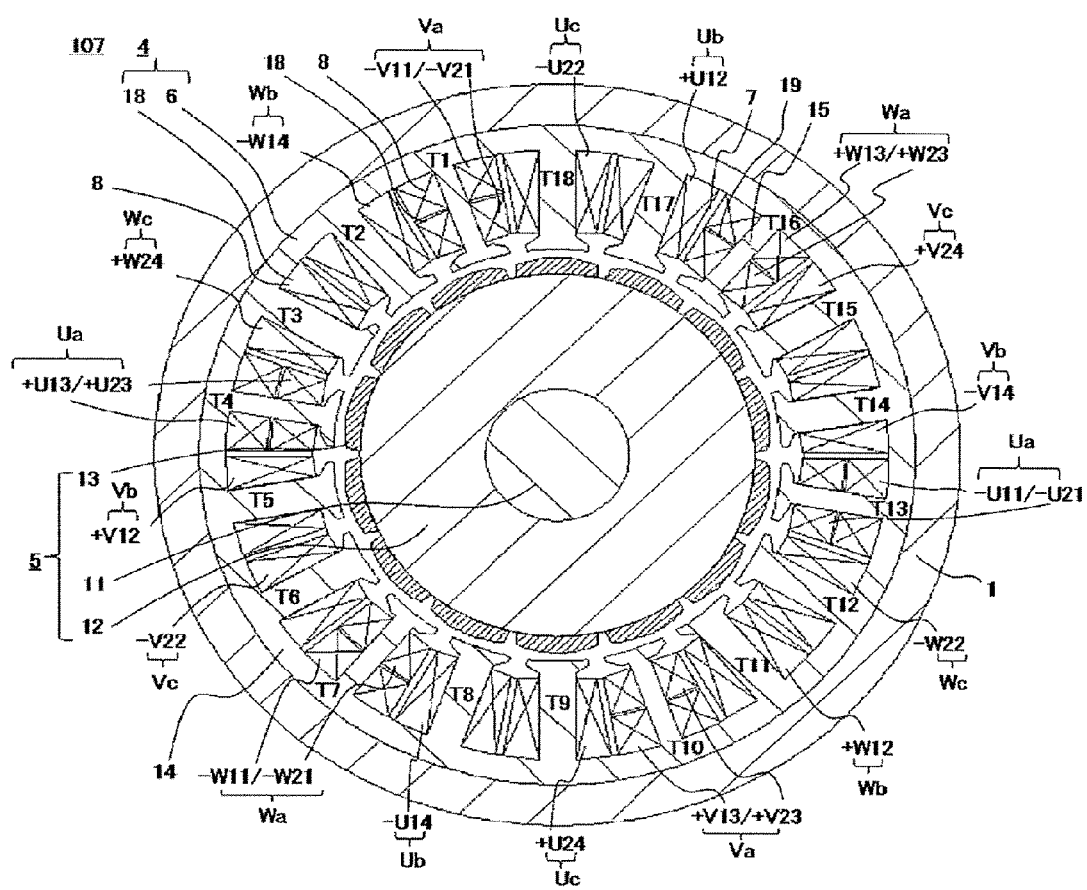
FIG. 34 is a sectional view of a rotary electric machine according to a sixth embodiment of this invention.

FIG. 34 is a sectional view of a rotary electric machine according to a sixth embodiment of this invention. A rotary electric machine 107 according to this embodiment resembles the fifth embodiment in that the rotor 5 includes fourteen permanent magnets 13, or in other words fourteen field poles, and the stator 4 includes eighteen teeth 15. Further, a configuration of the rotary electric machine 107 according to this embodiment differs from the first embodiment as follows.

The numbers of turns of the armature coil bodies 18 wound respectively around the teeth 15 are all equal. Therefore, the turn ratio between Nt2 and Nt1 is t=1.

Further, the teeth 15 around which the armature coil bodies 18 numbered Ub, Vb, Wb, Uc, Vc, and Wc are wound respectively have a larger circumferential direction width than the teeth 15 around which the armature coil bodies 18 numbered Ua, Va, and Wa are wound. The insulating member 19 is not inserted between the two armature coils 8 forming the armature coil bodies 18 numbered Ub, Vb, Wb, Uc, Vc, and Wc. Accordingly, the volume of each slot 7 in which the insulating member 19 is not inserted can be reduced by the volume of the insulating member 19. As a result, the circumferential direction width of the teeth 15 around which the armature coil bodies 18 numbered Ub, Vb, Wb, Uc, Vc, and Wc are wound can be increased by an amount corresponding to the reduction in the volume of the slot 7.

With this configuration, the teeth 15 around which the armature coil bodies 18 numbered Ub, Vb, Wb, Uc, Vc, and Wc are wound respectively have a larger circumferential direction width than the teeth 15 around which the armature coil bodies 18 numbered Ua, Va, and Wa are wound, and therefore magnetic saturation in the teeth 15 around which the armature coil bodies 18 numbered Ub, Vb, Wb, Uc, Vc, and Wc are wound can be alleviated. As a result, the torque of the rotary electric machine 107 can be improved, and the torque ripple can be reduced.

Seventh Embodiment

A rotary electric machine according to this embodiment resembles the fifth embodiment in that the rotor 5 includes fourteen permanent magnets 13, or in other words fourteen field poles, and the stator 4 includes eighteen teeth 15. Further, a configuration of the rotary electric machine according to this embodiment differs from the fifth embodiment as follows.

The numbers of turns of the armature coil bodies 18 wound respectively around the teeth 15 are all equal. Therefore, the turn ratio between Nt2 and Nt1 is t=1.

Further, a wire diameter of the armature coil bodies 18 numbered Ub, Vb, Wb, Uc, Vc, and Wc is larger than the wire diameter of the armature coil bodies 18 numbered Ua, Va, and Wa. The insulating member 19 is not inserted between the two armature coils 8 forming the armature coil bodies 18 numbered Ub, Vb, Wb, Uc, Vc, and Wc. Accordingly, the volume of each slot 7 in which the insulating member 19 is not inserted is larger than the volume of each slot 7 in which the insulating member 19 is inserted by an amount corresponding to the volume of the insulating member 19. As a result, the wire diameter of the armature coil bodies 18 numbered Ub, Vb, Wb, Uc, Vc, and Wc can be increased by an amount corresponding to the increase in the volume of the slot 7.

With this configuration, the wire diameter of the armature coil bodies 18 numbered Ub, Vb, Wb, Uc, Vc, and Wc is larger than the wire diameter of the armature coil bodies 18 numbered Ua, Va, and Wa, and therefore resistance in the armature coil bodies 18 numbered Ub, Vb, Wb, Uc, Vc, and Wc can be reduced, enabling a reduction in the resistance of the first and second armature windings 16 and 17 of the rotary electric machine. By reducing the resistance, copper loss caused by the armature coils 8 of the rotary electric machine can be reduced, heat generation by the rotary electric machine can be reduced, and improvements can be achieved in the efficiency and the torque of the rotary electric machine.

Eighth Embodiment

Figure 35:
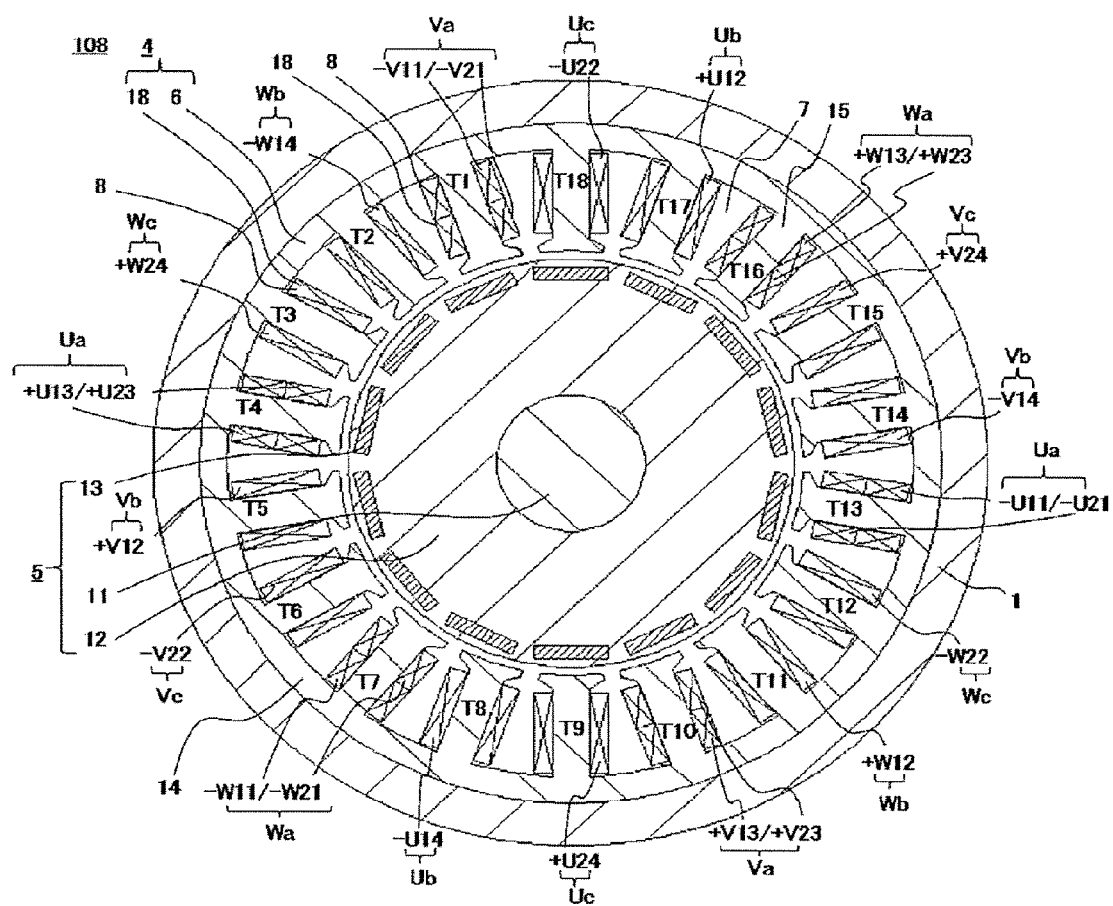
FIG. 35 is a sectional view of a rotary electric machine according to an eighth embodiment of this invention.

FIG. 35 is a sectional view of a rotary electric machine according to an eighth embodiment of this invention.

The rotary electric machine 101 of the first embodiment is an example of a so-called surface magnetic type rotary electric machine 101 in which the permanent magnets 13 are disposed on the surface of the rotor core 12, whereas in a rotary electric machine 108 according to the eighth embodiment, the permanent magnets 13 are embedded in the rotor core 12.

The stator 4 is structured identically to that of the rotary electric machine 101 of the first embodiment.

The rotor 5 includes the shaft 11, the rotor core 12 provided on the outer side of the shaft 11, and the fourteen permanent magnets 13, which have a quadrangular cross-section and are embedded in the rotor core 12 at equal intervals in the circumferential direction.

This embedded magnet type rotary electric machine 108 typically has a smaller equivalent air gap than the surface magnet type rotary electric machine shown in FIG. 2, and therefore magnetic flux density in the gap increases. As a result, increases occur in the torque ripple and the electromagnetic excitation force generated in the stator core, an electromagnetic force caused by an imbalance such as eccentricity in the rotor, and magnetic vibration.

Furthermore, when the current phase difference θ exists, increases in vibration and noise occur.

By employing the configurations described in the first to seventh embodiments, however, a rotary electric machine in which increases in the torque ripple and the electromagnetic excitation force generated in the stator core 6 can be suppressed, whereby increases in vibration and noise can be suppressed, can be obtained likewise with the embedded magnet type rotary electric machine 108.

Moreover, by employing the permanent magnets 13 having a quadrangular cross-section shown in FIG. 35, a processing cost of the permanent magnets 13 can be reduced and the magnets can be prevented from scattering. Accordingly, a metal pipe for covering the permanent magnets 13 is not required, and therefore the cost of the rotary electric machine 108 can be reduced.

Figure 36:
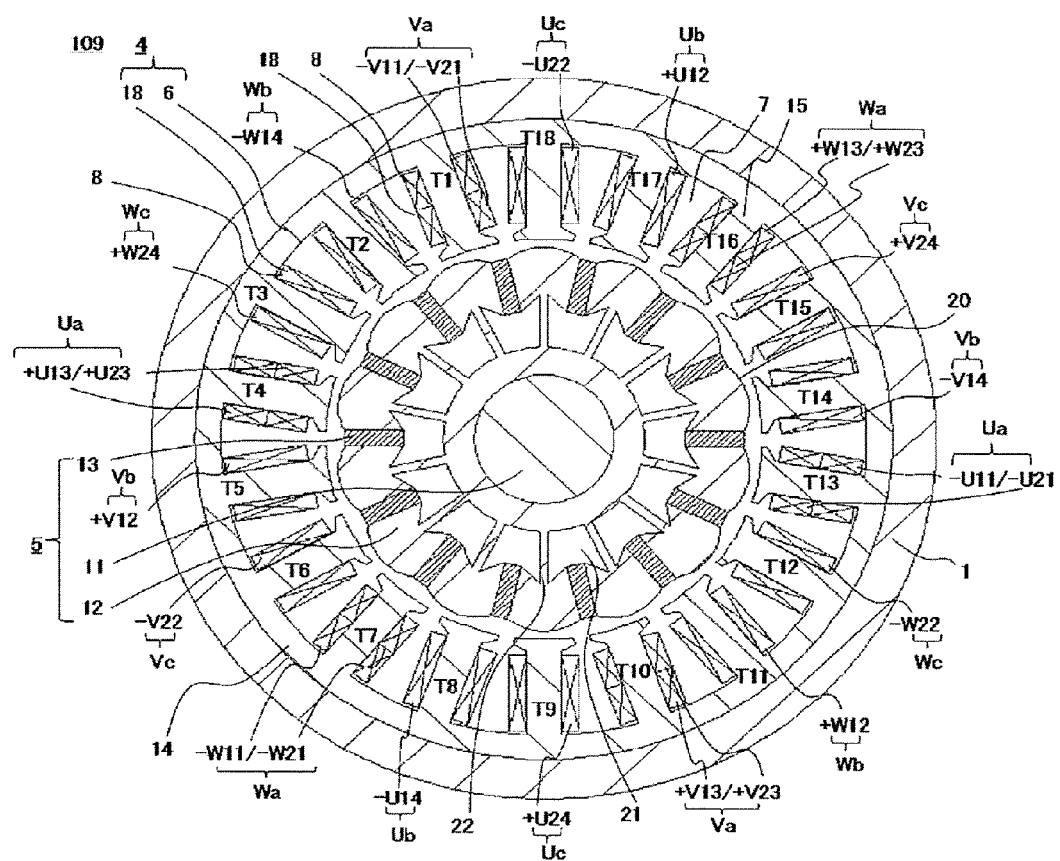
FIG. 36 is a sectional view showing a different configuration of the rotary electric machine according to the eighth embodiment of this invention.

Further, FIG. 36 is a front sectional view showing a rotary electric machine 109 in which the permanent magnets 13 embedded in the rotor core 12 are longer in the radial direction than in the circumferential direction.

The stator 4 is structured identically to that of the rotary electric machine 101 according to the first embodiment.

The permanent magnets 13 are longer in the radial direction than in the circumferential direction, and fourteen permanent magnets 13 are arranged at equal intervals in the circumferential direction.

Magnetization directions of the permanent magnets 13 are set such that N and S respectively form an N pole and an S pole. In other words, the permanent magnets 13 are magnetized such that opposing surfaces of adjacent permanent magnets 13 are set at the same pole.

By setting the magnetization directions in this manner, magnetic flux is concentrated in the rotor core 12, enabling an increase in the magnetic flux density.

Further, the rotor core 12 is interposed between adjacent permanent magnets 13. A surface of the rotor core 12 opposing the stator 4 side includes curved surface portions 20, and the curved surface portions 20 are each formed in the shape of a projecting curved surface such that the length of the air gap between the rotor core 12 and the stator 4 shortens in an intermediate point between the adjacent permanent magnets 13.

With this shape, the magnetic flux density generated in the air gap can be provided with a smooth waveform, enabling reductions in cogging torque and the torque ripple.

Further, non-magnetic portions 21 are provided so as to contact inner diameter side end surfaces of the respective permanent magnets 13. Here, the non-magnetic portions 21 may be formed from air, filled with resin, or formed by inserting a non-magnetic metal such as stainless steel or aluminum.

As a result, magnetic flux leakage from the permanent magnets 13 can be reduced.

Connecting portions 22 are provided to connect the rotor core 12 between adjacent permanent magnets 13 to the rotor core 12 provided so as to surround the outer periphery of the shaft 11. The connecting portions 22 act to connect these two parts of the rotor core 12 mechanically.

Hence, the radial direction length of the permanent magnets 13 is made longer than the circumferential direction length thereof while smoothing the waveform of the magnetic flux density generated in the air gap so that cogging torque and the torque ripple are reduced, and as a result, magnetic flux can be concentrated in the rotor core 12, enabling an increase in torque.

Further, since the equivalent air gap is smaller than that of the surface magnet type rotary electric machine 101 shown in FIG. 2, the magnetic flux density in the gap increases, causing problems such as increases in the torque ripple and the electromagnetic excitation force generated in the stator core, an increase in the electromagnetic force caused by an imbalance such as eccentricity in the rotor, and an increase in magnetic vibration.

Furthermore, when the current phase difference θ exists, increases in vibration and noise occur.

By employing the configurations described in the first to seventh embodiments, however, increases in the torque ripple and the electromagnetic excitation force generated in the stator core 6 can be suppressed while improving the average torque, with the result that increases in vibration and noise can be suppressed while maintaining a high torque, even in the rotary electric machine 109, in which the permanent magnets 13 formed to be longer in the radial direction than in the circumferential direction are embedded in the rotor core 12.

Ninth Embodiment

Figure 37:
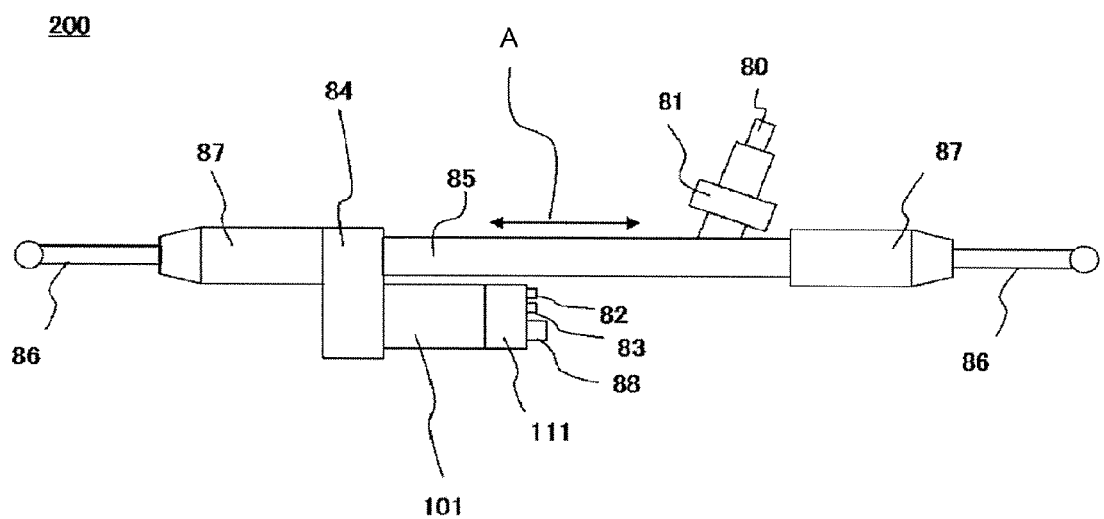
FIG. 37 is an illustrative view of an electric power steering device according to a ninth embodiment of this invention.

FIG. 37 is an illustrative view of an electric power steering device according to a ninth embodiment of this invention.

In FIG. 37, one end of a shaft 80 is connected to a steering wheel (not shown) via a steering shaft (not shown). A torque sensor 81 is disposed coaxially with the shaft 80.

A cable (not shown) of the torque sensor 81 is connected to the ECU 111 via a first connector 82. The ECU 111 is connected, via a second connector 82, to a transmission source (not shown) that transmits electric signals including vehicle information such as the vehicle speed. The ECU 111 is connected to a battery (not shown) or an alternator (not shown) via a power supply connector 88. Further, the ECU 111 is attached to an opposite side of the rotary electric machine 101 to a gearbox 84 side.

The rotary electric machine 101 is electrically connected to the inverters of the ECU 111. The rotary electric machine 101 is disposed in an orientation that is parallel to a movement direction A of a rack shaft. The rotary electric machine 101 is disposed on the gearbox 84 on an opposite side to the ECU 111 side. Inside the gearbox 84, an output shaft (not shown) of the rotary electric machine 101 is connected to a ball screw (not shown) via a belt (not shown).

The ball screw housed in the gearbox 84 is connected to the rack shaft (not shown), which is provided in the interior of a housing 85, so that when the ball screw moves in an axial direction, the rack shaft is moved in the movement direction A. Another end of the shaft 80 is connected to the rack shaft within the housing 85 via a gear (not shown) so that rotation direction torque from the shaft 80 is converted into thrust in the movement direction A of the rack shaft and transmitted thereto. The rack shaft is connected to a tie rod 86 so that the tie rod 86 is capable of moving parallel to the movement direction A of the rack shaft. The tie rod 86 is connected to a tire (not shown) so that a linear motion of the tie rod 86 in the movement direction A is converted into a turning motion of the tire. Note that a rack boot 87 is provided on an opposite side of the tie rod 86 to the tire side to ensure that foreign matter does not infiltrate the device.

When a driver operates the steering wheel, resulting torque is transmitted to the shaft 80 via the steering shaft. At this time, the torque detected by the torque sensor 81 is converted into an electric signal and transmitted to the ECU 111 through the cable via the first connector 82.

Meanwhile, vehicle information such as the vehicle speed is converted into an electric signal and transmitted to the ECU 111 via the second connector 82. The ECU 111 calculates a required assist torque from the torque and the vehicle information such as the vehicle speed, and supplies a current to the rotary electric machine 101 via the inverter.

Further, power is supplied to the ECU 111 from the battery or alternator via the power supply connector 88.

The torque generated by the rotary electric machine 101 is reduced by the gearbox 84 housing the belt and the ball screw, whereby thrust for moving the rack shaft provided in the interior of the housing 85 in the direction of the arrow A is generated, and as a result, a steering force applied by the driver is assisted.

In response, the tie rod 86 moves so as to steer the tires, and as a result, the vehicle can be turned.

The driver, when assisted by the torque of the rotary electric machine 101, can turn the vehicle using a small amount of steering force.

In the electric power steering device 200 described above, the cogging torque and torque ripple generated by the rotary electric machine 101 are transmitted to the driver via the gear, and it is therefore desirable to reduce the cogging torque and torque ripple in order to obtain a favorable steering feel.

It is also desirable to reduce vibration and noise generated when the rotary electric machine 101 is operative.

Hence, by installing the rotary electric machines according to the first to eighth embodiments, the effects described in the respective embodiments can be obtained.

In particular, increases in the torque ripple and the electromagnetic excitation force generated in the stator core 6 can be suppressed while improving the average torque, with the result that increases in vibration and noise can be suppressed.

Further, the rotary electric machine provided in the electric power steering device 200 rotates both clockwise and counterclockwise in order to generate the thrust for moving the rack shaft, but with the rotary electric machines described in the first to eighth embodiments, the torque ripple can be reduced when the rotary electric machine rotates both clockwise and counterclockwise.

Moreover, torque ripple, cogging, and a difference in the average torque relative to the rotation direction can be eliminated.

As a result, noise and vibration in the electric power steering device 200 can be reduced, and the torque thereof can be increased.

Further, as shown in FIG. 37, the rotary electric machine 101 is disposed in a parallel orientation to the movement direction (the arrow A) of the rack shaft, and since the electric power steering device 200 is a system suited to installation in a large vehicle, the rotary electric machine 101 requires a large output. When the output is increased, however, vibration and noise generated in the rotary electric machine 101 also increase. Moreover, to increase the output, the rotary electric machine 101 is driven by two inverters, and when the current phase difference θ exists, increases in vibration and noise occur.

However, these problems can be solved by applying the rotary electric machines described in the first to eighth embodiments, and as a result, the electric power steering device 200 can be applied to a large vehicle such that an improvement in fuel efficiency is achieved therein.

Note that in the embodiments described above, the rotor of the rotary electric machine 101 is disposed rotatably on the inner side of the stator 4 via a magnetic gap, but this invention may also be applied to a rotary electric machine in which the rotor is disposed rotatably on the outer side of the stator via a magnetic gap.

REFERENCE SIGNS LIST 1, 801 frame
2 bolt
3 housing
4, 804 stator
5, 805 rotor
6, 806 stator core
7, 807 slot
8, 808 armature coil
9 first bearing
10 second bearing
11, 811 shaft
12, 812 rotor core
13, 813 permanent magnet
14, 814 core back
15, 815 tooth
16, 816 first armature winding
17, 817 second armature winding
18, 818 armature coil body
19 insulating member
20 curved surface portion
21 non-magnetic portion
22 connecting portion
50 wall portion
51 heat sink
52 case
53 recessed portion
54 magnetic sensor
55 substrate
56 sensor permanent magnet
57 pulley
58 switching element
59 support portion
60 connecting member
61 control board
62 first connector
63 second connector
64 power supply connector
65 first inverter
66 second inverter
70 first power supply relay
71 second power supply relay
72 power supply
73 coil
74a to 74f, 76a to 76f MOS-FET
75, 77 shunt resistor
78 first capacitor
79 second capacitor
80 shaft
81 torque sensor
82 first connector
83 second connector
84 gearbox
85 housing
86 tie rod
87 rack boot
88 power supply connector
100 electric driving device
101 to 109 rotary electric machine
111 ECU
901 to 903 conventional rotary electric machine
200 electric power steering device

The invention claimed is:

1. A rotary electric machine comprising:
a rotor having a rotor core and a plurality of field poles provided in the rotor core; and
a stator having a stator core that includes 6 (2 m+k)×n (where k, n, and m are integers no smaller than 1) teeth and a plurality of armature coil bodies in which at least one of a first armature winding and a second armature winding is wound around each of the plurality of teeth,
wherein a three-phase current is supplied to the first armature winding from a first inverter,
a three-phase current is supplied to the second armature winding from a second inverter,
each of the plurality of armature coil bodies is an armature coil body of one of three phases,
2 k×n armature coil bodies of each of the three phases, in which the first armature winding and the second armature winding are both wound around 6 k×n of the teeth, form 6 k×n armature coil bodies of the plurality of armature coil bodies, and these armature coil bodies of each of the three phases are set respectively as Ua, Va, and Wa,
2 m×n armature coil bodies of each of the three phases, in which only the first armature winding is wound around 6 m×n of the teeth, form further 6 m×n armature coil bodies of the plurality of armature coil bodies, and these armature coil bodies of each of the three phases are set respectively as Ub, Vb, and Wb,
2 m×n armature coil bodies of each of the three phases, in which only the second armature winding is wound around 6 m×n of the teeth, form the remaining 6 m×n armature coil bodies of the plurality of armature coil bodies, and these armature coil bodies of each of the three phases are set respectively as Uc, Vc, and Wc, and
Ua, Va, Wa, Ub, Vb, Wb, Uc, Vc, and Wc are respectively arranged so as to exhibit 2 n-fold rotational symmetry about an axial center of the rotor, and
respective electrical angle phases of Ua, Va, and Wa take a value no smaller than an $(m+1)^{th}$ smallest value and no larger than an $(m+k)^{th}$ smallest value among the (2 m+k) armature coil bodies of the same phase within a minimum unit of the rotational symmetry.

2. The rotary electric machine according to claim 1, wherein m=1 and k=1, and the respective electrical angle phases of Ua, Va, and Wa take a second smallest value among the three armature coil bodies of the same phase within the minimum unit of the rotational symmetry.

3. The rotary electric machine according to claim 1, wherein a phase of the current supplied to the second armature winding from the second inverter is advanced by a current phase difference θ relative to a phase of the current supplied to the first armature winding from the first inverter, Ub, Vb, and Wb are the armature coil bodies having the most advanced electrical angle phases among the armature coil bodies of the same phase within the minimum unit of the rotational symmetry, and Uc, Vc, and Wc are the armature coil bodies having the most retarded electrical angle phases among the armature coil bodies of the same phase within the minimum unit of the rotational symmetry.

4. The rotary electric machine according to claim 3, wherein the rotor includes (18±4)×n (where n is an integer no smaller than 1) field poles.

5. The rotary electric machine according to claim 3, wherein the rotor includes (18±2)×n (where n is an integer no smaller than 1) field poles.

6. The rotary electric machine according to claim 4, wherein respective numbers of turns of Ua, Va, Wa, Ub, Vb, Wb, Uc, Vc, and Wc are all equal, and the current phase difference θ satisfies a relationship of $0°<θ≤53°$.

7. The rotary electric machine according to claim 6, wherein the current phase difference θ satisfies a relationship of $13°<θ≤41°$.

8. The rotary electric machine according to claim 4, wherein respective numbers of turns of Ua, Va, Wa, Ub, Vb, Wb, Uc, Vc, and Wc are all equal, and the current phase difference θ satisfies a relationship of $22°<θ≤60°$.

9. The rotary electric machine according to claim 8, wherein the current phase difference θ satisfies a relationship of $24°<θ≤60°$.

10. The rotary electric machine according to claim 1, wherein when respective numbers of turns of Ua, Va, and Wa are set at Nt1 and respective numbers of turns of Ub, Vb, Wb, Uc, Vc, and Wc are set at Nt2, a relationship of $Nt1<Nt2$ is established.

11. The rotary electric machine according to claim 4, wherein when respective numbers of turns of Ua, Va, and Wa are set at Nt1, respective numbers of turns of Ub, Vb, Wb, Uc, Vc, and Wc are set at Nt2, a turn ratio is set at t=Nt1/Nt2 (where t<1), and θa=−20t+73, the current phase difference θ satisfies a relationship of $0°<θ≤θa°$.

12. The rotary electric machine according to claim 1, wherein a circumferential direction width of the teeth around which any of Ub, Vb, Wb, Uc, Vc, and Wc is wound is greater than the circumferential direction width of all of the teeth around which any of Ua, Va, and Wa is wound.

13. The rotary electric machine according to claim 1, wherein a wire diameter of Ub, Vb, Wb, Uc, Vc, and Wc is greater than respective wire diameters of all of Ua, Va, and Wa.

14. The rotary electric machine according to claim 1, wherein the rotor includes field poles formed by a plurality of permanent magnets embedded in the rotor core.

15. An electric power steering device equipped with the rotary electric machine according to claim 1.

16. The rotary electric machine according to claim 5, wherein respective numbers of turns of Ua, Va, Wa, Ub, Vb, Wb, Uc, Vc, and Wc are all equal, and the current phase difference θ satisfies a relationship of $0°<θ≤53°$.

17. The rotary electric machine according to claim 5, wherein when respective numbers of turns of Ua, Va, and Wa are set at Nt1, respective numbers of turns of Ub, Vb, Wb, Uc, Vc, and Wc are set at Nt2, a turn ratio is set at t=Nt1/Nt2 (where t<1), and θa=−20t+73, the current phase difference θ satisfies a relationship of $0°<θ≤θa°$.

* * * * *